United States Patent
Cole et al.

(10) Patent No.: US 8,788,396 B2
(45) Date of Patent: Jul. 22, 2014

(54) INTRADAY RISK MANAGEMENT DATA CLOUD COMPUTING SYSTEM CAPABLE OF CONTROLLING EXECUTION OF ORDERS

(75) Inventors: Lee Arthur Cole, Evergreen, CO (US); Douglas Guy Kittelsen, Evergreen, CO (US); Malcolm Gary Lafever, Lyons, CO (US); Ted Nathan Myerson, Boynton Beach, FL (US)

(73) Assignee: FTEN, Inc., New York, NY (US)

( * ) Notice: Subject to any disclaimer, the term of this patent is extended or adjusted under 35 U.S.C. 154(b) by 309 days.

(21) Appl. No.: 12/873,148

(22) Filed: Aug. 31, 2010

(65) Prior Publication Data

US 2011/0166982 A1 Jul. 7, 2011

Related U.S. Application Data

(63) Continuation-in-part of application No. 12/836,943, filed on Jul. 15, 2010, now Pat. No. 8,010,442, which is a continuation of application No. 10/954,527, filed on Sep. 30, 2004, now Pat. No. 7,778,915.

(60) Provisional application No. 60/510,766, filed on Oct. 14, 2003, provisional application No. 60/536,559, filed on Jan. 15, 2004, provisional application No. 60/581,931, filed on Jun. 22, 2004, provisional application No. 61/255,772, filed on Oct. 28, 2009, provisional application No. 61/300,667, filed on Feb. 2, 2010, provisional application No. 61/323,176, filed on Apr. 12, 2010.

(51) Int. Cl.
*G06Q 40/00* (2012.01)
*G06Q 40/04* (2012.01)

(52) U.S. Cl.
CPC .................................... *G06Q 40/04* (2013.01)
USPC ................................. 705/37; 705/35; 705/44

(58) Field of Classification Search
CPC ....................................................... G06Q 40/04
USPC ............................................................ 705/37
See application file for complete search history.

(56) References Cited

U.S. PATENT DOCUMENTS 5,168,446 A 12/1992 Wiseman
5,893,091 A 4/1999 Hunt et al.
(Continued)

OTHER PUBLICATIONS

U.S. Appl. No. 13/018,014, filed Jan. 31, 2011; Inventor: Kittelsen et al.

(Continued)

*Primary Examiner* — Hai Tran
(74) *Attorney, Agent, or Firm* — Nixon & Vanderhye P.C.

(57) ABSTRACT

In at least one embodiment, a method and system associated with financial articles of trade may include comparing relevant portions of data pertaining to an attempted transaction, wherein the transaction may pertain to one in which an entity is financially liable but unaware. At least one embodiment includes monitoring market transaction activity data to determine when a trading entity has exceeded an aggregated limit, such as one or more trading sub-limits corresponding to one or more custodial prime brokers facilitating trading for the trading entity. At least one embodiment includes a pre-trade gateway to determine if an order violates a pre-trade risk based on information collected by a front-end analyzer. Possible actions include, but are not limited to, placing a null order, terminating a connection associated with the order, modifying the order so as not to violate a pre-trade risk check, and/or notifications to one or more entities.

16 Claims, 19 Drawing Sheets

(56) References Cited

U.S. PATENT DOCUMENTS

| | | | |
|---|---|---|---|
| 6,314,468 B1 | 11/2001 | Murphy et al. | |
| 6,763,384 B1 | 7/2004 | Gupta et al. | |
| 6,957,199 B1 | 10/2005 | Fisher | |
| 7,096,494 B1 | 8/2006 | Chen | |
| 7,107,240 B1 | 9/2006 | Silverman et al. | |
| 7,299,208 B1* | 11/2007 | Bailon et al. | 705/37 |
| 7,305,483 B2* | 12/2007 | Yao et al. | 709/231 |
| 7,310,620 B2 | 12/2007 | Moore et al. | |
| 7,512,557 B1 | 3/2009 | Fishbain et al. | |
| 7,584,141 B1 | 9/2009 | Andrews | |
| 7,624,063 B1 | 11/2009 | Andrews | |
| 7,668,767 B1 | 2/2010 | Borsand | |
| 7,778,915 B2 | 8/2010 | Angle et al. | |
| 7,958,033 B2 | 6/2011 | Wardley et al. | |
| 8,095,452 B2 | 1/2012 | Doornebos et al. | |
| 2002/0038270 A1 | 3/2002 | Shin et al. | |
| 2002/0087454 A1 | 7/2002 | Calo et al. | |
| 2002/0111896 A1 | 8/2002 | Ben-Levy et al. | |
| 2002/0184237 A1 | 12/2002 | McFeely | |
| 2003/0009419 A1* | 1/2003 | Chavez et al. | 705/38 |
| 2003/0033239 A1 | 2/2003 | Gilbert et al. | |
| 2003/0041000 A1 | 2/2003 | Zajac et al. | |
| 2003/0041006 A1 | 2/2003 | Bunda | |
| 2003/0097327 A1 | 5/2003 | Anaya et al. | |
| 2003/0139990 A1 | 7/2003 | Greco | |
| 2004/0059666 A1 | 3/2004 | Waelbroeck et al. | |
| 2004/0139031 A1 | 7/2004 | Amaitis et al. | |
| 2004/0243503 A1 | 12/2004 | Eng et al. | |
| 2004/0260553 A1 | 12/2004 | Niemi | |
| 2005/0010475 A1 | 1/2005 | Perkowski et al. | |
| 2005/0044035 A1 | 2/2005 | Scott | |
| 2005/0154668 A1 | 7/2005 | Burns et al. | |
| 2005/0171887 A1 | 8/2005 | Daley et al. | |
| 2005/0171891 A1 | 8/2005 | Daley et al. | |
| 2005/0203825 A1* | 9/2005 | Angle et al. | 705/37 |
| 2005/0228735 A1 | 10/2005 | Duquette | |
| 2005/0251448 A1 | 11/2005 | Gropper | |
| 2005/0273418 A1 | 12/2005 | Campbell | |
| 2006/0047590 A1 | 3/2006 | Anderson et al. | |
| 2006/0265317 A1 | 11/2006 | Duquette | |
| 2006/0271475 A1 | 11/2006 | Brumfield et al. | |
| 2007/0156919 A1* | 7/2007 | Potti et al. | 709/238 |
| 2008/0015970 A1 | 1/2008 | Brookfield et al. | |
| 2008/0059846 A1 | 3/2008 | Rosenthal et al. | |
| 2008/0086401 A1 | 4/2008 | Mather | |
| 2008/0228617 A1 | 9/2008 | Johnson | |
| 2008/0235146 A1 | 9/2008 | Hirani et al. | |
| 2008/0243675 A1 | 10/2008 | Parsons et al. | |
| 2008/0281750 A1 | 11/2008 | Toffey et al. | |
| 2009/0234776 A1* | 9/2009 | Bauerschmidt et al. | 705/36 R |
| 2010/0094743 A1 | 4/2010 | Robertson et al. | |
| 2010/0332368 A1 | 12/2010 | Alderucci et al. | |
| 2011/0166982 A1 | 7/2011 | Cole et al. | |
| 2011/0225081 A1 | 9/2011 | Kittelsen et al. | |

OTHER PUBLICATIONS

U.S. Appl. No. 12/836,943, filed Jul. 15, 2010; Inventor: Angle et al.
U.S. Appl. No. 12/131,921, filed Jun. 2, 2008; Inventor: Kittelsen et al.
U.S. Appl. No. 12/914,699, filed Oct. 28, 2010; Inventor: Cole et al.
Notification of Transmittal of International Preliminary Report and Written Opinion for International Application No. PCT/US10/47394 mailed Oct. 22, 2010.
Office Action mailed Jul. 28, 2010 in co-pending U.S. Appl. No. 12/131,921.
Office Action mailed Nov. 9, 2010 in co-pending U.S. Appl. No. 12/131,921.
International Search Report for PCT/US08/07025, mailed Aug. 20, 2008.
Written Opinion of the International Searching Authority for PCT/US08/07025, mailed Aug. 20, 2008.
Notification of Transmittal of International Preliminary Report and Written Opinion for International Application No. PCT/US10/54538 mailed Jan. 4, 2011.
Office Action mailed Oct. 9, 2012 in U.S. Appl. No. 12/914,699, pp. 1-24.
Office Action mailed Sep. 9, 2010 in U.S. Appl. No. 12/836,943, pp. 1-8.
Office Action mailed Aug. 23, 2013 in co-pending U.S. Appl. No. 12/914,699, pp. 1-25.

* cited by examiner

INTRADAY RISK MANAGEMENT DATA CLOUD COMPUTING SYSTEM CAPABLE OF CONTROLLING EXECUTION OF ORDERS

CROSS REFERENCE TO RELATED APPLICATIONS

This application is a continuation-in-part application of pending U.S. patent application Ser. No. 12/836,943 filed on Jul. 15, 2010, which is a continuation application of U.S. patent application Ser. No. 10/954,527 filed on Sep. 30, 2004 (now U.S. Pat. No. 7,778,915 issued on Aug. 17, 2010), which claimed the benefit of U.S. Provisional Patent Application No. 60/510,766 filed on Oct. 14, 2003, U.S. Provisional Patent Application No. 60/536,559 filed on Jan. 15, 2004, and U.S. Provisional Patent Application No. 60/581,931 filed on Jun. 22, 2004; the present application further claims the benefit of U.S. Provisional Patent Application No. 61/255,772 filed on Oct. 28, 2009, U.S. Provisional Patent Application No. 61/300,667 filed on Feb. 2, 2010, and U.S. Provisional Patent Application No. 61/323,176 filed on Apr. 12, 2010; the content of all of the foregoing patent applications are incorporated herein by reference.

FIELD

The one or more present inventions relate to a system for analyzing intraday issues related to securities transactions including issues related to securities transactions that have been submitted to liquidity destinations via multiple prime broker relationships, as well as to methods and systems for facilitating the cancellation of orders for financial articles of trade.

BACKGROUND

Various systems exist which assisted in the formulation and submission of securities trading transactions to liquidity destinations, otherwise known as Pre-Trade Systems, collected and processed information related to consummated transactions after the close of the securities market each day, otherwise known as Post Market Systems, and enabled risk and portfolio risk modeling and analysis after the close of the securities market each day, otherwise known as Post Market Analysis Systems. An overview of the trading market is illustrated in FIG. 4. In addition, systems exist that supported intraday risk analysis and modeling but only for those transactions processed through, or integrated with, such systems, otherwise known as Intraday Closed Systems.

The popularity of disparate trading systems, Delivery versus Payment (DVP) or Receipt versus Payment (RVP) transactions and multiple prime brokerage relationships creates a situation where intraday risk exposure from large volume, large dollar U.S. equity transactions is not properly managed by existing Pre-Trade Systems, Intraday Closed Systems, Post Market Systems or Post Market Analysis Systems. These systems fail to address the significant losses that can result from delayed response to intraday risk exposure.

The effectiveness of pre-trade risk management in existing trading systems has been severely limited by the growing use of multiple trading systems by institutional investors to access common pools of capital to affect sophisticated investment strategies. These disparate systems have been limited to managing risks associated with internal transaction flow. Therefore, a consolidated view of risk could only be possible only on a retrospective basis (e.g., at day's end after the close of the market) when information from disparate systems could be collected and analyzed.

Institutional clients often use brokers to execute transactions involving financial articles of trade that are physically held and cleared by another broker or custodial bank, via Delivery versus Payment (DVP) or Receipt versus Payment (RVP) transactions. Risk management systems used by executing brokers are generally unable to manage risks associated with these transactions, because they are not integrated with the risk management systems of other potentially involved executing brokers and/or with one or more risk management systems of one or more relevant custodians. As a result, risks associated with such transactions may only be evident until well after their execution.

The prime brokerage landscape (i.e., investment banks providing global custody (including clearing, custody, and asset servicing), securities lending, financing (to facilitate leveraging of client assets to enable investment of greater amounts than actually on deposit), capital introduction, and similar services to hedge funds, proprietary trading groups and other professional trading entities) has changed dramatically since the collapse of Lehman Brothers in 2008. Trading entities that received credit (a.k.a. "margin") financing from Lehman Brothers could not withdraw their collateral when Lehman declared bankruptcy due to lack of adequate asset protection rules.

As a result of Lehman's collapse, trading entities realized that no prime broker was too big to fail. Sophisticated trading entities desire to spread their counterparty risk across several prime brokerages and, in order to attract and retain their business, prime brokers support such multi-prime broker relationships.

Trading entities take advantage of prime brokerage service offerings, as well as the capital strength and reserves, of numerous prime brokerage firms by executing transactions with multiple prime brokers. That is, one trading entity may have relationships with more than one prime broker. In a way, this distributed relationship with multiple prime brokers increases the trading entity's opportunity to make trades throughout the market.

However, the distributed relationship with multiple prime brokers also increases the exposure to the trading entity as well as prime brokers who have extended credit and/or act as guarantor(s) of the trades. For example, a trading entity may elect to conduct "away" trades with a willing prime broker (for purposes hereof, referred to as the "executing broker"). In these cases, details regarding the assets and credit arrangements underlying a trade are not known by the executing broker making the trade, and while details regarding assets and credit arrangements are known by the prime broker (for purposes hereof, referred to as the "custodial broker") who has custody of such assets and/or has established credit arrangements with the trading entity making the trade, details regarding the trade itself are not known by the custodial broker. The details of the trade are actually held by another prime broker, the executing broker. Since the away trades are not executed by the custodial prime broker, information about those trades are hidden from the custodial prime broker until well after their execution, potentially putting the assets and extended credit associated with the trading entity at risk. The risk may be increased when the trading entity makes multiple away trades with multiple, non-custodial prime brokers. None of these non-custodial prime brokers are aware of the away trades conducted by other prime brokers, and the custodial prime broker is not aware of any of these away trades, until a later time, thereby further increasing the exposure of the trading entity and the custodial prime broker.

Hedge funds and other institutional investors increasingly participate in "away" trades. This means that the trade was done by an executing broker other than the client's clearing firm or prime broker on an agency basis (e.g., securities were bought and sold directly into or out of the client's account) or on a riskless principle basis (the executing broker executes the trade after receiving an order from the investor and then allocates the trade to the investor's account with a markup/ markdown or commission. In both situations, the trade is done using an identifier (generally known in the industry as a "Neumonic" or "MPID") that is different than the investor's identifier but is subsequently allocated to that investor for clearing at the investor's clearing firm. In addition, hedge funds and other institutional investors enter into multiple clearing arrangements with clearing firms or prime brokers. In this situation, the investor may have funds on deposit at each firm and each firm actually clears his transactions or he may have a DVP/RVP relationship with one or more of the firms where the trades are transferred (generally referred to in the industry as "given up") to the firm that will actually do the clearing of the transaction. In all of the above situations, risks associated with transactions may only be evident until well after execution of those transactions, such as after close of the trading day.

Accordingly, trading entities often take advantage of brokerage service offerings, as well as the capital strength and reserves, of numerous brokerage firms by executing transactions with multiple brokers. That is, one trading entity may have relationships with more than one broker in order to take advantage of efficiencies in reaching the market and other proprietary access or information available to one broker over other brokers. In a way, this distributed relationship with multiple brokers increases the trading entity's opportunity to make trades throughout the market.

However, in some cases, distributed trading can adversely affect the market. For instance, a trading entity places multiple trades using more than one broker and possibly overextending its capital reserves backing the trades. If the trading entity fails to make good on a trade (i.e., the trade "fails"), it not only jeopardizes the trading entity's financial position if it cannot cover the trade, but could also jeopardize the entire market if that trade was sufficiently large, or if multiple trading entities are in the same overextended position, thereby multiplying their effect across the entire market.

Further, the problems with distributed trading can be amplified when considering that there are multiple trading entities, multiple brokers, multiple trading systems, and multiple markets through which trades are made. As such, a trading entity may make trades using one or more brokers, over one or more trading systems, on one or more markets. Since all of these different segments of the market do not necessarily communicate with each other, actions by one party in one segment can adversely affect other parties in other segments, such as when one or more trading entities are badly overextended.

SUMMARY

It is to be understood that the present invention includes a variety of different versions or embodiments, and this Summary is not meant to be limiting or all-inclusive. This Summary provides some general descriptions of some of the embodiments, but may also include some more specific descriptions of other embodiments.

In at least one embodiment, a method of processing financial articles of trade is provided. The method includes collecting real time data from a plurality of liquidity destinations in trading at least one of securities, commodities, options, futures and derivatives, the real time data including information on transactions of financial articles of trade after they have been submitted to the liquidity destinations. The real time data collected from the plurality of liquidity destinations is aggregated. The real time data is converted and streamed in a standardized form. User criteria are established to identify relevant portions of the streamed real time data. The user criteria are consolidated into a computer data store. The standardized real time data is then compared against the user criteria to determine what if any user defined criteria is impacted by the real time data.

In at least one embodiment, a financial article of trade data processing system is provided. The system includes a data communication element arranged to connect to and collect real time data from a plurality of liquidity destinations for trading at least one of securities, commodities, options, futures and derivatives. The real time data includes information on submitted and completed transactions of financial articles of trade. A computer communicates with the data communication element and is programmed to aggregate the real time data collected from the plurality of liquidity destinations and stream the real time data in a standardized form. A user parameter element is established for comparison to the real time data. The computer is programmed to compare the real time data against the user criteria to determine if any user defined criteria is impacted by the real time data.

In accordance with at least one embodiment, a method for monitoring market transaction activity data is provided, comprising:
  collecting real-time data from a plurality of liquidity destinations trading at least one financial article of trade, wherein the real-time data comprises disparate data corresponding to associated liquidity destinations;
  normalizing at least a portion of the real-time data that is collected into a standardized form;
  defining a condition of a trading market comprising at least one of submitted and/or executed transactions of financial articles of trade over the plurality of liquidity destinations;
  associating the condition that is defined with an entity;
  identifying an event in the trading market from the portion of real-time data that is normalized in which the event matches the condition;
  terminating at least one communication session between the entity and a corresponding liquidity destination; and
  initiating a process at the corresponding liquidity destination that cancels at least one pending transaction submitted by the entity.

In accordance with at least one embodiment, the terminating at least one communication session comprises physically de-coupling a connection between the entity and the corresponding liquidity destination, wherein the connection enables the communication session. In accordance with at least one embodiment, the terminating at least one communication session comprises logically de-coupling a connection between the entity and the corresponding liquidity destination, wherein the connection enables the communication session. In accordance with at least one embodiment, the terminating at least one communication session comprises invoking a TCP teardown (or equivalent action) over at least one communication session. In accordance with at least one embodiment, the terminating at least one communication session comprises terminating a plurality of communication sessions between the entity and the plurality of liquidity destinations. In accordance with at least one embodiment, the terminating all communication session comprises physically de-coupling a plurality of connections between the entity and the plurality of liquidity destinations, wherein the plurality of connections enables the plurality of communication sessions. In accordance with at least one embodiment, the method further comprises determining the plurality of connections between the entity and the plurality of liquidity destinations. In accordance with at least one embodiment, the terminating a plurality of communication sessions comprises terminating all communication sessions between the entity and the plurality of liquidity destinations. In accordance with at least one embodiment, the terminating at least one communication session further comprises: causing a logical or physical de-coupling of a connection between the entity and the corresponding liquidity destination. In accordance with at least one embodiment, the initiating a process comprises forcing a cancel-on-disconnect process at the corresponding liquidity destination. In accordance with at least one embodiment, the condition is based on transactions of financial articles of trade related to the entity. In accordance with at least one embodiment, the condition includes transactions of financial articles of trade not related to the entity. In accordance with at least one embodiment, the method further comprises: determining from the real-time data canceled orders related to the entity over the plurality of liquidity destinations; determining an open order base of the entity based on the real-time data; comparing the open order base to the canceled orders; and determining that orders for transactions of financial articles of trade are not submitted through the plurality of communication sessions when the canceled orders do not correspond to the open order base. In accordance with at least one embodiment, the method further comprises restoring the at least one communication session through a pre-trade gateway or other means to the corresponding liquidity destination.

In accordance with at least one embodiment, a method for modifying market activity is provided, comprising:
  associating a defined condition of a trading market with an entity;
  identifying an event in the trading market matching the defined condition; and
  in response to the event, modifying an order of the entity submitted over a communication session to a liquidity destination.

In at least one embodiment, at least one of the associating, the identifying and the modifying are performed using real-time data collected from a plurality of liquidity destinations trading at least one financial article of trade. In at least one embodiment, the modifying an order further comprises terminating the communication session to invoke a process at the liquidity destination that cancels the order.

In at least one embodiment, a method for monitoring market transaction activity data is provided, comprising:
  collecting real-time data from a plurality of liquidity destinations trading at least one financial article of trade, wherein the real-time data comprises disparate data corresponding to associated liquidity destinations;
  normalizing at least a portion of the real-time data that is collected into a standardized form;
  defining a condition of a trading market comprising one or both submitted and executed transactions of financial articles of trade over the plurality of liquidity destinations;
  associating the condition that is defined with an entity;
  identifying an event in the trading market or trading market activity in the trading market matching the condition from the real-time data that is normalized;
  inserting at least one or controlling at least one pre-existing switch between the entity and the plurality of liquidity destinations over a plurality of connections between the entity and the plurality of liquidity destinations, wherein the plurality of connections facilitate a plurality of sessions between the entity and the plurality of liquidity destinations; and
  stopping all future trading activity of the entity over the plurality of sessions by activating the at least one switch.

In at least one embodiment, the stopping all future trading activity further comprises invoking a single action to stop all future trading activity of the entity over the plurality of sessions. In at least one embodiment, the method further comprises
  terminating the plurality of communication sessions between the entity and the plurality of liquidity destinations; and
  initiating a process at each of the plurality of liquidity destinations that cancels pending transactions from the entity.

In at least one embodiment, a method for monitoring market transaction activity data is provided, comprising:
  accessing real-time data from a plurality of sources trading at least one financial article of trade with a plurality of liquidity destinations;
  associating a condition of a trading market with an entity;
  identifying an event in the trading market matching the condition from the real-time data;
  terminating at least one communication session between the entity and a corresponding liquidity destination; and
  initiating a process at the corresponding liquidity destination that cancels pending transactions from the entity.

In at least one embodiment, the event is based on transactions of financial articles of trade related to the entity. In at least one embodiment, the event is based on transactions of financial articles of trade not related to the entity.

In at least one embodiment, a system for monitoring market transaction activity data is provided, comprising:
  a communication session between an entity and a liquidity destination, wherein the communication session facilitates trading of at least one financial article of trade;
  a connection between the entity and the liquidity destination;
  a gateway located on the connection;
  a collector for collection of real-time data including transactions of financial articles of trade;
  an event identifier for identifying an event matching a defined condition in a trading market comprising one or both of submitted and executed transactions of financial articles of trade over a plurality of liquidity destinations from the real-time data, wherein the condition is associated with the entity;
  a controller for terminating the connection using the switch when the event is identified.

In at least one embodiment, the gateway comprises a logical switch. In at least one embodiment, the gateway comprises a physical switch. In at least one embodiment, the collector collects real-time data from the plurality of liquidity destinations, wherein the real-time data comprises disparate data corresponding to associated liquidity destinations. In at least one embodiment, the collector collects real-time data from a plurality of sources trading the at least one financial article of trade over the plurality of liquidity destinations.

In addition, in at least one embodiment, a method and system is provided that is capable of reducing the exposure of a trading entity and the corresponding custodial prime brokers by tracking activity of a trading entity in reference to sub-limits set by individual custodial prime brokers who have a relationship with the trading entity. Accordingly, a method for monitoring data is provided, comprising:

forming a connection between a trading entity and a liquidity destination, wherein the connection facilitates trading of an order of a financial article of trade;

delivering the order from the trading entity over the connection;

previewing the order at a pre-trade gateway before delivery of the order to the liquidity destination;

delivering information related to the order to a front-end analyzer which is capable of determining a position of an entity based on all orders collected by the front-end analyzer;

defining a pre-trade risk;

determining if the order violates the pre-trade risk based on information collected by the front-end analyzer;

creating a non-actionable trading message (a "null" order) based on the order when the pre-trade risk is violated, wherein the null order is interpreted by the liquidity destination as being an order upon which no action is taken; and delivering the null order to the liquidity destination.

In at least one embodiment, the generating a null, non-actionable, or modified order comprises modifying a header of a message comprising the order identifying the message as a null or modified order. In at least one embodiment, the generating a null or modified order comprises appending information to a message comprising the order rendering the message non-actionable. In at least one embodiment, the generating a null order comprises deleting information from a message comprising the order rendering the null order into a message into one that is not interpreted by the liquidity destination interprets as an actionable trade. That is, the liquidity destination takes no action with the message, and does not execute the underlying order.

In at least one embodiment, a system for monitoring market transaction activity is provided, comprising:

a connection between a trading entity and a liquidity destination, wherein the connection facilitates trading of an order of a financial article of trade;

a pre-trade gateway located on the connection;

a front-end analyzer for collection of real-time pre-trade information including pending transactions of financial articles of trade collected before delivery to the liquidity destination;

wherein the pre-trade gateway performs risk management to determine whether the order violates a pre-trade risk; and wherein the pre-trade gateway generates a null order based on the order when the pre-trade risk is violated.

In at least one embodiment, a system for monitoring market transaction activity is provided, comprising:

a computer for collection of pre-trade information including pending transactions of financial articles of trade collected before delivery of the pending transactions to a liquidity destination, the computer generating at least one of a null order or an order termination action when a pre-trade risk is violated.

Still one or more other embodiments are directed to dissemination of one or more cancellation instructions of pending orders of financial articles of trades that are associated with a particular trading entity. Accordingly, a system for monitoring market transaction activity data is provided, comprising:

a plurality of liquidity destination trading at least one financial article of trade;

a centralized hub for receiving real time data related to market conditions; and a limit collector and analyzer for tracking trading activity for a particular trading entity, the limit collector and analyzer comprising a comparator for determining when the trading activity exceeds an aggregate trading limit based on one or more trading sub-limits assigned by one or more prime brokers for that trading entity.

In at least one embodiment, the system further comprises a notification engine for providing notification of when the trading activity exceeds an aggregate trading limit based on one or more trading sub-limits assigned by one or more prime brokers for that trading entity.

In at least one embodiment, a method for monitoring market transaction activity data is provided, comprising:

collecting at a centralized hub real time data related to conditions of a trading market from one or more liquidity destinations trading at least one financial article of trade;

normalizing at least a portion of the real time data that is collected into a standard form;

storing the real time data that is normalized;

parsing out trading activity for a particular trading entity; and determining when the trading activity exceeds an aggregate trading limit based on one or more trading sub-limits assigned by one or more prime brokers for that trading entity.

In at least one embodiment, the method further comprises providing notification of when the trading activity exceeds an aggregate trading limit based on one or more trading sub-limits assigned by one or more prime brokers for that trading entity. In at least one embodiment, the determining further comprises determining when the trading activity exceeds a trading sub-limit of a prime broker. In at least one embodiment, the method further comprises:

parsing out a subset of trading activity for that trading entity that includes trades backed by assets held by a particular prime broker, wherein the prime broker has assigned a trading sub-limit for that trading entity; and determining when the subset of trading activity exceeds the trading sub-limit of the prime broker for the trading entity.

In addition to the foregoing, a method for monitoring market transaction activity data is provided, comprising:

collecting at a centralized hub real time data related to conditions of a trading market from one or more liquidity destinations trading at least one financial article of trade;

normalizing at least a portion of the real time data that is collected into a standard form;

storing the real time data that is normalized;

parsing out trading activity for a particular trading entity;

parsing out a subset of trading activity for that trading entity that includes trades backed by assets held by a particular prime broker, wherein the prime broker has assigned a trading sub-limit for that trading entity; and determining when the subset of trading activity exceeds the trading sub-limit of the prime broker for the trading entity.

In addition to the foregoing, in at least one embodiment a method of processing financial articles of trade is provided, comprising:

collecting real time data from a plurality of liquidity destinations trading at least one financial article of trade, the real time data including information on submitted and completed transactions of financial articles of trade, wherein the real time data comprises disparate data of varying formats corresponding to associated liquidity destinations;

from the real time data, identifying a transaction which an entity is financially liable as one of a chain or parties involved in affecting the identified transaction, wherein the entity was previously unaware of its submission to one of the plurality of liquidity destinations because another party in the chain of parties submitted the identified transaction to one of the plurality of liquidity destinations; and determining that the transaction violates a pre-trade risk; and cancelling the transaction.

In accordance with at least one embodiment, the cancelling includes using a pre-trade gateway to generate a null order associated with the transaction when a pre-trade risk is violated. In accordance with at least one embodiment, the cancelling includes terminating a connection associated with the transaction.

In accordance with the foregoing, a method for monitoring data is provided, comprising:

forming a connection between a trading entity and a liquidity destination, wherein the connection facilitates trading of an order of a financial article of trade;

delivering the order from the trading entity over the connection;

previewing the order at a pre-trade gateway before delivery of the order to the liquidity destination;

delivering information related to the order to a front-end analyzer which is capable of determining a position of an entity based on all orders collected by the front-end analyzer;

defining a pre-trade risk;

determining if the order violates the pre-trade risk based on information collected by the front-end analyzer;

modifying the order to generate a modified order so that the pre-trade risk is not violated by the modified order; and passing the modified order to the liquidity destination.

In accordance with at least one embodiment, a method for monitoring data is provided, comprising:

forming a connection between a trading entity and a liquidity destination, wherein the connection facilitates trading of an order of a financial article of trade;

delivering the order from the trading entity over the connection;

previewing the order at a pre-trade gateway before delivery of the order to the liquidity destination;

delivering information related to the order to a front-end analyzer which is capable of determining a position of an entity based on all orders collected by the front-end analyzer;

defining a pre-trade risk;

determining if the order violates the pre-trade risk based on information collected by the front-end analyzer;

modifying the order to generate a modified order so that the pre-trade risk is not violated by the modified order; and passing the modified order to the liquidity destination.

In accordance with at least one embodiment, a system for monitoring market transaction activity data is provided, comprising:

a connection between a trading entity and a liquidity destination, wherein the connection facilitates trading of an order of a financial article of trade;

a pre-trade gateway located on the connection;

a front-end analyzer for collection of real-time pre-trade information including pending transactions of financial articles of trade collected before delivery to the liquidity destination;

wherein the pre-trade gateway performs risk management to determine whether the order violates a pre-trade risk; and wherein the pre-trade gateway modifies the order to generate a modified order so that the pre-trade risk is not violated by the modified order when the pre-trade risk is violated.

In accordance with at least one embodiment, a method for monitoring data is provided, comprising:

previewing an order submitted by trading entity to a liquidity destination over a connection that facilitates trading of orders of financial articles of trade before delivery of the order to the liquidity destination;

defining a pre-trade risk;

determining if the order violates the pre-trade risk;

modifying the order to generate a modified order so that the pre-trade risk is not violated by the modified order; and passing the modified order to the liquidity destination.

In accordance with at least one embodiment, a method for monitoring market transaction activity data is provided, comprising:

receiving from a liquidity destination one or more confirmations of one or more transactions of financial articles of trade submitted to the liquidity destination from a trading entity over a period;

receiving from the trading entity one or more requests comprising copies of transactions of financial articles of trade submitted to the liquidity destination by the trading entity over said period;

comparing the one or more confirmations to the one or more requests; and altering behavior at the liquidity destination with regards to the trading entity when a discrepancy occurs between the one or more confirmations and the one or more requests.

In accordance with at least one embodiment, a system for monitoring market transaction activity data is provided, comprising:

an order collector for receiving from a liquidity destination one or more confirmations of one or more transactions of financial articles of trade submitted to the liquidity destination from a trading entity over a period;

a request collector for receiving from the trading entity one or more requests comprising copies of transactions of financial articles of trade submitted to the liquidity destination by the trading entity over the period;

an evaluator coupled to the order collector and the request collector for comparing the one or more confirmations to the one or more requests, wherein behavior at the liquidity destination is altered with regards to the trading entity when a discrepancy occurs between the one or more confirmations and the one or more requests.

Various components are referred to herein as "operably associated." As used herein, "operably associated" refers to components that are linked together in operable fashion, and encompasses embodiments in which components are linked directly, as well as embodiments in which additional components are placed between the two linked components.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Various embodiments of the present inventions are set forth in the attached figures and in the Detailed Description as provided herein and as embodied by the claims. It should be understood, however, that this Summary does not contain all of the aspects and embodiments of the one or more present inventions, is not meant to be limiting or restrictive in any manner, and that the invention(s) as disclosed herein is/are understood by those of ordinary skill in the art to encompass obvious improvements and modifications thereto.

Additional advantages of the present invention will become readily apparent from the following discussion, particularly when taken together with the accompanying drawings.

BRIEF DESCRIPTION OF THE DRAWINGS

To further clarify the above and other advantages and features of the present invention, a more particular description of the invention will be rendered by reference to specific embodiments of the invention, which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
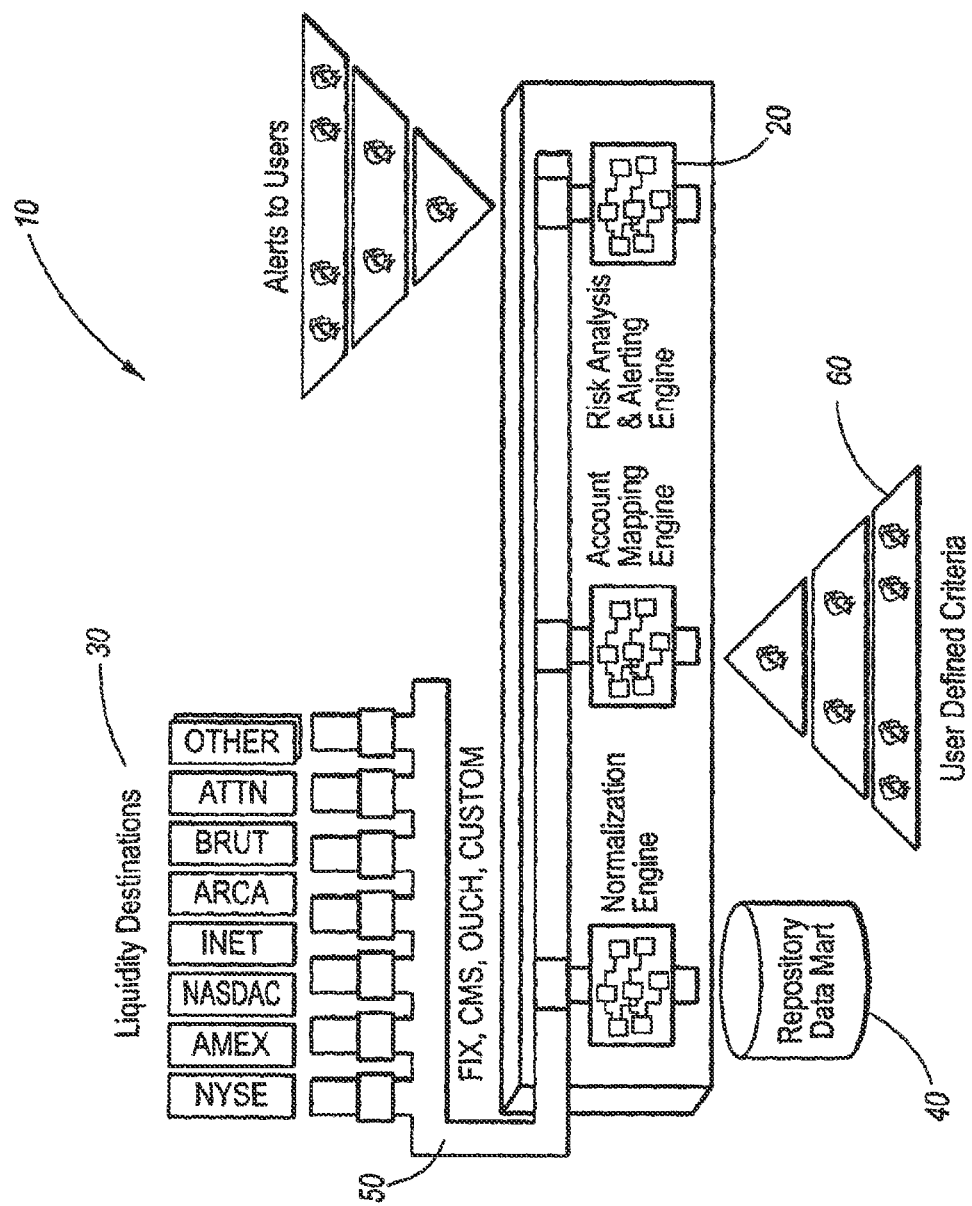
FIG. 1 is a schematic representation of a system in accordance with at least one embodiment described herein.

One or more embodiments of the one or more inventions described herein pertain to a financial article of trade data processing system including various functions, which may be implemented to perform consolidation and analysis of intraday issues related to transactions, including transactions pertaining to securities, commodities, options, and futures transactions. The system enables analysis of a variety of articles of trade, including transactions that may involve at least one of disparate systems, multiple parties and multiple liquidity destinations.

One or more embodiments described herein also provide for monitoring market transaction activity data to determine when a trading entity has exceeded an aggregated trading limit, such as one or more trading sub-limits corresponding to custodial prime brokers facilitating trades for the trading entity.

In addition to the foregoing, one or more embodiments described herein provide for the quick and bulk dissemination of one or more cancellation instructions of pending orders of financial articles of trades that are associated with a particular trading entity. In addition, one or more embodiments are capable of reducing the time-to-market when placing a cancellation instruction for a trading entity's pending order of a financial article of trade with a corresponding liquidity destination. Further, one or more embodiments are capable of reducing the time-to-market when placing a plurality of cancellation instructions for a particular trading entity's pending orders of financial articles to trade with a plurality of liquidity destinations. Also, one or more embodiments are capable of taking into account the financial position of various entities, to include but not limited to the entire market, a trading entity, a brokerage firm, a broker, or a market participant, when performing pre-trade risk analysis of an order.

One or embodiments of the present invention are capable of creating and/or accessing a secure data cloud including real-time market information from a plurality of liquidity destinations in order to support pre-trade and/or at-trade risk analysis for purposes of performing broader systemic risk management.

Although described using the embodiments presented herein, the one or more inventions and claims pertaining thereto are intended to also encompass equivalents, alternatives, variations, and modifications thereof as may be applicable under patent law.

Notation and Nomenclature

Embodiments described herein can be implemented on a software program for processing data through a computer system. The computer system can be a personal computer, notebook computer, server computer, mainframe, networked computer (e.g., router), handheld computer, personal digital assistant, workstation, and the like. Other embodiments may be implemented through specialized hardware that is activated by a signal generated by the process that normalizes and evaluates the real-time trading activity of the trading client. This program or its corresponding hardware implementation is operable for performing pre-trade risk analysis of a pending order before it reaches a corresponding liquidity destination, for enabling the monitoring of market transaction activity data to establish aggregate trading limit based on trading sub-limits assigned by one or more custodial prime brokers for a particular trading entity, and/or for preventing that order from being processed by the liquidity destination when it is determined that the order puts the market, trading entity, or any associated entity at risk. In one embodiment, the computer system includes a processor coupled to a bus and memory storage coupled to the bus. The memory storage can be volatile or non-volatile and can include removable storage media. The computer can also include a display, provision for data input and output, etc.

Some portion of the detailed descriptions that follow are presented in terms of procedures, steps, logic block, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc. is generally conceived to be a sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that discussions utilizing terms such as "defining," "collecting," "normalizing," "identifying," "terminating," or the like refer to the actions and processes of a computer system, or similar electronic computing device, including an embedded system, that manipulates and transfers data represented as physical (electronic) quantities within the computer system's registers and memories into other data similarly represented as physical quantities within the computer system memories or registers or other such information storage, transmission or display devices.

The term "financial articles of trade" within this disclosure is made in reference to securities or security transactions, and more particularly should be interpreted as transactions involving securities, commodities, options or futures over one or more liquidity destinations (e.g., NYSE, NASDAQ, or Alternative Trading Systems, such as electronic communication network (ECNs)). The term "other financial articles of trade" refers to any other article traded at the liquidity destinations other than securities, commodities, options, or futures. Throughout this Application, it is intended that the term "financial articles of trade" and their transaction includes reference to types of transactions involving these "other financial articles of trade." It should be appreciated that different configurations can be used to consolidate and analyze the data to achieve a given result. Although particular combinations are disclosed, variations on those combinations can be used to achieve the same consolidation and analysis in the financial article of trade data processing system.

Article of Trade Data Processing System

At least one embodiment described herein enables users to take action promptly on an intraday basis to mitigate the impact of changes in intraday market conditions that can otherwise exacerbate losses and also enables real-time intraday comparison of trading statistics. This long felt, unmet need in the securities industry has existed since the mid-1990's since Alternate Trading Systems were authorized and the number of direct access trading platforms proliferated; however, until the present invention no solution existed to address this pressing industry need.

As illustrated in FIG. 1, system 10 enables parties involved in the purchase and/or sale of securities, commodities and other financial articles to monitor intraday issues related to submitted securities transactions regardless of which securities trading system(s) were used by such party or such party's clients to affect such transactions, regardless of which liquidity destination or destinations were used to affect such transactions (e.g., the NYSE, NASDAQ or Alternative Trading Systems such as ECNs), and regardless of which third parties ultimately became involved in affecting such transactions (e.g., the initiating client, intermediary broker dealer(s), clearing firms, etc.). A computer 20 consolidates and collects transaction information in real time directly from each liquidity destination 30 as transactions are submitted over the course of the day at such destinations 30. By collecting information directly from the liquidity destinations 30 as the transactions are submitted, there is no need to integrate with any of the systems used to affect transactions with the liquidity destinations 30. In accordance with the various embodiments of the invention, the components described in the system 10 can be integrated into a single unit, connected to a network or distributed across various networks and/or devices.

An aggregation component 22 collects and aggregates information or data 50 from the liquidity destinations 30 following submission of the data to the liquidity destinations. Collecting data 50 directly from liquidity destinations 30 following submission of transactions, as opposed to relying on data provided directly by clients and/or by clients' systems, ensures the integrity and objectivity of such data 50. This data collection improves compliance with regulatory requirements that require oversight of clients' securities trading activities. In addition, collecting data 50 directly from liquidity destinations 30 following submission of transactions avoids (i) delays in processing the transactions, (ii) gaps in coverage caused by the use of more than one system to affect the transactions with liquidity destinations, (iii) gaps in coverage caused by the use of more than one liquidity destination, and (iv) gaps in coverage caused by the involvement of multiple parties with regard to different aspects of the transactions.

At the same time, transaction specific data is collected from the liquidity destinations 30, relevant market information can also be collected from other sources. For example, the cost if the transaction had been consummated at a different liquidity destination at the same time, the average cost of the transaction at the time in question across all liquidity destinations, etc. The relevant market information can provide a "snapshot" of relevant intraday market conditions so as to enable clients to assess the efficiency of their transactions and make adjustments in real-time during the course of the day.

Similarly, as transaction specific data is collected from liquidity destinations 30, other user criteria 60, such as parameters of relevant account information is collected in a data base 40 so as to enable a real-time comparison of intraday activity versus historical activity. The computer 20 can convert the data 50 collected directly from the disparate liquidity destinations 30 into a common, normalized format and store the normalized transaction information in the data base 40.

For example, the system 10 collects and aggregates information from numerous networks involved in or related to a user criteria 60, such as a transaction, and/or general market activity that could impact risk conditions or risk checks applicable to the user. The information collected from internal networks and external third party managed networks provides a more realistic perspective on the overall activity related to the specified situation.

Various aggregation tools can be used to interact with different network technologies and topologies to aggregate desired information with the aggregation component 22. In some cases, this tool must be able to learn the particular private messaging infrastructure to monitor and record appropriate activity. In other cases, the system 10 will need to know how to interact with other systems to make requests on a timed or event driven basis. This interaction could involve message-based inquiries, direct access to databases, datastores, or other transaction-based requests. When relevant information related to a given situation, such as a transaction, is found on one or more monitored networks, the aggregation component 22 collects the relevant information and, if necessary, packages, or translates it into an appropriate normalized format and submits it to the analysis component 24. For example, in connection with the example discussed herein for the securities industry, the widely known FIX standard could be used to package or translate the relevant information.

Data 50 is collected by the aggregation component 22 via interaction with relevant networks within the defined timeframes for such networks and with the permission of the managers or controllers of such networks. This data 50 may come from disparate networks in real-time, near real time and/or in batch mode. For example, in real time, the information could be collected from disparate networks via "drop copies." In near real time, the data 50 is collected within some short period of time. A batch mode can be set to an increment of time based on each network's business processes. The collected data 50 can include information from networks that reflect summarized and/or real-time data that relates to, but may not be directly impacted by, the particular situation or transaction being tracked. For example, in connection with the example discussed herein for the securities industry, securities market prices may be relevant to assessing the impact of a particular situation or transaction although the particular situation or transaction may not, in and of itself, impact securities market prices.

The data store 40 can also store user criteria 60, such as client specified information or monitoring requests, which have been "mapped" into a specified format. The format can translate unique client information or requirements, into a common structure to facilitate monitoring of incoming normalized transaction information on behalf of multiple clients at the same time without losing the unique client information or requirements of each client. Access controls are used to ensure that only authorized users are allowed to see transaction data.

The computer 20 compares the user criteria 60 against normalized information as such information is received from liquidity destinations 30. If and when matches occur in the information, the computer 20 can inform clients promptly during the day or intraday. The clients can be informed by way of one or more client initiated viewing sessions accessible via the Internet or via proactive alerts sent to clients by methods such as e-mail, on screen pop-up messages, instant messages, or other sensory alerts.

The analysis component 24 processes inbound information from the aggregation component 22 and compares it against user criteria 60, such as parameters or rules that are identified by users with regard to certain risks, trends, outages, uses, or other desired limits. The analysis component 24 can also leverage the capabilities of external analysis systems which may be commercially available to address particular risk, trend, outage, use scenarios, or other determining events. For example, in connection with the example discussed herein for the securities industry, an external analysis system could include a third party risk system for a particular class of securities or group of clients, or other class. These parameters or rules and external analysis systems can be managed via a hierarchy to set overall criteria for a group of users, specialized criteria for individual users at any level within a defined hierarchy, or other criteria. These parameters or rules and external analysis systems can be used to adjust one or more composite ratings that will be used in other processing, or may simply accumulate a value or values for the impacted users and the hierarchy within which they exist.

Figure 2:
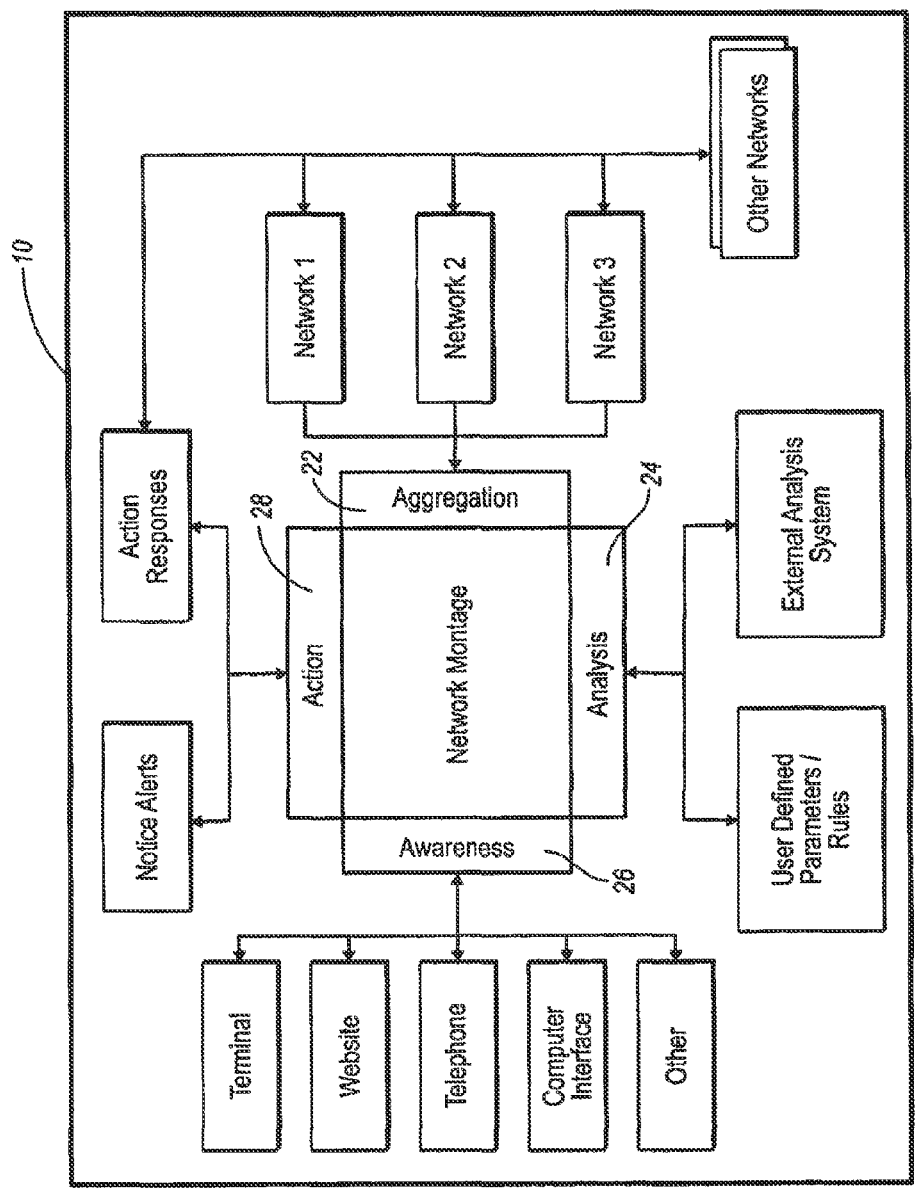
FIG. 2 is a flow diagram of interrelating components of a system in accordance with at least one embodiment described herein.

As illustrated in FIG. 2, the present invention can include an awareness component 26 to provide alerts to the users of the invention. The computer 20 can limit users in viewing, and alerting users with regard to, information with respect to transactions that such users are directly involved in or with respect to which they have been granted rights by those directly involved in such transactions. In addition, the detailed level of the normalized information collected and stored in the data base 40 enables clients to perform data mining analysis with regard to such information on a historical basis.

For example, the awareness component 26 provides an interface to the system 10 by way of a dedicated computer terminal, password protected Web site, voice-prompted telephone interface, computer interface or other known methods of interaction between systems. The awareness component 26 enables users to define, identify and/or be made aware of situations, such as transactions that are relevant to the user. The system 10 allows users to define parameters, such as rules, that specify what, if any, action is warranted in response to different scenarios.

In another instance, the awareness component 26 is communicatively coupled to another third party interface (e.g., an order management system [OMS], liquidity destination, etc.). The awareness component 26 is configured to make these third party interfaces aware of situations or conditions in the market as they arise, such as through a notification signal. As such, the notification signal sent to the third party interface triggers an appropriate action by the third party interface, to include predetermined actions or some other response. For instance, a predetermined action could be to cancel a pending order.

Once the analysis component 24 determines that information warrants a responsive action, for example, the information equals, exceeds or falls below parameters or rules identified by a user, a message is sent to an action component 28 which responds in accordance with user defined requests for notification alerts and/or action responses.

Notification alerts can be sent via e-mail, facsimile transmission, text message, voice, third-party message format/protocol or other messaging means to notify one or more user designated recipients, i.e., a human and/or machine, of a particular event. Notification alerts can require confirmation from recipients, if confirmation is not received within a defined timeframe. Also, follow-up notification alerts can be sent in accordance with user defined alert hierarchies until an acknowledgement is received from a designated recipient or recipients. Notification Alerts can be assigned priority to determine if they should be sent out instantaneously or after a specified amount of time, such as once an hour, a business driven window, such as once a day, or accumulate a certain number of messages before being released, or according to some other user criteria.

The action component 28 can also be programmed to create action responses in an attempt to mitigate or maximize, as appropriate, the impact of identified situations, such as transactions in different scenarios. In this regard, the most effective network(s) in which to affect an action response may be a network or networks other than the one in which the initial event occurred and/or may well be a network or networks not under the management or control of the entity that initiated the original situation or transaction. For example, in connection with the example discussed herein for the securities industry, an action response could be used to create a contrary or offsetting position in the options market to minimize the risk associated with a securities account which has exceeded permissible parameters for the acquisition of equity securities. It is also possible for the action response to create a transaction on a network that is not being monitored by this invention. The network(s) in question may not allow for the sharing of its actual activity, but it may represent the best place for the action response to occur.

One example of the awareness component 26 can be a risk management system that utilizes certain capabilities of a securities trading platform to provide users with real time stand alone risk management capabilities to address their securities trading activities as well as the securities trading activities of their clients. Many securities firms currently manage their risk and their clients' risk on an end-of-day basis. This occurs when firms' securities trading systems do not incorporate an adequate real-time risk management system or when their clients use their own securities trading systems to execute trades and report trade executions well after their execution. This approach means that for these firms their intraday exposure to trades could exceed risk profiles established by contractual, statutory and/or regulatory guidelines. These risks could result in (i) the inability of the firms to meet capital adequacy requirements, (ii) the firms having to take contractual actions to protect themselves that could be detrimental to their clients or (iii) the firms having to take client exposures onto their own books to address the risk.

For example, if one of a clearing firm's correspondent clients were to execute a series of large short trades (exceeding their buying power) in a hard to borrow security (possibly not knowing it had been added to the clearing firm's hard to borrow list) and that security's price subsequently rose significantly during the day on some unexpected good news reports, the clearing firm would be exposed not only to significant losses from the transactions themselves but also to regulatory action for inadequate risk management procedures. With a risk management system in the present invention, the clearing firm would be notified immediately as the trades were executed and could manage their clients' trading activities appropriately. The risk management system allows users to manage credit, market and operational risk for themselves and for their clients. The operational efficiencies that the risk management system delivers to users and enables the users to take on a much larger client base while reducing their overall risk resulting in increased revenues and greater return on investment.

The risk management system is also designed to monitor and manage risk in several categories. These categories include, but are not limited to, buying power/threshold restrictions, restricted and hard to borrow securities risk management, short sell restriction risk management, single order quantity limit management, single order value risk management, value-at-risk (VAR), volatility, stress calculations, various stress tests designated by letters of the Greek alphabet (e.g., delta tests, theta test, etc.), and realized and unrealized profit and loss. The risk management system can be loaded with clients' overnight buying power and asset positions. During the day, the computer system will receive copies of all client execution messages in real-time either directly from liquidity destinations or from manual entries by authorized users with regard to transactions that may not be received electronically during the trading day. As it receives these messages it will perform risk calculations and generate appropriate alerts on a trading supervisor terminal. The risk management system can implement the full client hierarchies supported by the computer system and, optionally, can generate all necessary end of day trade reporting files for integration into the clearing firm or the client's back office systems.

During the setup of the computer system, an account hierarchy with risk parameters is created in the risk management system based on how the client wants to model and manage risk. This is done using a terminal that is connected to the invention via the Internet. At the start of each trading day, overnight buying power and asset positions may be fed into the risk management system using an automated start of day process or entered manually. During the trading day, each liquidity provider sends a copy of each execution message (i.e., a "drop copy") to the risk management system 10. These execution messages are processed by a risk management engine. Any trade that causes a risk management event will generate an alert to a trading supervisor and any other users defined in the system as authorized to receive such notifications and will also be written to a risk management log. The trading supervisor and other authorized users can then deal with the risk event in the most appropriate manner. At the end of each trading day, the risk management system can produce aggregated trade files for the users, if desired. In many situations, this will help to further optimize operations and will represent a value add service that the users can sell to their clients.

An example of the present invention is discussed herein. A Hedge Fund buys or sells various securities asset classes such as equities and equity derivatives (e.g., futures and options) in various markets such as Exchanges, Electronic Communication Networks (ECNs) and Alternative Trading Systems (ATSs). A broker is an authorized member of the market that places and helps the Hedge Fund access the various market places.

In the example, the Hedge Fund sends an order to the broker. The broker in turn sends it to the Exchange. The order is executed at the Exchange and the execution is sent to the broker. The broker sends the execution back to Hedge Fund. Since the transaction is flowing through the broker's system, the broker knows about the transaction and is in a position to perform real time pre-trade and post-trade risk analysis on the transaction.

In another example, the Hedge Fund sends an order directly to the Exchange using the broker's name. The order is executed at the Exchange and the execution is sent to the Hedge Fund. The broker doesn't know about the execution because the Hedge Fund is not using the broker's infrastructure to send orders to the Exchange. But as far as the Exchange is concerned, it is the broker who has done the transaction and therefore the broker is liable for the trade.

The broker has to monitor the Hedge Fund's activities to comply with business and regulatory trading rules. The broker requests a copy of the execution from the Exchange. Every time an order from the Hedge Fund is executed at the Exchange, the execution is sent back to the Hedge Fund and a copy of the execution is sent to the broker.

In reality the Hedge Fund could use many standalone electronic trading systems to affect trades. In another example, the Hedge Fund is using a proprietary system to trade on an Electronic Communication Network (ECN) as well as an Alternative Trading System (ATS) and is using broker's system to trade on the Exchange. The Hedge Fund and broker need to know about all the trading activities on a real time basis in order to more effectively manage their risk.

Once a trade is done, the trade has to settle—this means that exchange of money and asset has to take place. The Exchange reports the trade to the Clearing Corporation and the Correspondent Broker, because it is not licensed to do clearing, reports the trade to its Clearing Broker.

The Clearing Corporation processes the execution and sends the details to the Clearing Broker. It is the Clearing Broker's responsibility to confirm the trades with the Correspondent Broker. Once the trade is confirmed, the Clearing Broker exchanges assets (e.g., stock) and money with the Clearing Corporation. The Clearing Broker then transfers the asset and money to Correspondent Broker's account.

The Clearing Broker is an authorized member of the Clearing Corporation and has to abide by the rules laid down by the Clearing Corporation. The Clearing Corporation takes a deposit from the Clearing Broker. The Clearing Corporation then establishes the trading profile for the Clearing Broker based on contractual, statutory and/or regulatory guidelines. The Clearing Broker could decline to clear a trade if the Correspondent Broker violates any of the trading rules. The Clearing Broker faces a risk in case the Correspondent Broker defaults.

The Correspondent Broker may report some trades on real time basis, some at periodic times throughout the day, and some at end of day to the Clearing Broker. In another example, the Clearing Broker requests a drop copy of trade from the Exchange to monitor the Correspondent Broker's trading activity.

Typically, a Clearing Broker clears for Correspondent Broker. Potential problems can arise in the following scenario. Hedge Fund 1 and Hedge Fund 2 are Correspondent Broker's customers. Hedge Fund 1 directly accesses the market through its own proprietary system. Hedge Fund 2 uses Correspondent Broker's securities trading platform as well as its own proprietary system.

Each Hedge Fund needs to monitor its traders' activities. Since traders are using multiple disparate systems, the Hedge Fund doesn't have a real-time centralized view. Although no one trader may be violating the trading parameters or rules, the combined activities of all the traders could lead to a violation of the trading parameters or rules. Hence timely information of the violation is required. Embodiments of the invention enable the Hedge Fund to see all positions of all relationships across all systems and liquidity destinations.

Additionally, the Correspondent Broker has to comply with the rules established by the Clearing Broker. The rules relate to but are not limited to buying power, margins, hard-to-borrow symbols, short selling, and restricted securities. The Correspondent Broker has to monitor its clients trading activity. Hedge Fund 2 may short sell a hard-to-borrow security from its own proprietary system. The Clearing Broker may decline to settle the trade and the Correspondent Broker could be liable.

Further, the Clearing Broker has the responsibility to monitor the Correspondent Broker's activity. The Clearing Broker has to arrange for capital and assets to be transferred to settle trades of the Correspondent Broker. For example, if a Hedge Fund short sells hard-to-borrow securities near the close of the market through the Hedge Fund's proprietary system and the market price rises after the close due to unexpected good news, the Clearing Broker is at risk. Therefore, the Clearing Broker must set conservative limits for its Correspondent Brokers because of inadequate risk management capabilities. This limits the Clearing Broker's business volumes.

Figure 3:
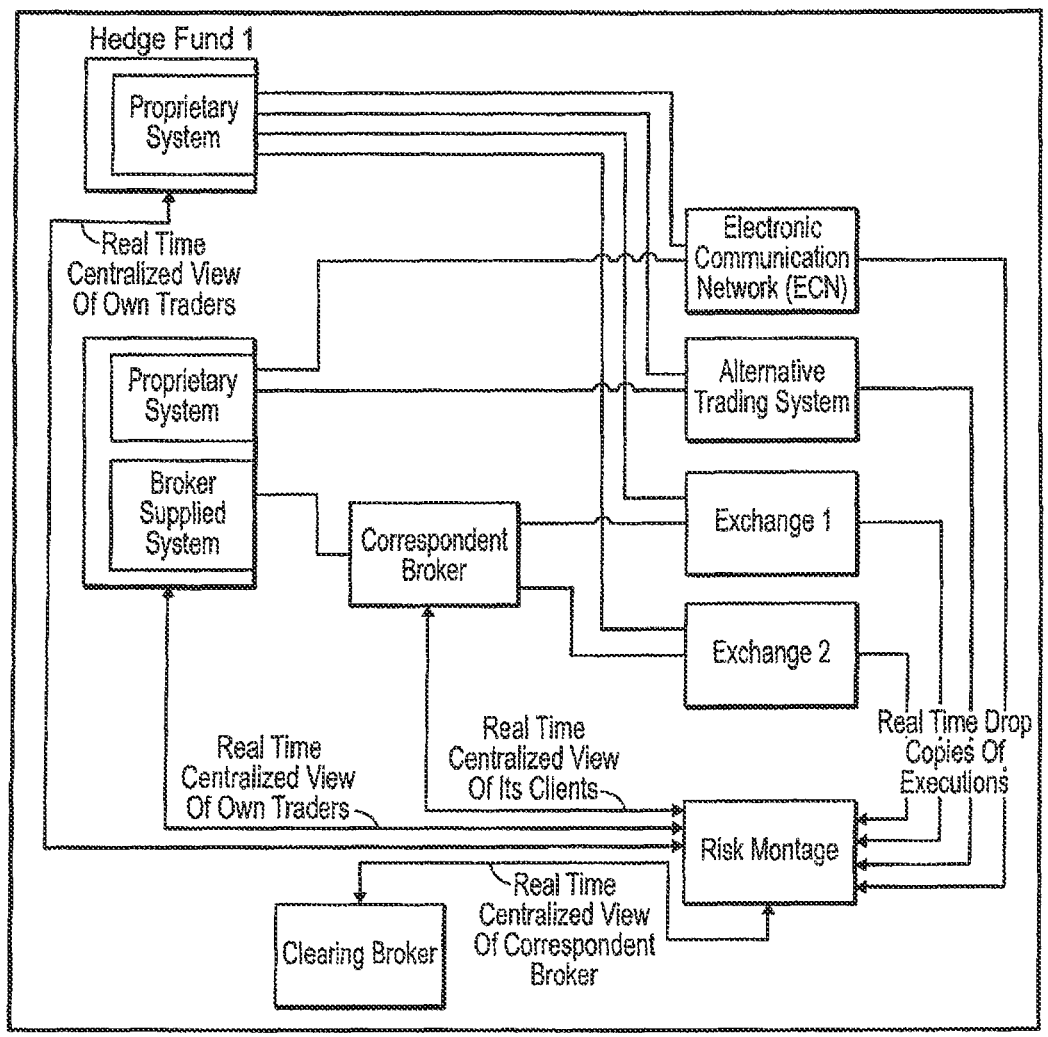
FIG. 3 is a flow diagram of an example of a system in accordance with at least one embodiment described herein.
Figure 4:
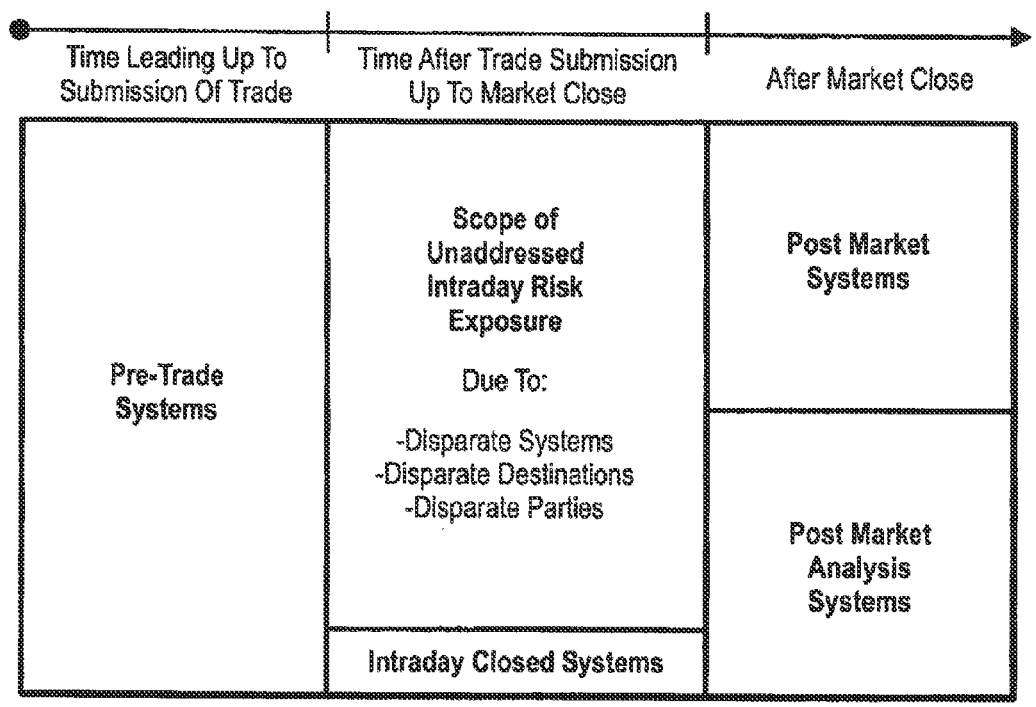
FIG. 4 is a schematic illustrating an overview of the securities trading market.

As shown in FIG. 3, one aspect of the present invention is illustrated to manage operational risk for a Clearing Broker. The system 10 connects to various destinations (ECN, ATS and Exchanges) to receive drop copies of executions on a real time basis.

The system 10 interfaces with the various liquidity destinations 30, such as market places, to collect real time electronic copies ("drop copies") of executions and notifies the users in real time of the transactions. The transactions are collected by the aggregation component 22 and then transferred to the analysis component 24 to evaluate the transactions against user criteria 60, such as a broad set of user defined rules, internal account balances and external risk management systems to determine what, if any, actions need to be taken. The action component 28 can queue a notice alert to a user or another system to make sure that the user is aware of the current state of the monitored transactions. The system 10 can also create an action response to offset the impacts of the transaction that the system 10 evaluates. The offsetting transactions can occur on the monitoring networks or on networks that are currently not being monitored by the system 10. Based on the user criteria 60, the system can require automatic execution of an offsetting transaction, or manual approval before execution.

Other examples of potential applications of the present invention are discussed herein with respect to the U.S. financial securities market. The Clearing Broker can upload the following data into the system at the start of the day: a) cash position for each account; b) asset position for each account; c) account details; d) hard to borrow (HTB) symbols and quantity limit; e) restricted symbols; and f) buying power. The Clearing Broker can define the following risk parameters: a) buying power; b) single order quantity limit; c) single order value limit; d) whether short selling is allowed; and e) assets in which trading is not allowed; f) quantity limit in hard to borrow assets. The aforementioned are examples of inputs to a rules engine within the system that can be submitted electronically or manually thru a terminal connected to the invention via the Internet; other parameters could be input as well.

The system 10 can assign account hierarchy to each trade based on account parameters or rules. If the account cannot be identified, then the trade is assigned to a 'suspense' account. The user can have the ability to assign trades in suspense account to various accounts. The system 10 can update each position based on the account.

The system 10 can check for the following risk or other parameters and raise an alert if any of the defined parameters or rules are violated: a) short sell trade in 'hard-to-borrow' securities. (The user may assign allowable short sell quantities in hard to borrow securities for each account.); b) trade in 'restricted' securities; c) trade quantity is greater than permitted 'single order' quantity limits; d) trade value is greater than permitted 'single order' value limits; e) a short sell trade by a user restricted from short sells; f) the exposure exceeds permitted buying power limits; and g) selling asset without inventory. The system 10 can check for trading patterns that could have significant market risk, such as portfolio concentration, heavy exposure in illiquid symbols, trading in low priced security, traded volume as percentage of market volume, and trading in highly volatile securities and can also reflect real time realized and unrealized profit and loss.

The user can request notice alerts by way of computer screen popup and/or sound prompts, e-mail message, Instant Messenger, voicemail, pager or facsimile transmission.

The system could also generate an action response in the form of a contra trade to close out a position if a client violates trading parameters or rules. For example, suppose Hedge Fund 1 short sells a hard-to-borrow security at the ECN. The system 10 receives a drop copy of the transaction and checks the transaction against hard-to-borrow securities and finds that a rule has been violated. The action component 28 immediately sends a notice alert to Hedge Fund 1, Correspondent Broker and Clearing Broker. Clearing Broker sees the violation and decides to reverse the transaction (close the position). The Clearing Broker could attempt to minimize the impact of the transaction by buying in the futures market or buying call options in the options market or buying the asset in Europe.

The system 10 can be arranged to collect data from the liquidity destinations 30 as described in the various embodiments above, then the data can be output to other system(s) and network(s). This way, the system can collect the data from use with other risk management analysis programs to meet specific needs and requirements and strategies of other companies. For example, the data collected from the system 10 can be augmented with the information and capabilities of the technologies of other risk management companies.

System and Method for Monitoring Market Transaction Activity Data

Figure 5:
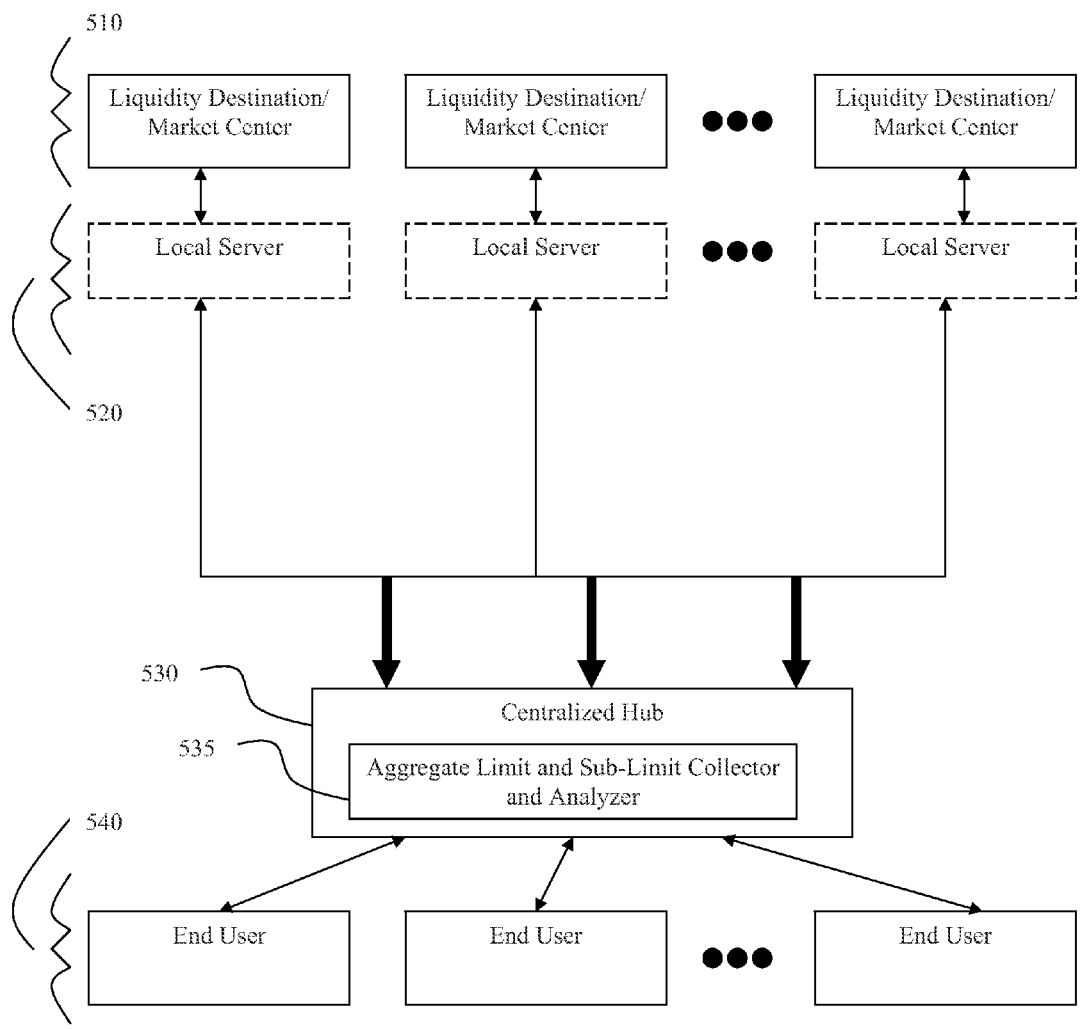
FIG. 5 is an illustration of a market transaction activity system configured such that a centralized hub is capable of tracking trading activity for a particular trading entity for purposes of determining when that trading activity has exceeded an aggregate trading limit based on trading sub-limits assigned by one or more custodial prime brokers facilitating trading for that trading entity, in accordance with one at least one embodiment described herein.

FIG. 5 is a data flow diagram 500 illustrating the flow of information in a data processing system capable of monitoring market transaction activity data from a plurality of liquidity destinations/market centers 510. For instance, the plurality of liquidity destinations/market centers 510 is analogous to the liquidity destinations 30 of FIG. 1. As shown in FIG. 5, market transaction activity data from the plurality of liquidity destinations 510 are shipped to a centralized hub 530. Further processing of the market transaction activity data may occur at various locations. For instance, in one embodiment, the centralized hub 530 receives raw market transaction activity data in real time from each of the liquidity destinations 510 that is trading at least one financial article of trade. Thereafter, the centralized hub 530 provides further processing of the market transaction activity data. In another embodiment, one or more local servers 520 collects real time data at each of the liquidity destinations 510, that is trading at least one financial article of trade. The market transaction activity data is further processed at these local servers 520 and then sent to the centralized hub 530. In still other embodiments, the collection and processing of market transaction activity data can occur at a combination of locations, to include local servers at liquidity destinations and the centralized hub.

More particularly, the centralized hub 530 is capable of receiving the market transaction activity data from each of the liquidity destinations 510, whether the data is raw or already processed. Thereafter, the centralized hub 530 is capable of analyzing the data in order to separate out the trading activity of a single trading entity. In this manner, the centralized hub 530 is capable of tracking the trading activity of a single trading entity.

The financial article of trade data processing system 500 of FIG. 5 is capable of identifying particular conditions within the market that are of interest to users of the processing system. In particular, the aggregate limit and sub-limit collector 535 is capable of collecting the data associated with a particular trading entity. For instance, the data collected is in regards to daily or overall trading activity for that trading entity. The analyzer 535 is capable of comparing the collected information relating to trading activity for that trading entity and comparing the information to predefined aggregate trading limits based on one or more trading sub-limits assigned by custodial prime brokers to the trading entity, as will be described more fully below.

The term "trading entity" is meant to include various types of entities. For instance, a trading entity may be any party that is involved in executing a financial article of trade. As such, the trading entity may be an individual associated with a market participant identifier (MPID), broker, prime broker, clearing house, etc. In addition, the term "prime broker" is meant to include any entity that facilitates the trading activity of a particular trading entity. This includes a broker, bank, brokerage house, clearing house, etc.

In particular, the trading entity has relationships with one or more prime brokers who facilitate execution of trading financial articles of trade on one or more liquidity destinations for that trading entity. Each of the prime brokers may have established a trading limit, also referred to as a trading sub-limit, for executing trades for that trading entity. For instance, a prime broker may have set a trading sub-limit of one-hundred thousand dollars to act as a daily ceiling of trading activity. Other examples of trading sub-limits include a total financial amount of trades associated with a particular trading entity, no matter the time period. Still other examples of trading sub-limits, and limits based on those sub-limits are envisioned. As such, when the trading entity exceeds the trading sub-limit amount for trades executed with that prime broker, the prime broker will cease execution of further trades for that trading entity. This analysis may consider overnight positions of the trading entity, in one embodiment. This tracking process can be accomplished either internally by the prime broker, or by embodiments of the present invention. That is, the centralized hub 530 is able to track the trading activity of the trading entity for a particular prime broker and determine when that trading entity has exceeded its trading sub-limit for that prime broker.

In another embodiment, the present invention is able to extend the coverage of the trading sub-limit set by a particular custodial prime broker across the market for trades by a particular trading entity with regard to which such prime broker serves as custodial broker but which trades may be executed through another prime broker. That is, the sub-limit set by one prime broker is applied to trades executed on behalf of that trading entity with regard to which such prime broker serves as custodial broker. For instance, the centralized hub is capable of tracking trading activity by that trading entity across all liquidity destinations. The centralized hub is able to keep a running total of the amount executed in trades associated with the trading entity across all liquidity destinations involving any and all prime brokers. As such, the centralized hub is able to track the trading activity of the trading entity using one or more prime brokers and determine when that trading entity has exceeded its sub-limit for any trades associated with any particular custodial prime broker. In one embodiment, the overnight position of the trading entity is taken into consideration.

By enabling the sub-limit for a particular custodial prime broker to be applied to trades executed across using any and all prime brokers on any liquidity destination, this allows that custodial prime broker, which is holding pledged assets and/ or which may have extended credit, to take into account "away" trades executed by the trading entity. As discussed previously, the assets backing an away trade are not held by the executing prime broker making the trade, but are actually held by the custodial prime broker and any additional credit backing an away trade that was not extended by the executing prime broker making the trade, but were extended by the custodial prime broker. Normally, the away trades are hidden from the custodial prime broker. In particular, the amounts involving away trades are hidden from that prime broker. However, embodiments of the present invention are able to account for those away trades and associate those away trades with a trading entity. As such, any trading sub-limit placed on that trading entity may be compared to the trading activity of that trading entity across all liquidity destinations which is associated with a particular custodial prime broker.

In still another embodiment, information regarding each execution of a financial article of trade includes where the assets and/or credit backing that trade are held. For instance, if a trade is executed by Prime Broker B, acting as a non-custodial prime broker, but the assets and/or credit backing that trade are held and/or extended by Prime Broker A, acting as a custodial prime broker, that information is collected by the centralized hub 530. In that case, trades executed on behalf of a trading entity, and using assets and/or credit that are backed and/or extended by a particular prime broker can be tracked. That custodial prime broker may set a trading sub-limit based on the assets held and/or credit extended by the prime broker on behalf of the trading entity. As such, the centralized hub is able to track the trading activity of the trading entity that is using one or more prime brokers, parse out a sub-set of trades, from an overall set of trades associated with the trading entity, that are pledged against assets and/or credit of a particular prime broker, track the trading activity of the trading entity for trades pledged against those assets and/ or credit forming the sub-set of trades, and determine when that trading activity involving the sub-set of trades has exceeded its trading sub-limit for the custodial prime broker holding those assets and/or extending that credit.

In addition, the trading entity may have multiple relationships with various custodial prime brokers. Each of the prime brokers may have established a trading sub-limit for that trading entity. For example, Prime Broker A may have a sub-limit of three-hundred thousand dollars with the trading entity, Prime Broker B may have a sub-limit of half a million dollars with the trading entity, and Prime Broker C may have a sub-limit of one million dollars with that trading entity. For various reasons, the sub-limit set by one prime broker for a trading entity is private information, and hidden from other prime brokers.

In one embodiment, the trading sub-limit of each of the prime brokers in association with a trading entity are totaled to create an aggregated limit. In the above example, for the trading entity in question, the aggregated limit includes sub-limits for Prime Broker A ($300,000), Prime Broker B ($500,000), and Prime Broker C ($1,000,000). As such, the aggregated limit is $1,800,000 for that trading entity.

One embodiment of the present invention is able to extend the coverage of all the trading sub-limits set by one or more prime brokers across the market for trades made by that trading entity. That is, the aggregate trading limit, based on trading sub-limits for associated prime brokers or custodial prime brokers, is applied to trades executed on behalf of that trading entity. The trading sub-limits for each of the prime brokers is known to the system of the present invention. For instance, the centralized hub 530 is capable of tracking trading activity by that trading entity across all liquidity destinations. The centralized hub 530 is able to keep a running total of the amount executed in trades associated with the trading entity across all liquidity destinations involving any and all prime brokers. As such, the centralized hub 530 is able to track the trading activity of the trading entity using one or more prime brokers and determine when that trading entity has exceeded its aggregate trading limit for all associated prime brokers. In one embodiment, the overnight position of the trading entity is taken into consideration.

Moreover, embodiments of the present invention enable users to take action promptly on an intraday basis to minimize market exposure of a trading entity that is executing trades with multiple prime brokers. In particular, the financial article of trade data processing system 500 of FIG. 5 is capable of identifying particular conditions within the market that are of interest to users 540 of the processing system. As a result, once those market conditions are identified and notification of such is presented, the users 540 can react accordingly to address those market conditions. For instance, whenever a trading sub-limit assigned by a prime broker to a trading entity has been exceeded for trades executed on behalf of that trading entity across one or more, or all liquidity destinations and across one or more, or all prime brokers, notice of such event may be given. In one embodiment, those trades are backed by assets and/or credit from the prime broker assigning the sub-limit. The notice may be given to the prime broker whose sub-limit has been exceeded. Alternatively, or in conjunction with the above, an instruction is given to all liquidity destinations to cease all transactions, or a specific subset of transaction, involving that trading entity. Additionally, whenever an aggregate limit, based on trading sub-limits for all associated prime brokers, for a particular entity has been exceeded for trades executed on behalf of that trading entity across one or more, or all liquidity destinations and across one or more, or all prime brokers, notice of such event may be given. That notice may be given to one or more prime brokers whose sub-limits are involved. Alternatively, or in conjunction with the above, an instruction is given to all liquidity destinations to cease all transactions involving that trading entity, or a specific subset of transactions.

A system and method for monitoring market transaction activity data to determine when a trading entity has exceeded an aggregated trading limit consisting of one or more trading sub-limits corresponding to prime brokers facilitating trades for the trading entity is thus described.

System and Method for Cancelling Pending Orders of Financial Articles of Trade

Figure 6A:
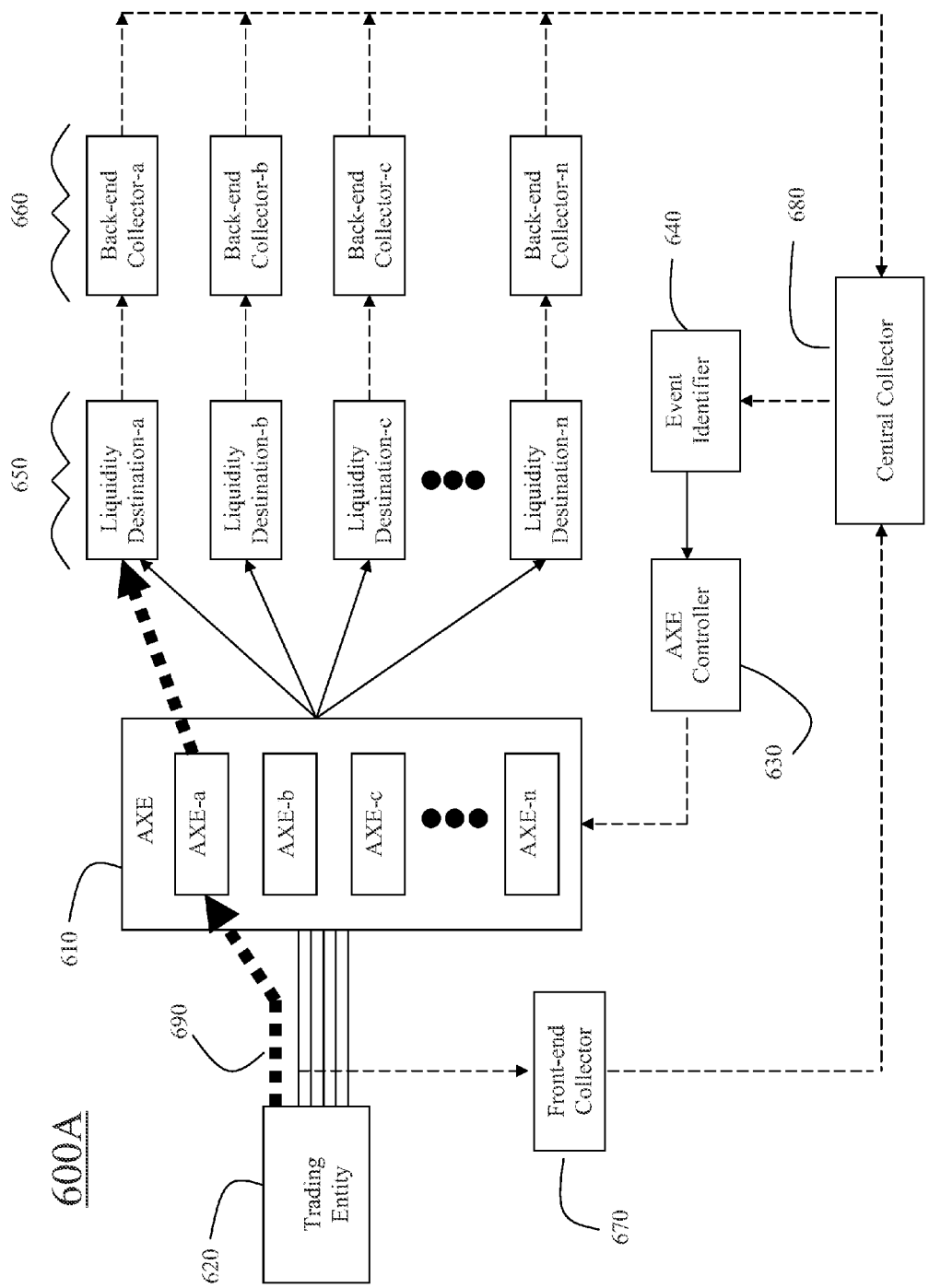
FIG. 6A is an illustration of a system that is capable of quickly executing cancellation instructions on pending orders for financial articles of trade, in accordance with at least one embodiment described herein.

Reference is now made to systems and methods for performing pre-trade and/or at-trade risk analysis on an order by order basis. In accordance with at least one embodiment, FIG. 6A is an illustration of a data processing system 600A that is capable of monitoring market transaction activity data from a plurality of liquidity destinations 650 and quickly executing cancellation or alteration instructions on pending orders for financial articles of trade with one or more liquidity destinations. The financial article of trade data processing system 600A includes various functions, which may be implemented to perform consolidation and analysis of intraday issues related to submitted securities, commodities, options, futures transactions, and other financial articles of trade transactions.

As shown in FIG. 6A, a trading entity 620 is associated with financial articles of trade being processed and executed through the market. The term "trading entity" is meant to include various types of entities. For instance, a trading entity 620 may be any party that is involved in executing a financial article of trade. As such, the trading entity 620 may be an individual associated with a market participant identifier (MPID), broker, prime broker, clearing house, etc. In one particular implementation, the trading entity 620 is associated with an algorithmic program that acts on behalf of the trading entity 620 in placing various instructions involving the execution of financial articles of trade within the trading market. In addition, the term "prime broker" is meant to include any entity that facilitates the trading activity of a particular trading entity 620. This includes a broker, bank, brokerage house, clearing house, etc.

In particular, the trading entity 620 has relationships with one or more prime brokers who facilitate execution of trading financial articles of trade on one or more liquidity destinations for that trading entity 620. Though not shown, the trading entity 620 may be acting through one or more prime brokers for facilitating access to one or more liquidity destinations a-n that make up the plurality of liquidity destinations 650. Also, the trading entity 620 may be directly accessing one or more liquidity destinations a-n through sponsorship by a particular prime broker (e.g., sponsored access). As a result, the trading entity 620 has access to one or more liquidity destinations a-n, either through a representative prime broker, or on behalf of a representative prime broker, such as through sponsored or naked access.

In particular, the trading entity 620 establishes one or more communication sessions with one or more liquidity destinations a-n so that the trading entity 620 can place orders for the purchase, sale, and/or other type of transactions of securities, commodities, and other financial articles of trade. In one instance, the liquidity destinations a-n are analogous to the plurality of liquidity destinations 30 of FIG. 1. Each communication session is established between the trading entity 620, or a representative of the trading entity 620, with a corresponding liquidity destination. For purposes of this Application, the communication session facilitates interaction between the trading entity 620, or its representative, and the corresponding liquidity destination (e.g., liquidity destination a). In general, a communication session may be defined as a logical connection between two parties and includes a sequence of communication messages (e.g., requests and responses) between the two parties participating in the communication session. The communication session may exist for prolonged periods of time, and last until the session is dismantled. Various protocols may be used to establish and manage the communication session between the two parties (e.g., Transmission Control Protocol/Internet Protocol, etc.).

In addition, the communication session occurs over a dedicated path through a communication network of various network devices (e.g., routers and switches), in one embodiment. The dedicated path communicatively connects and/or couples the two parties at either end for multiple purposes, including the sending of transactions of financial articles of trade. The path may be viewed as a logical or physical path between the two parties. More particularly, each message of the communication session is delivered through the network using the same devices that defines the deterministic point on the path through the network. This dedicated path may actually manifest itself as more than one physical path to allow for automatic failover.

For instance, as shown in FIG. 6A, the trading entity 620 has established one or more communication sessions with one or more liquidity destinations a-n to facilitate trading of one or more financial articles of trade. As an illustration, the trading entity 620 may access the market using one or more prime brokers, which in turn as a whole is accessing one or more liquidity destinations a-n. In addition, the trading entity 620 may directly access the market through corresponding liquidity destinations.

More particularly, for each communication session, the trading entity 620 establishes a connection with a corresponding liquidity destination. As a representative example, as shown by the dotted and bolded line, a connection 690 is made between the trading entity 620 and liquidity destination-a to facilitate a corresponding communication session between the parties. It is important to note that the trading entity 620 may establish and have one or more communication sessions over one or more connections with a particular liquidity destination, such as liquidity destination-a. This is especially true when the trading entity 620 deals with a large volume of financial articles of trade with that particular liquidity destination.

The connection between the trading entity 620 and the liquidity destination-a establishes the network path for a communication session between the two parties, and may be viewed as a physical or logical connection. More particularly, the connection between the trading entity 620 and the liquidity destination-a establishes dedicated network devices that are used over the network path. These same devices are used throughout the communication session, in one embodiment, and may also be used to provide other services beyond supporting the communication session.

In one embodiment, the connection 690 between the trading entity 620 and the liquidity destination includes an AXE module 610. For instance, in the above example, the connection 690 establishing the communication path between the trading entity 620 and liquidity destination-a, as shown by the dotted and bold line, includes AXE-a, a component of module 610. More specifically, each AXE component acts as a gateway to one or more corresponding liquidity destination(s). For instance, the AXE component-a could be a switch, such as a logical switch, or a physical switch (such as a network switch or a mechanical device to sever a physical link) As a gateway, the AXE module 610 adds little or no latency to time-to-market values, in that the AXE module 610 merely passes through any messages delivered in the corresponding communication session.

The location of the AXE module 610 in FIG. 6A is provided for illustration. It is contemplated that the AXE module 610 may be situated in various locations of the corresponding network path. For instance, the AXE module 610 may be jointly located at a liquidity destination, a trading entity 620, or a representative of the trading entity 620, or may be remotely located from the liquidity destination, trading entity 620, or the representative of the trading entity 620. Additionally, the AXE components a-n are shown in FIG. 6 within AXE module 610 as a representative example. It is contemplated that AXE components may be situated at any location within a network path between the trading entity 620 and a corresponding liquidity destination. As such, the AXE module 610 may be a logical or physical representation of the various AXE components a-n that may be situated at any point within the various network paths between the trading entity 620 and a corresponding liquidity destination. In any of the locations, the AXE module 610 or AXE components of module 610 remain within the path between the trading entity 620 and the corresponding liquidity destination, even if different network devices are used to account for automatic failover.

As shown in FIG. 6A, the overall AXE module 610 may comprise one or more underlying AXE components a-n, wherein each underlying AXE component services one or more communication sessions with one or more liquidity destinations. In one embodiment, one AXE component may service one communication session between the trading entity 620 and a single liquidity destination. In another embodiment, the AXE component may service more than one communication session established between the trading entity 620 and a single liquidity destination. In still another embodiment, the AXE component may service more than one communication session established between the trading entity 620 and multiple liquidity destinations.

In addition, each AXE component a-n is capable of terminating or altering one or more communication sessions over one or more network paths or connections, each of which includes that AXE component. The instruction to terminate or alter a communication session is provided by the AXE controller 630, which controls the functions of one or more corresponding AXE components a-n. It is contemplated that one or more AXE controllers may be used cooperatively to control AXE components a-n. Termination or alteration of a communication session is achieved logically or physically through implementation of the AXE component. In the logical case, the AXE logically severs the connection between the trading entity 620 and the corresponding liquidity destination. In the physical case, the AXE physically severs the connection between the trading entity 620 and the corresponding liquidity destination. In either case, termination begins a TCP Teardown process for both parties, when the protocol being used to establish and maintain the corresponding communication session is TCP/IP, in one embodiment. In those circumstances where TCP/IP is not the protocol used to establish and maintain the communication session, a session termination action applicable to that communication session and/or its accompanying protocol could be used for terminating that session.

In still other embodiments, rather than initiating the termination of the communication session, the AXE component or third party component may alter the communication session. Altering the communication session may provide similar results as in terminating the session (e.g., initiating a Cancel-on-Disconnect process at the corresponding liquidity destination), or it may perform other functions that may cancel one or more orders, or initiate the cancellation of one or more order, or modify/alter one or more orders, or initiate the modification/alteration of one or more orders.

By terminating or altering a communication session between the parties, the corresponding liquidity destination is automatically notified to initiate a process that cancels or alters pending orders of financial articles of trade delivered over the communication session. For example, the trading entity 620 has delivered orders (e.g., buy and sell orders) for financial articles of trade to liquidity destination-a over the communication session. Some of those orders may have been filled by that liquidity destination-a, while other orders remain pending or unfilled by liquidity destination-a, and are known as resting orders. For those resting orders, the corresponding liquidity destination-a begins an internal process to cancel or alter any pending orders that are remaining In an alternative embodiment, the AXE controller 630 is able to communicate with a third party interface that is able to alter the behavior of a component on the network path supporting the corresponding communication session in response to an identification of an event. The communication may occur in-band to communicate with components on the network path, or out-of-band to communicate with devices that are not on the network path but are able to alter the behavior of components on the network path. That is, instead of communicating with the AXE component 610, the controller 630 is communicating with the third party interface associated with the third party component. For instance, the component on the network may be the liquidity destination, or some other network component that, when signaled by the AXE controller 630, is able to alter its behavior, such as in a predetermined manner in response to the signal. As an example, upon receiving the signal, the component may initiate some action that terminates or alters the corresponding communication session, or may initiate some action that alters/modifies an order, or cancels the order.

In still another embodiment, one or more of the plurality of liquidity destinations 650 offer a separate interface to request the clearing of the order flow. As such, the AXE controller 630 interacts with the corresponding liquidity destination through this separate interface to send a command to the liquidity destination to terminate or alter the trading flow over the corresponding communication session. Termination or alteration again notifies the liquidity destination to perform a "Cancel-on-Disconnect" process for pending orders relating to the corresponding trading entity.

This internal process is typically initiated when there is an unwanted service failure in the communication session and/or the connection servicing the communication session. For example, the internal process is sometimes referred to as a "Cancel-On-Disconnect" service feature provided by the liquidity destination. This internal process is intended to limit any damages incurred by the trading entity 620 when a communication session is nonpurposefully dismantled that otherwise would be avoided through continued trading over the communication session.

However, in embodiments of the present invention, the internal process is purposefully invoked as part of a risk management strategy, as well as an investment strategy. For instance, with regards to risk management, the process for cancelling or altering pending orders of transactions of financial articles of trade is initiated and executed when it is determined that the trading entity 620 is not complying with risk management parameters. In addition, the process for cancelling or altering pending orders is initiated and executed when the automated trading strategy, as implemented through a trading algorithm, has failed (e.g., equipment failure) or is not functioning properly. Also, with regards to implementation of an investment strategy, instead of a protective measure to hold the position of a trading entity 620 when service networks fail, embodiments of the present invention actively invoke the cancellation or alteration process at each liquidity destination as part of a pro-active investment strategy for a trading entity 620, wherein the investment strategy may include the risk management strategy discussed above. As such, a single command, or a minimal number of commands, to terminate or alter all communication sessions supporting the activity of a trading entity 620 will initiate the internal process (e.g., Cancel-on-Disconnect) to cancel or alter pending orders of transactions of financial articles of trade at each corresponding liquidity destination. Using the AXE module 610 to terminate or alter communication sessions utilized by the trading entity 620 enhances the capability of the trading entity 620 to control its actions. Specifically, rather than sending out a high number of cancellation messages (e.g., potentially millions of cancellations) to a plurality of liquidity destinations, wherein each cancellation message is targeted to a specific order of a financial article of trade, the present embodiment is capable of sending out a single instruction or a minimum number of instructions to terminate or alter communication sessions related to or used by that trading entity 620 that effectively initiates a cancellation or alteration process for all pending orders for financial articles of trade held by that trading entity 620. As such, each instruction effectively cancels or alters one or more pending orders at a corresponding liquidity destination.

The decision to terminate or alter a communication session for a trading entity 620 is also made by the data processing system 600A of FIG. 6A. The decision is based on market activity (both generally market data as well as data specific to the trading group or entity being monitored) that is monitored by the data processing system. In particular, as shown in FIG. 6A, a central collector 680 collects real-time data to include transactions of financial articles of trade. In one embodiment, a plurality of back-end collectors 660 collects transaction information directly from each liquidity destination throughout a trading period, and in real-time. The plurality of back-end collectors 660 includes one or more back-end collectors a-n. Although back-end collectors a-n are shown in FIG. 6A in a one-to-one relationship with a corresponding liquidity destination, a back-end collector may collect information from more than one liquidity destination, or the central collector 680 may provide some or all of the collection capabilities for the data processing system 600A.

More specifically, information collected includes transactions that are submitted to a corresponding liquidity destination as well as transactions that have been executed by the corresponding liquidity destination. In this manner, by collecting information directly from each liquidity destination, a picture of the market may be generated that can broadly cover the entire market, or that can be narrowed to give a picture involving some or all of the transactions related to or origination from a trading entity. In a sense, the information collected relating to submitted transactions provides a viewpoint of the market at the time of the trade ("at-trade"). Also, information collected relating to executed transactions provides a post-trade viewpoint of the market. This at-trade and post-trade market transaction activity information is submitted to the central collector for further processing. In another embodiment, there can be a collector that receives information directly from the trading system of the trading entity 620 rather than the exchange itself to allow more transaction detail to flow into the data collector 680 since what is visible from the exchange data is potentially not as detailed as what the underlying trading system knows about each trade (e.g. account, subaccount, etc). This is more fully described below in relation to the front-end collector 670.

Collection of information from each of the liquidity destinations as transactions are submitted ensures the integrity and objectivity of the data. In embodiments, if there is a central collector 680 that does receive data from the trading system of the trading entity 620 to get greater granularity of information, the central data collector 680 can still receive feeds directly from the exchanges as well, and from corresponding back-end collectors, wherein the central data collector 680 is capable of verifying that there are messages coming in from both sources that match at the transactional level. As such, the information collected by the central collector 680 can be viewed as a baseline of information from which other information can be compared, as will be described more fully below. For instance, the information collected may be used to improve a trading entity's 620 compliance with regulatory requirements.

In another embodiment, as previously described, information is collected directly from the trading entity 620 and/or related sources (e.g., prime brokers, etc.) utilized by that trading entity 620 to facilitate trading at least one financial article of trade over the plurality of liquidity destinations 650. For instance, a front-end collector 670 collects transaction information over the communication sessions before they are submitted to the plurality of liquidity destinations 650. In a sense, the information collected provides a pre-trade and/or at-trade viewpoint of the market. This pre-trade and/or at-trade market transaction activity information is submitted to the central collector 680 for further processing.

As shown in FIG. 6A, the central collector 680 collects and aggregates information from the various liquidity destinations 650 and/or directly from the trading entity 620. In addition, the information collected and aggregated may be normalized so that further processing of the market transaction activity data is possible. For instance, the central collector 680 receives disparate data from the plurality of liquidity destinations, where the disparate data includes information in varying formats. In another instance, the central collector 680 receives raw market transaction activity data in real-time from each of the liquidity destinations a-n that is trading at least one financial article of trade, optionally normalizes at least a portion of the information, and provides further processing of the market transaction activity data. It is envisioned that in some embodiments, each of the plurality of back-end servers 660 is capable of normalizing and processing the information collected at corresponding liquidity destinations. Thereafter, the processed information is then submitted to the central collector 680. As such, the central collector 680 is capable of receiving the data from each of the liquidity destinations a-n and/or the trading entity 620, whether the data is raw or already processed.

The financial article of trade data processing system 600A of FIG. 6A is capable of identifying particular conditions within the market that are of interest to the trading entity 620. For instance, a condition of a trading market may be defined by user parameters. As a result, an event identifier 640 monitors and processes the real-time market transaction activity data that is collected and normalized to help identify an event that matches the condition, as defined by parameters provided by the trading entity 620. By its association with the condition, whenever the event is identified, the event identifier 640 notifies the AXE controller 630 of its occurrence, upon which the controller 630 sends out the instruction to terminate or alter communication sessions that are associated with and/or utilized by the trading entity 620.

In some embodiments, the condition is related to transactions originating from, involving, or generally being associated with the trading entity 620. That is, market activity information is processed and consolidated to provide a view of the market activity for that trading entity 620. As such, conditions relating to risks, trends, outages, uses, etc. that are important to and reflective of that trading entity's 620 position within the market may be identified and immediately addressed through a cancellation or alteration process of the present invention.

In other embodiments, the condition includes but is not limited to transactions originating from, involving, or generally being associated with the trading entity 620. In still other embodiments, the condition does not specifically include transactions originating from, involving, or generally being associated with the trading entity 620. That is, there are market conditions that do not directly relate to the transactions associated with a specific trading entity 620, but which the trading entity 620 still tracks and monitors for purposes of initiating a cancellation or alteration process. For instance, the system 600A supporting one or more trading entities may have a cap on the total number of orders for transactions of financial articles of trade in a period. The cap is the condition. Once that cap has been met or exceeded by the trading entities as a group, an event matching the condition has occurred, and the process for initiating cancellation or alteration of pending orders is started by terminating the communication sessions associated with those trading entities. As such, even though a particular trading entity is entirely in compliance with its rules, a rule outside of the control of that trading entity may be exceeded, thus limiting the trading capability of that trading entity.

Figure 6B:
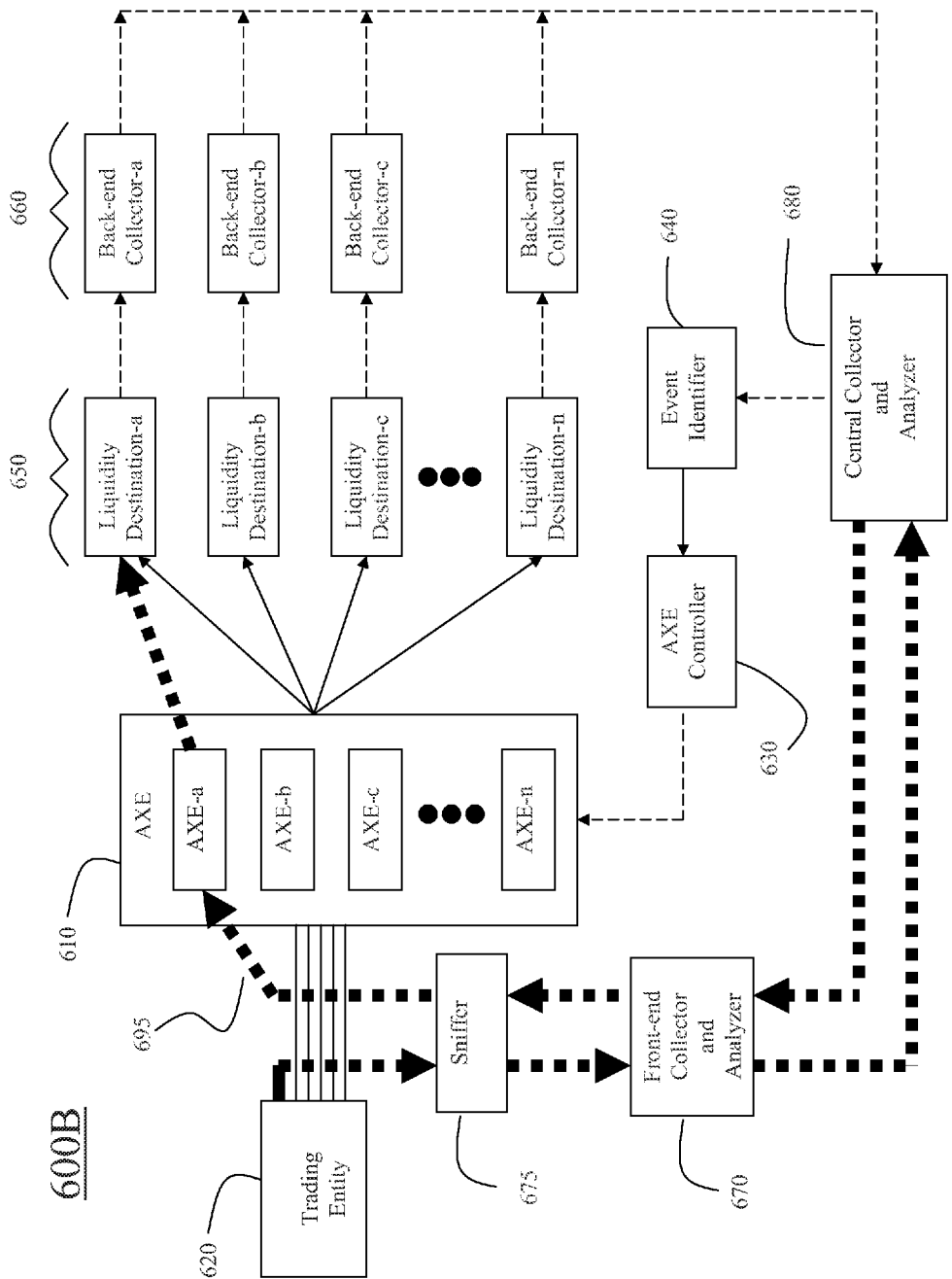
FIG. 6B is an illustration of a system that includes a sniffer that provides real-time sniffing, and is capable of quickly executing cancellation instruction on pending orders for financial articles of trade, in accordance with at least one embodiment described herein.

FIG. 6B is an illustration of a system 600B that includes a sniffer that provides real-time sniffing, and is capable of initiating cancellation or alteration instructions on pending orders for financial articles of trade, in accordance with one embodiment of the present invention. The system 600B provides similar features as the system 600A of FIG. 6A, and additional features, such as sniffer 675.

As shown in FIG. 6B, the connection 695 establishing a communication path between the trading entity 620 and the liquidity destination includes AXE component-a, as shown by the dotted and bold line. More specifically, AXE component-a acts as a gateway to a corresponding liquidity destination, as previously described. For instance, the AXE component-a could be a switch, such as a logical switch, or a physical switch (such as a network switch or a mechanical device to sever a physical link). As a gateway, the AXE component-a adds little or no latency to time-to-market values, in that the AXE component-a passes through any messages delivered in the corresponding communication session.

Connection 695 also includes sniffer 675 that is capable of providing real-time contemporaneous sniffing of communication packets sent in a communication session supported by connection 695. Sniffer 675 is capable of capturing and/or evaluating all data packets that pass over connection 695 between trading entity 620 and liquidity destination 650. The captured packets may be stored locally in association with sniffer 675, which is also configured to perform storing, processing, and analyzing functions. In addition, the data packets sniffed by sniffer 675 is passed along to other devices that perform storing, processing, and analyzing functions.

It is intended that the connection 695 and included devices are scalable to support one or more trading entities having one or more connections with one or more liquidity destinations, in various configurations.

In one embodiment, sniffer 675 captures packets sent along connection 695 and stores the packets without introducing material latency in the communication path. That is, sniffer 675 does not interrupt the traffic flow of data packets between trading entity 620 and liquidity destination-a. Additional processing may be performed on the captured data packets by additional back-end devices in parallel to the delivery of the packets to liquidity destination-a.

In another embodiment, sniffer 675 captures packets sent along connection 695, and forwards the data to back-end devices for further processing and storing. For instance, the captured packets are sent to front-end collector 670. Additionally, front-end collector 670 may provide local analysis of the data. As an example, front-end collector 670 may perform pre-trade and/or at-trade risk analysis to determine if any trade delivered on connection 695 meets established criteria and/or does not violate any identified pre-trade and/or at-trade risks. In addition, a live order book may be created asynchronous to the flow of data delivered on connection 695, though it is limited in scope to data packets delivered on connection 695 in this embodiment. Trades are analyzed locally to determine whether they should continue to be delivered to the liquidity destination-a, or whether they should be terminated for violation of any identified pre-trade and/or at-trade risks. As such, if there is a violation, front-end collector 670 is able to locally terminate the delivery of the trade. If there is no violation, the packets may at this point be delivered to AXE component-a, either directly or through sniffer 675, for continued delivery to liquidity destination-a. In another implementation, before the packets are delivered to liquidity destination-a, additional processing is performed by back-end devices, as will be described below.

In another embodiment, sniffer 675 captures packets sent along connection 695, and forwards the data to back-end devices for further processing and storing. That is, the packets are sent to central collector 680 for further processing. Because central collector 680 is capable of collecting pre-trade and/or at-trade information from additional trading entities, and back-end collectors servicing one or more liquidity destinations, a more enhanced view of the market is available. As such, the central collector 680 is able to perform more complex pre-trade risk and/or at-trade analysis on trades being delivered over connection 695 between trading entity 620 and liquidity destination-a. In addition, a more complete live-order book may be created by the central collector 680 that includes pre-trade and/or at-trade information for orders from one or more trading entities, as well as the information obtained from the one or more back-end collectors servicing one or more liquidity destinations previously described. Additional processes may also be performed by the central collector 680.

As such, front-end collector 670 is able to remotely terminate or alter the delivery of the trade over connection 695 if there is a violation of identified pre-trade and/or at-trade risks. If there is no violation, the packets may at this point be delivered to AXE component-a, either directly or through one or both front-end collector 670 and sniffer 675, for continued delivery to liquidity destination-a. Alternatively, if there is a violation of identified pre-trade risks, the packets may be modified so as not to violate the identified pre-trade risk checks by AXE component-a, either directly or through one or both front-end collector 670 and sniffer 675, and then released for delivery to liquidity destination-a.

Figure 7:
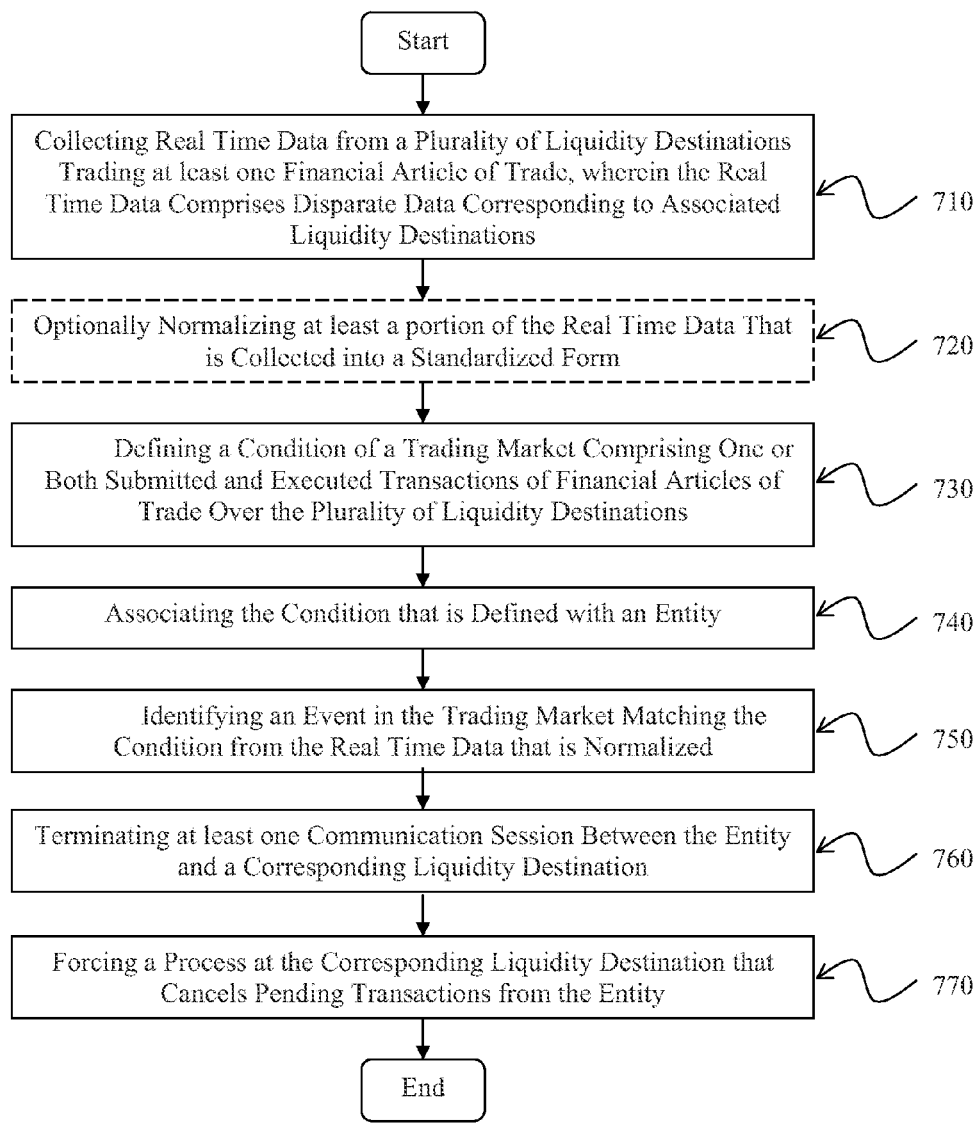
FIG. 7 is a flow diagram illustrating a method for distributing cancellation instructions for pending orders for financial articles of trade to one or more liquidity destinations, in accordance with at least one embodiment described herein.

FIG. 7 is a flow diagram 700 illustrating a method for monitoring market transaction activity data for purposes of initiating and distributing cancellation or alteration instructions for pending orders for financial articles of trade to one or more liquidity destinations, in accordance with one embodiment of the present invention. The systems 600A and 600B described in FIGS. 6A and 6B are suited for implementing the method of FIG. 7, in one embodiment. That is, the method for initiating and distributing one or more cancellation or alteration instructions is suited to cancelling or altering pending orders for transactions of financial articles of trade originating from, being associated with, or involving a trading entity.

As shown in FIG. 7, at 710, real-time data is collected from a plurality of liquidity destinations trading at least one financial article of trade. As previously described, the real-time data may include submitted and/or executed transactions of financial articles of trade that are collected directly from each liquidity destination. In addition, the real-time data may be collected directly from the trading entity or from sources utilized by the trading entity to facilitate execution of transactions of financial articles of trade.

At 720, at least a portion of the real-time data that is collected is optionally normalized into a standardized form. The various liquidity destinations present information in disparate formats, in that each liquidity destination uses its own protocol/format to process transactions of financial articles of trade, and as such, orders for transactions are submitted using that protocol/format. Normalizing the information into a standardized form facilitates additional processing and analysis of the information, instead of separately processing information in their native formatting. Normalization could occur at any point in the process. For instance, the information form the liquidity destination may be sent over in its native format, then subsequently processed in its native format, aggregated with other processed information, and then normalized. In another instance, the normalization occurs upon receipt of the information from a corresponding liquidity destination.

In one embodiment, this normalization process also includes symbology. That is, one or more symbols used by the various exchanges that are related to a particular trading activity (e.g., options) associated with a company, for example, is normalized to one symbol.

At 730, a condition of the trading market is defined, and at 740, the defined condition is associated with a trading entity. The information defining the trading market may include one or both of submitted and executed transactions of financial articles of trade over the plurality of liquidity destinations. That is, the information may describe the trading market in various states, such as an at-trade state when analyzing submitted transactions, or a post-trade state when analyzing executed transactions, or a combination of the at-trade and post-trade states to give a broader, overall picture of the trading market.

At 750, an event in the trading market is identified as matching the condition. Specifically, the real-time data that this normalized is analyzed to determine when parameters defining the condition occur, such that an event has occurred that matches the condition. As previously described, the condition may include, in part, or as a whole, transactions of financial articles of trade originating from, involving, or relating to the trading entity. For instance, the condition may describe certain risk levels for a particular segment of the market that may or may not include transactions originating from that trading entity.

Once the event is identified, one or more actions may be taken. For instance, in relation to FIG. 6A, once the event identifier 640 recognizes the condition signifying an event, a signal indicating an instruction may be generated by the event identifier 640 and delivered to a receiving entity to take action. For instance, the event identifier 640 sends a signal to the AXE controller 630 to take a particular action, in one embodiment. In another instance, the signal is sent directly to the AXE for the AXE 610 to take a particular action, without the need to communicate with the AXE controller 630. That is, in one instance, the AXE controller 630 and AXE component 610 are the same entity and performs the same functionality. In still another embodiment, the action taken is to terminate or alter corresponding communication sessions associated with the trading entity 620. This is more fully described below in relation to operation 760.

At 760, at least one communication session between the entity and the corresponding liquidity destination is terminated or altered in response to the occurrence of the event. That is, once the event is identified, one or more communication sessions is terminated or altered. Termination involves determining the trading entity that is associated with the condition, and determining which communication sessions are utilized by that trading entity. As previously described, a communication session facilitates delivery of orders of transactions of financial articles of trade originating from the trading entity to a liquidity destination. In one embodiment, all communication sessions between the trading entity and the plurality of liquidity destinations are terminated and/or altered.

Termination may be achieved logically or physically by an AXE component, previously described. That is, a logical termination of the communication session may be performed that acts to break-down the communication session. In another case, a physical termination of the communication session may be performed to break-down the communication session, that involves shutting down or breaking part of the connection servicing the trading entity and the corresponding liquidity destination. For instance, the connection may be physically de-coupled or logically de-coupled. In still another instance, a command session is used to instruct a third party to terminate or alter the communication session. That is, instead of using the AXE component, a third party, once signaled, will effectively alter the communication session, such as terminating the communication session, canceling or altering orders within the session, etc.

In one embodiment, termination of a communication session is achieved by inserting a switching means or causing a switch function or the like to be engaged in the connection servicing the communication session. In another embodiment, termination of a communication session is achieved by signaling a pre-existing switching means in the connection servicing the communication session. The switching means is located on the network path between the trading entity and the corresponding liquidity destination. As previously described, the switching means may include a logical switching means that logically disconnects the connection, or a physical switching means that physically disconnects the connection. Once it is determined that the communication session must be terminated or altered, the switching means is activated such that the connection is logically or physically de-coupled.

At 770, initiation of an internal process is forced at the corresponding liquidity destination by virtue of terminating the communication session. The internal process cancels or alters pending transactions originating from the trading entity over the communication session at the corresponding liquidity destination. As such, the present embodiment actively invokes a cancellation or alteration process at the liquidity destination for pending orders of transactions of financial articles of trade. In one case, the internal process initiated at the corresponding liquidity destination is a "Cancel-on-Disconnect" process. In this manner, through a single action, the trading entity through implementation of the present embodiment is able to cancel or alter pending orders of transactions of financial articles of trade, instead of sending individual cancellation instructions for each order.

Figure 8:
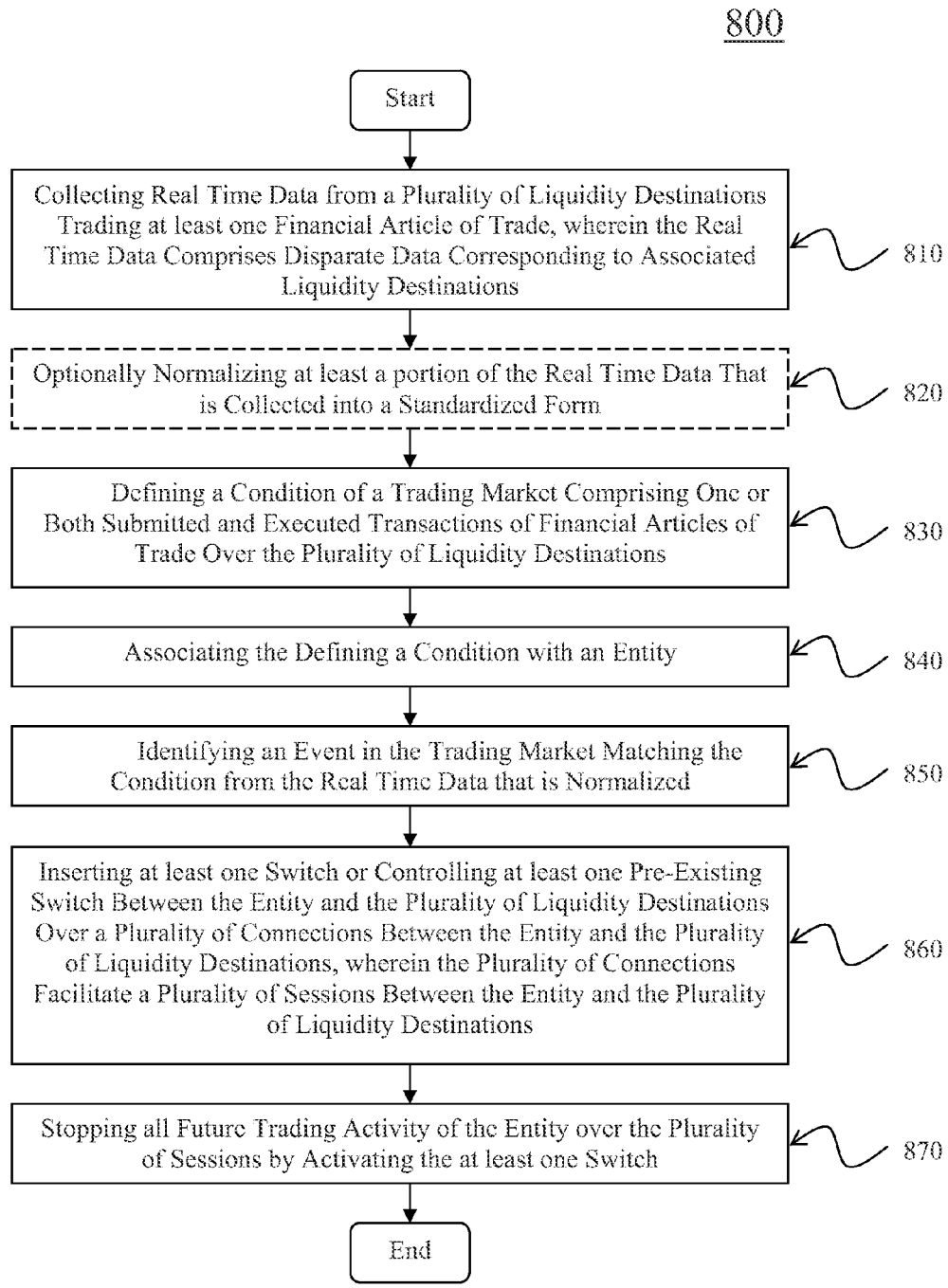
FIG. 8 is a flow diagram illustrating another method for distributing cancellation instructions for pending orders for financial articles of trade to one or more liquidity destinations, in accordance with at least one embodiment described herein.

FIG. 8 is a flow diagram 800 illustrating another method for distributing cancellation or alteration instructions for pending orders for financial articles of trade to one or more liquidity destinations, in accordance with one embodiment of the present invention. More specifically, the method outlined in FIG. 8 provides for disabling future trading activity of a trading entity.

The operations outlined in 810, 820, 830, 840 and 850 are analogous to 710, 720, 730, 740, and 750 of FIG. 7, and the discussions involving those operations of FIG. 7 are equally applicable to the above operations of FIG. 8. In summary, at 810, real-time data is collected from a plurality of liquidity destinations trading at least one financial article of trade, wherein the data includes disparate data corresponding to associated liquidity destinations. At 820, at least a portion of the real-time data is optionally normalized into a standardized form. At 830, a condition of a trading market is defined, where the condition may include one or both submitted and executed transactions of financial articles of trade. At 840, the defined condition is associated with a trading entity. At 850, an event in the trading market that matches the condition is identified.

At 860, at least one gateway or switch is inserted between the entity and the plurality of liquidity destinations, or at least one pre-existing gateway or switch is signaled between the entity and the plurality of liquidity destinations. More specifically, the gateway or switch is inserted or signaled in a plurality of connections between the entity and the plurality of liquidity destinations. In one implementation, a corresponding gateway is included or used for each connection between the trading entity and a corresponding liquidity destination. As previously described, each connection facilitates a corresponding communication session between the trading entity and a corresponding liquidity destination.

In a trading or risk management strategy implemented by the trading entity, the occurrence of the event indicates that all trading by the trading entity must cease. That includes orders that have been placed by the trading entity but not yet executed by the plurality of liquidity destinations. To facilitate ceasing of all future and present trading activity, the gateway or switch is activated, effectively terminating all communication sessions between the trading entity and the plurality of liquidity destinations. As a result, since the gateway is located on a connection between the trading entity and a corresponding liquidity destination, resting orders that have been placed and sent by the trading entity, but not yet executed by the liquidity destination, are intercepted and effectively canceled since the connection servicing the communication session has been severed, and the communication session terminated.

Additionally, all further orders still being placed by the trading entity over the communication session also will be stopped from delivery. That is, though the communication session is effectively terminated, the trading entity may not be aware of the termination, and may still be sending orders for transactions of financial articles of trade. Also, even though the trading entity may be aware of the termination of the communication session, it may still send orders for transactions of financial articles of trade in anticipation that the communication session may be restored. Accommodation may be made to permanently cancel all of these pending orders, even if the communication session is restored, in one embodiment.

Figure 9:
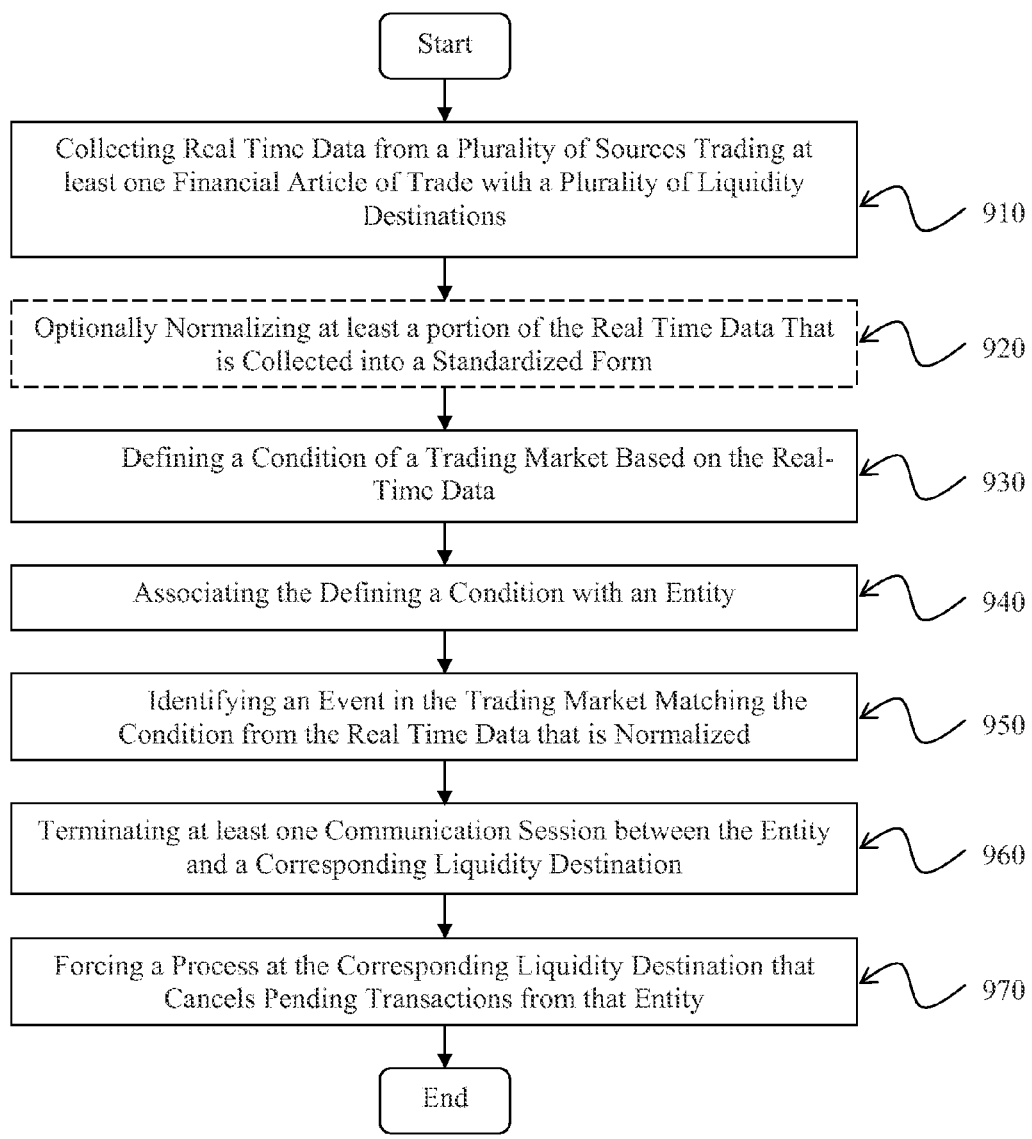
FIG. 9 is a flow diagram illustrating still another method for distributing cancellation instructions for pending orders for financial articles of trade to one or more liquidity destinations, in accordance with at least one embodiment described herein.

FIG. 9 is a flow diagram 900 illustrating still another method for distributing cancellation or alteration instructions for pending orders for financial articles of trade to one or more liquidity destinations, in accordance with one embodiment of the present invention. The collection of market transaction activity data is performed such that a pre-trade and/or at-trade view of the market is possible.

At 910, real-time data is collected from a plurality of sources trading at least one financial article of trade with a plurality of liquidity destinations. The sources are related to, are involved with, or are utilized by a trading entity to facilitate trading with the liquidity destinations. For instance, the transactions of financial articles of trade originate from the trading entity. In a particular embodiment shown in FIG. 6A, the real-time data is collected from one or more front-end collectors 670.

At 920, at least a portion of the real-time data that is collected is optionally normalized into a standardized form. At 930, a condition of a trading market is defined, wherein the trading market includes submitted transactions of financial articles of trade over the plurality of liquidity destinations. For example, conditions of a trading market may include price movement, a current volume in comparison to a normal volume, overall market activity in comparison to a single symbol, etc. In this manner, a pre-trade and/or at-trade view of the trading market may be generated that is specifically narrowed to reflect the position of the trading entity. At 940, the defined condition is associated with the entity.

At 950, an event is identified that matches the condition. That is, when analyzing the real-time data that is normalized, parameters of an event within the real-time data may match parameters defining the condition.

At 960, upon recognition of the event, at least one communication session between the trading entity and the corresponding liquidity destination is terminated or altered, as previously described. Specifically, the connection servicing the communication session is logically or physically broken. Termination of the communication session actively forces a process at the corresponding liquidity destination to cancel or alter pending transactions of financial articles of trade originating from that trading entity and delivered over the communication session.

Figure 10:
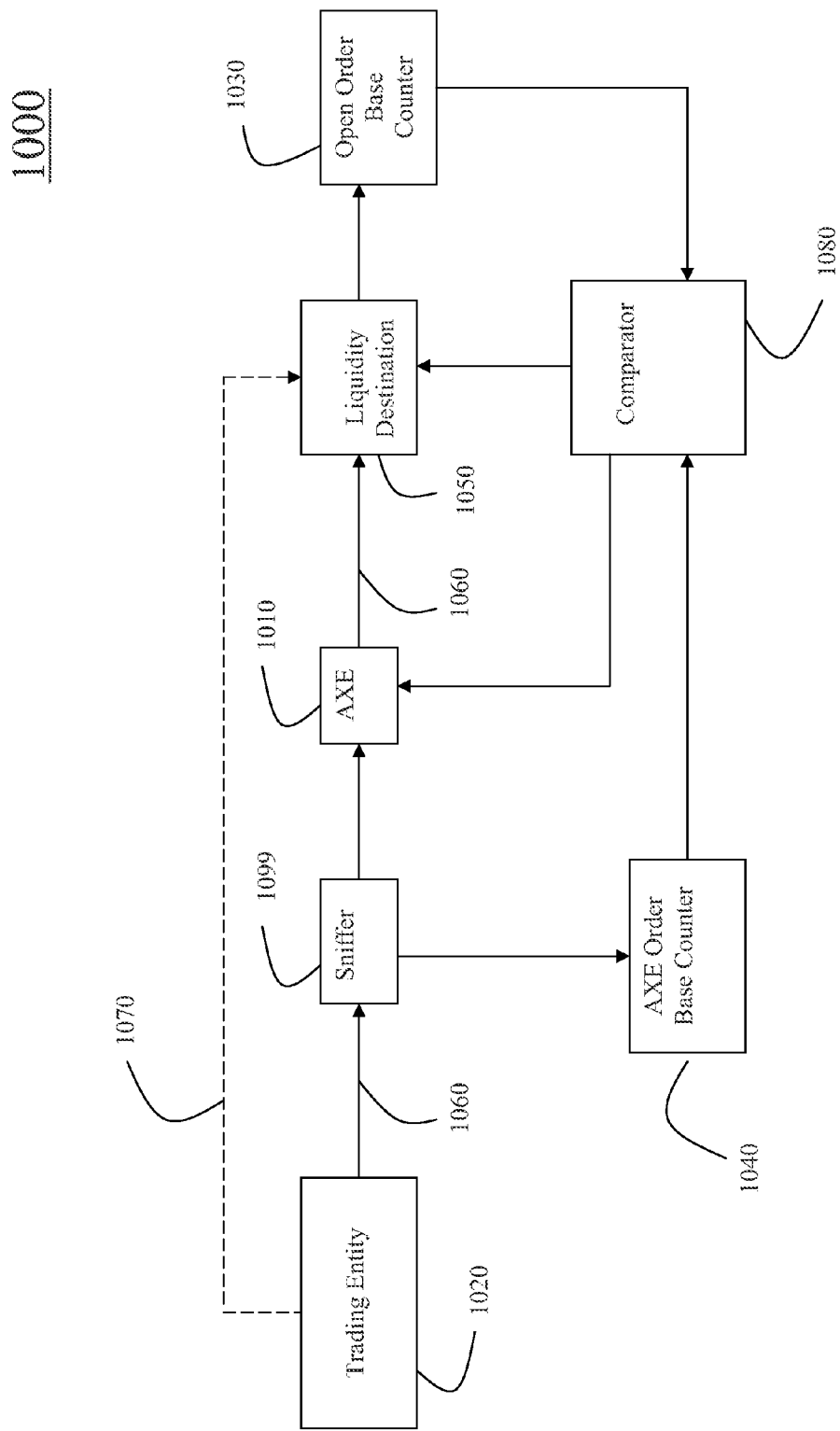
FIG. 10 is an illustration of a system that is capable of determining when a trading entity is bypassing mandatory paths for establishing communication sessions between the trading entity and a liquidity destination, in accordance with at least one embodiment described herein.

FIG. 10 illustrates a system 1000 for determining whether a trading entity 1020 is delivering the entirety of its orders for transactions of financial articles of trade through designated communication channels, in accordance with one embodiment of the present invention. It is intended for overall performance that the system and methods in FIGS. 6-9 include a trading entity that is fully cooperative, in that all orders for transactions of financial articles of trade be processed through the system 600A of FIG. 6A. However, there are instances when the trading entity is not fully cooperative. The system 1000 of FIG. 10 helps to identify when the trading entity 1020 is bypassing the dedicated communication sessions between the trading entity 1020 and various liquidity destinations 1050.

The components of FIG. 10 can be duplicated for multiple liquidity destinations, in various configurations. As such, the system 1000 of FIG. 10 is expandable to determine when the trading entity 1020 is bypassing any dedicated communication session between the trading entity and any one of a plurality of liquidity destinations.

As shown in FIG. 10, a communication session is established between a trading entity 1020 and a liquidity destination 1050. Specifically, a connection 1060 is made between the trading entity 1020 and the liquidity destination 1050, where the connection defines a network path between the two parties. In one implementation, the network path is dedicated to supporting the communication session. The connection 1060 may include one or more physical paths to accommodate for automatic failover. As previously described, an AXE component 1010 is located on the connection 1060 between the trading entity 1020 and the liquidity destination 1050.

In addition, a sniffer 1099 is located on the connection 1060 between the trading entity 1020 and the liquidity destination 1050. In one implementation, the sniffer 1099 is located between the trading entity 1020 and the AXE component 1010. The sniffer 1099 is capable of providing real-time sniffing of communication packets sent in a communication session supported by connection 1060. More specifically, sniffer 1099 is capable of capturing and/or evaluating all data packets that pass over connection 1060 between trading entity 1020 and liquidity destination 1050. The captured packets may be stored locally in association with sniffer 1099, which may also perform storing, processing and analyzing functions. In addition, the data packets sniffed by sniffer 1099 may also be passed along to other devices that perform storing, processing and analyzing functions.

In one embodiment, sniffer 1099 captures packets sent along connection 1060 and stores the packets without introducing material latency in the communication path over connection 1060. That is, sniffer 1099 does not interrupt the traffic flow of data packets between trading entity 1020 and liquidity destination 1050. Additional processing may be performed on the captured data packets by additional back-end devices in parallel to the delivery of the packets to liquidity destination 1050.

Also shown in FIG. 10 is an alternative connection 1070 that bypasses the aforementioned connection between the trading entity and the liquidity destination. The alternative connection 1070 supports another communication session between the trading entity 1020 and the liquidity destination 1050 that does not include the AXE component 1010. As such, the trading entity can place orders for transactions of financial articles of trade with that liquidity destination that bypasses the AXE component 1010.

In FIG. 10, the system includes an open order base counter or analyzer 1030 that determines the total number of open or pending orders for that trading entity held by the liquidity destination. The counter may perform an actual count or determine statistically through statistical analysis the total number of open orders.

In addition, the system of FIG. 10 includes an AXE order base counter 1040 that is associated with the corresponding communication session represented by connection 1060. As shown, the order base counter 1040 is coupled to sniffer 1099. That is, the AXE order base counter 1040 is able to determine the total number of orders for a particular period of time being placed with the liquidity destination 1050 through the connection 1060. The AXE order base counter 1060 may perform an actual count or determine through statistical analysis the total number of orders passing through the connection 1060. More particularly, the AXE order base counter 1040 is affiliated with the AXE component 1010 and is able to determine the overall flow through the AXE component 1010. For instance, the AXE order base counter 1040 is able to determine how many open orders pass through the AXE component 1010 that originate from the trading entity 1020 over connection 1060.

A comparator 1080 is able to determine based on the information from the AXE order base counter 1040 and the open order base counter 1030 whether all orders for transactions of financial articles of trade originating from the trading entity and placed with the liquidity destination 1050 are passing through the AXE component 1010. Specifically, at a specific moment in time and over a particular period of time, the open order base counter 1030 has determined the total number of all orders of transactions of financial articles of trade originating from the trading entity 1020 that are attributable, related to, placed, or are being processed by the liquidity destination 1050. This value is not dependent on whether the transaction was submitted over the dedicated communication session or through any bypass session, since it is determined on information collected and processed at the liquidity destination. This information is sent to the comparator 1080. In addition, the AXE order base counter 1040 over the same period of time has determined the total number of orders of transactions of financial articles of trade that originate from the trading entity 1020, that pass through the AXE component 1010, and are attributable, related to, places, or are being processed by the liquidity destination 1050. This information is also sent to the comparator 1080.

In one embodiment, the comparator 1080 is able to determine if the counts for orders from the open order base counter 1030 match, correspond, or approximate the order count from the AXE order base counter 1040. If the counts do not match, and more specifically, if the count from the open order base counter 1030 exceeds the count from the AXE order base counter 1040, then it is determined that orders are being placed through one or more alternative connections 1070, and corresponding communication sessions, that bypass the AXE component 1010.

In addition, when an event is determined that necessitates a cancellation or alteration of pending orders, a process is initiated that terminates or alters all communication sessions associated with that trading entity. Cancellation or alteration is performed on all known communication sessions with one or more liquidity destinations (e.g., liquidity destination 1050) through communication between the comparator 1080 and one or more AXE components 1010, including the communication session associated with connection 1060 or via communication between the comparator 1080 directly with the liquidity destination 1050.

As such, upon initiating a cancellation or alteration process at the liquidity destination 1050 that is in direct response to the termination of the corresponding communication session, pending orders will be canceled or altered and all order flow originating from the trading entity 1020 will be prevented from reaching liquidity destination 1050 through implementation of the AXE component 1010. As such, if the open order base counter 1030 is still registering new orders being placed with the liquidity destination 1050 that originate from the trading entity 1020, while the communication session associated with connection 1060 is terminated or altered, then it is determined that the orders are being placed through the alternative connection 1070, in one embodiment.

Figure 11:
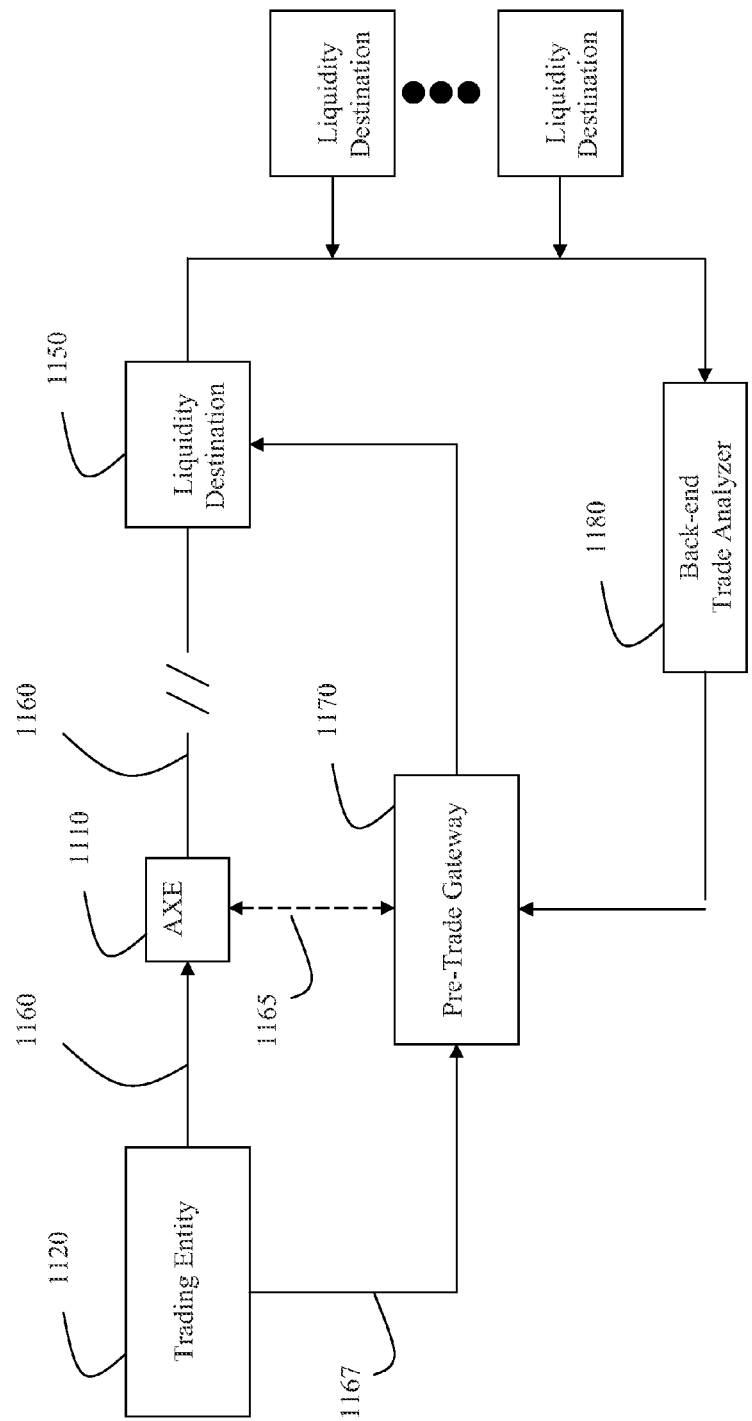
FIG. 11 is an illustration of a system that is capable of performing pre-trade risk analysis prior to sending transactions to corresponding liquidity destinations, in accordance with at least one embodiment described herein.

FIG. 11 illustrates a system that provides pre-trade and/or at-trade monitoring of trades of a trading entity. In one embodiment, the system is implemented for the benefit of a trading entity after a hold has been placed on future trading of that trading entity. For instance, after one or more communication sessions facilitating communication between the trading entity and one or more plurality of liquidity destinations have been disabled through the implementation of the AXE module, as previously described in FIGS. 6-10, pre-trade and/or at-trade monitoring may be initiated to ensure that the trading entity remains in compliance with internal standards set forth by the trading entity and/or federal regulations.

The system 1100 shown in FIG. 11 is expandable and/or distributable to accommodate establishing communication sessions between the trading entity 1120 and one or more liquidity destinations 1155. That is, it is contemplated that under various configurations implementing one or more pre-trade gateways 1170, communication between the trading entity 1120 and one or more liquidity destinations 1155 is established to facilitate pre-trade monitoring of future trading activity for that trading entity 1120. In other implementations, pre-trade gateway 1170 is capable of performing at-trade monitoring or risk analysis, in the same or other configuration of system 1100.

As shown in FIG. 11, a pre-existing communication session over connection 1160 between the trading entity 1120 and a liquidity destination 1150 has been terminated or altered through the AXE module 1110, as represented by the open circuit symbol. The communication session facilitated trading activity between the trading entity 1120 and the liquidity destination 1150, such as placing orders for transactions of financial articles of trade. Because the pre-existing communication session has been terminated or altered, a process to cancel or alter open or pending orders delivered over the communication session has been initiated at the liquidity destination 1150. In addition, the termination of the communication session has effectively halted all future trading by the trading entity 1120 with the liquidity destination 1150.

The system 1100 of FIG. 11 provides an option to open a new communication session or restore the pre-existing communication session, previously serviced by connection 1160, so that the trading entity 1120 may again engage in trading activity with the liquidity destination 1150. In particular, a pre-trade gateway 1170, that provides for pre-trade and/or at-trade monitoring of trades made on behalf of the trading entity 1120, allows for communication to be re-established between the trading entity 1120 and the liquidity destination 1150. Further precautions may be implemented on this new communication session since there already has been a violation of a pre-trade and/or at-trade risk. For instance, a full pre-trade risk analysis may be performed on every transaction before its submission to the corresponding liquidity destination.

In one embodiment, the cancelled communication session was established in an environment where an at-trade risk analysis was performed. That is, the cancelled communication session between the trading entity 1120 and the liquidity destination 1150 provides to the trading entity 1120 direct access to the liquidity destination 1150 without having to go through a participating broker/dealer, or its representatives, such as the clearing house. That communication session may be dedicated to the trading entity. These factors reduce any latency introduced by the pre-trade gateway 1170 when passing along trades between the trading entity 1120 and the liquidity destination 1150, especially when trading at high volumes. However, once an at-trade risk is violated, termination of the communication session occurs, and a new communication session may be subsequently established to continue trading. Since an at-trade risk has been violated, additional precautions may be put into place. For instance, rather than operating to implement an at-trade risk analysis for submitted transactions, a full pre-trade risk analysis may be performed by the pre-trade gateway 1170 on every transaction before its submission to the corresponding liquidity destination. As such, the risk analysis is switched from an at-trade risk analysis that is balanced more in favor towards speed and less on risk analysis, to a pre-trade risk analysis which is balanced more towards performing more diligent risk analysis and less on speed.

In one embodiment, the AXE component 1110 is included within the network path supporting the new communication session, with all the capabilities of the systems and methods described previously in FIGS. 6-10, in one embodiment. In another embodiment, the AXE component 1110 is not included within the network path supporting the new communication session.

In another embodiment, the pre-existing communication session between the trading entity and the liquidity destination is restored. However, the restored communication session must now include the pre-trade gateway 1170. As shown in FIG. 11, the AXE component 1110 is included within the network path over connection 1165 supporting the now restored communication session, with all the capabilities of the systems and methods described previously in FIGS. 6-10, in one embodiment. In another embodiment, the AXE component is not included within the network path supporting the restored communication session, as shown over connection 1167.

The pre-trade gateway 1170 is uniquely positioned to provide control over trades before those trades reach the liquidity destination. That is, the pre-trade gateway 1170 is able to decide which transactions should be delivered to the liquidity destination 1150 based on the definition and current state of the account. For instance, the pre-trade gateway 1170 is able to implement a pre-trade and/or at-trade risk strategy that prevents risky trades, as defined by the trading entity 1120 or by federal regulations, from reaching the liquidity destination 1150. As such, the pre-trade gateway 1170 analyzes a current trade made by the trading entity 1120 and compares it to rules defining a pre-trade and/or at-trade risk. Those rules may define one or more risk limits set on orders, positions, or accounts relating to the trading entity 1120. Though there may be multiple risk limits, checks, or rules, etc. that apply to a transaction before it is released, performance of such risk analysis may occur in a non-serial fashion, in that the analysis performs these multiple risk checks, etc. simultaneously, or in batches, etc. In another instance, the checks, etc. are performed in serial fashion.

Some rules that define pre-trade and/or at-trade risk are discussed below. The discussion to follow is not intended to limit the risk analysis to the rules presented below, but is illustrative of the pre-trade and/or at-trade risk analysis that the pre-trade gateway 1170 provides. That is, the gateway 1170 of FIG. 11 is able to implement any type of pre-trade and/or at-trade risk analysis, as defined by any type of user-defined rule. Additionally, through the configuration of the system in FIG. 11, the rules or configuration parameters defining the rules may be updated in real-time through the pre-trade gateway 1170.

A restricted asset rule provides a list of assets which the trading entity 1120 cannot trade. For instance, trading of these assets may violate insider trading rules, or self sales regulations. Also, asset classes (e.g., equities, options, futures, fixed income, etc.) may be defined that restrict trading of certain assets falling within that asset class. An incoming trade is compared to the list to determine if the incoming trade is trading on one of the restricted assets. This may involve Standard Industrial Classification (SIC) code checking, where the restricted asset is associated with a SIC code, for example. If the asset is restricted for this particular trading group or trading entity 1120, the pre-trade gateway 1170 is able to prevent the transaction or trade from reaching the liquidity destination 1150. The pre-trade gateway 1170 will respond with a rejection message that includes the reason for the rejection to the trading entity 1120. On the other hand, if the asset is not on the list, then the gateway 1170 delivers the transaction to the liquidity destination 1150.

A "fat finger" rule prevents inadvertent and mistaken trades from being delivered. For instance, a trader may inadvertently hit the wrong key on a keyboard, such as by entering in too many zeros for a particular order thereby placing an order for a total number of shares that is many times more than originally planned. In one illustrative case, instead of placing an order for one-thousand shares, extra zeroes could increase that order for one-million shares. As such, an order exceeding a certain threshold of shares will be prevented from being placed with the liquidity destination 1150.

Along the lines of the "fat finger" rule, a single-order-value (SOV) or single-order-quantity (SOQ) rule may be implemented to prevent trades exceeding certain thresholds from being delivered. The SOV and SOQ rules establish an upper threshold on a transaction submitted by the trading entity. For instance, the rule may dictate that a single order may not exceed one-thousand dollars or one-thousand shares of an asset. Once the number of shares exceeds one-thousand dollars or one thousand shares in the order, the pre-trade gateway prevents delivery of the order to the liquidity destination. On the other hand, if the threshold is not exceeded, then the transaction is delivered. In still another embodiment, the SOQ rule is tiered by the share price of the symbol. That is, the SOQ rule may be triggered by the value of the share price. For example, the SOQ rule is triggered once the share price exceeds a certain value, such as four dollars per share. As such, an order for one-million shares at one-dollar does not trigger the SOQ rule, but an order for one-million shares at five-dollars will trigger the SOQ rule.

An "easy-to-borrow" rule prevents the trading entity from making trades that cannot be backed up with securities available to the trading entity. For instance, when the trading entity is shorting a stock, the pre-trade gateway is capable of determining if the trading entity has access to the appropriate stock locates for that stock. If there is a sufficient locate balance, the pre-trade gateway allows the transaction to be delivered to the liquidity destination. Conversely, if there is not sufficient access, the pre-trade gateway prevents the transaction from being delivered to the liquidity destination.

An account limit rule prevents the trading entity from exceeding the resources held in their account. For instance, if the trading entity is given a credit of three-million dollars by a broker/dealer, the pre-trade gateway is able to determine if the trading entity, when making trades through that broker/dealer has exceeded their trading limit at the account level across all liquidity destinations in real-time. If the trading limit has been exceeded, then the pre-trade gateway 1170 is able to prevent the transaction from being delivered to the liquidity destination 1150. On the other hand, if the trading limit has not been exceeded, then the pre-trade gateway 1170 allows the transaction to be delivered to the liquidity destination 1150.

Other rules may exist to ensure that the trading entity 1120 is compliant with Regulation SHO or other federal restrictions. As such, the pre-trade gateway 1170 is implemented to ensure compliance with these regulations.

As shown in FIG. 11, the pre-trade gateway 1170 is able to take into account market volatility and intraday activity by the trading entity 1120, including the account's overnight and opening positions. In particular, the system 1100 includes a back-end trade analyzer 1180 that is able to analyze trades as they are occurring (e.g., perform at-trade analysis on submitted transactions), or analyze trades after they have been executed (e.g., provide post-trade analysis on executed transactions). The system 1100 in FIG. 11 is integrated with the system 600A of FIG. 6A, in one embodiment in that the back-end trade analyzer 1180 component receives collected information from one or more back-end 660 and central collectors 680 that are collecting transactions as they are submitted and/or executed at corresponding liquidity destinations. The back-end trade analyzer 1180 is able to perform symbology crosswalking to align varying asset symbols from various liquidity destinations with a particular entity (e.g., entity 1120). As such, the pre-trade gateway 1170 is able to take into account the general condition of the market, as well as the current position of the trading entity 1120, such as taking into account trades made by the trading entity 1120 at various liquidity destinations using multiple prime brokers, when determining whether to pass the current transaction to the liquidity destination 1150. Some illustrative examples of the rules to consider utilizing information from the back-end trade analyzer 1180 is provided below.

For example, concentration breaches can be monitored for the trading entity 1120. The pre-trade gateway 1170 is able to determine the exposure of the trading entity 1120 for a particular asset or sector, or for an overall position of the trading entity 1120. In general, the pre-trade gateway 1170 is able to determine if there has been an overall breach of the position of the trading entity 1120 in a particular asset, sector, or overall. As such, the pre-trade gateway 1170 is able to determine if the exposure is too great for a given transaction, and will prevent delivery of that transaction to the liquidity destination 1150. On the other hand, if the exposure does not exceed a threshold, then the pre-trade gateway 1170 will deliver the transaction to the liquidity destination 1150.

A committed capital rule prevents the trading entity 1120 from exceeding a capital threshold. The pre-trade gateway 1170 is able to consider the current account position of the trading entity 1120 by analyzing the entity's overnight position, and current position, as described. If the trade or transaction would force the trading entity 1120 to exceed its capital threshold, the trade is prevented from being delivered, otherwise the trade is allowed by the gateway 1170 to be delivered to the liquidity destination 1150.

In another case, the pre-trade gateway 1170 is able to determine if the trading entity 1120 has exceeded any type of trading limit. For instance, there may be a limit on the total number of shares, or overall value of shares traded over a certain period. There also may be limits describing the gross market value or net market value of the trading entity 1120. If any of those limits has been exceeded, or will be exceeded by the current transaction, then the pre-trade gateway 1170 will prevent delivery of the transaction. On the other hand, if that limit has not been exceeded, the transaction will be delivered.

In still another case, the pre-trade gateway 1170 is able to consider profits and losses of the trading entity 1120. That is, by virtue of information collected and analyzed by the back-end trade analyzer 1180, a position of the trading entity 1120 as defined by profits and losses may be determined. In addition, thresholds may be set for one or both of profits and losses. As such, the pre-trade gateway 1170 is able to determine if any of the loss thresholds have been exceeded, which will determine which transactions are then delivered to the liquidity destination 1150. This profit or loss calculation is accomplished at the realized (actual trades on boxed positions) and unrealized levels (one-sided trades against current market state), in one embodiment.

The pre-trade gateway 1170 is able to provide translation of instructions from the trading entity 1120, in accordance with one embodiment of the present invention. Specifically, the trading entity 1120 can deliver trading instructions using any native format familiar to the trading entity 1120. The pre-trade gateway 1170 is capable of translating those instructions to a format deliverable to the liquidity destination 1150.

In one embodiment, when an offending transaction or trade violates a rule, the pre-trade gateway 1170 asks for authorization from the appropriate authority, such as the trading entity 1120 or associated prime broker. After authorization, the pre-trade gateway 1170 is able to release the offending transaction for delivery to the liquidity destination 1150. For instance, although the offending transaction may violate a "fat finger" rule, the trade may legitimately be trading a larger than expected number of shares, and upon authorization will be passed by the gateway 1170 to the liquidity destination 1150.

Figure 12A:
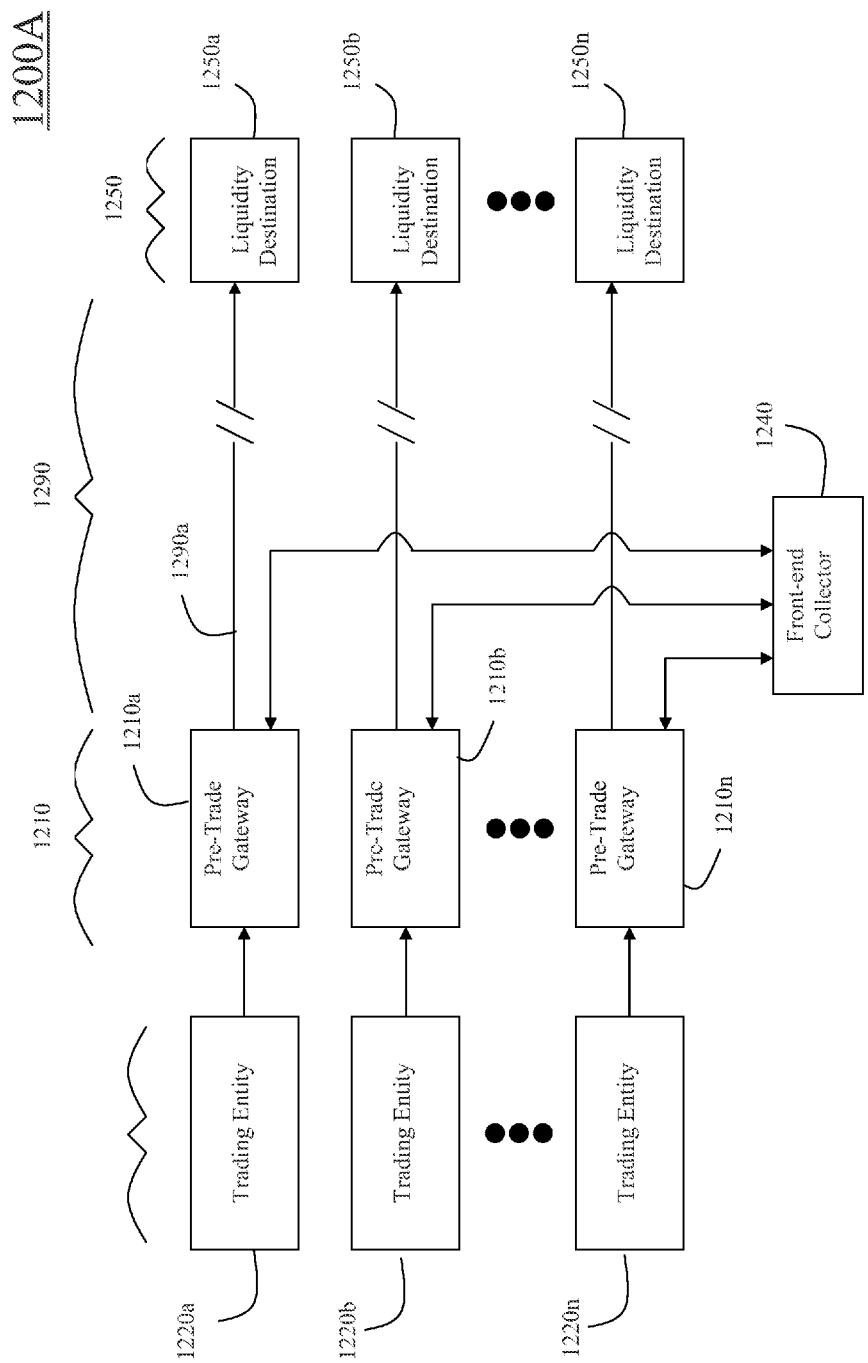
FIG. 12A is an illustration of a system that is capable of performing pre-trade risk analysis on an order by order basis, in accordance with at least one embodiment described herein.

FIG. 12A is an illustration of a financial article of trade data processing system 1200A that is capable of performing risk analysis of an order of a financial article of trade associated with a trading entity, in accordance with one embodiment of the present invention. The data processing system 1200A includes various functions, which may be implemented to perform consolidation and analysis of intraday issues related to submitted securities, commodities, options, futures transactions, and other financial articles of trade transactions, and apply that analysis on an order-by-order basis.

Specifically, the data processing system 1200A includes a plurality of trading entities 1220, including trading entities 1220*a-n*. System 1200A also includes a plurality of pre-trade gateways 1210, including pre-trade gateways 1210*a-n*. System 1200A also includes a plurality of liquidity destinations 1250, to include liquidity destinations 1250*a-n*. In one instance, the liquidity destinations 1250*a-n* are analogous to the plurality of liquidity destinations 30 of FIG. 1. In addition, a front-end analyzer 1240 is included that is communicatively coupled to each of the plurality of pre-trade gateways 1210.

For purposes of illustration, trading entity 1220*a* and its relationship with other components of data processing system 1200A is representative of trading entities in the plurality of trading entities 1220. In particular, the trading entity 1220*a* has relationships with one or more prime brokers who facilitate execution of trading financial articles of trade on one or more liquidity destinations for that trading entity 1220*a*. Though not shown, the trading entity 1220*a* may be acting through one or more prime brokers for facilitating access to one or more of the plurality of liquidity destinations 1250. Also, the trading entity 1220*a* may be directly accessing one or more of the plurality of liquidity destinations 1250 through sponsorship by a particular prime broker (e.g., sponsored access). As a result, the trading entity 1220*a* has access to one or more liquidity destinations 1250*a-n*, either through a representative prime broker, or on behalf of a representative prime broker, such as through sponsored access.

In one embodiment, the plurality of trading entities 1220 is communicatively coupled to the plurality of liquidity destinations 1250. For instance, trading entity 1220*a* is communicatively coupled to a corresponding liquidity destination 1250*a* to facilitate trading of and/or place orders for the purchase, sale and/or other type of transactions of securities, commodities, and other financial articles of trade. Connection 1290*a* allows trading entity 1220*a* to be communicatively coupled with liquidity destination 1250*a* to facilitate interaction between the parties, or its representatives. In general, a connection may be defined as a logical or physical connection between the parties. For instance, the connection may be a dedicated connection defining a network path, such as when associated with a communication session, and may exist for prolonged periods of time, or the connection may be a interim connection, exiting for shorter periods of time. In addition, a connection may define one or more network paths that support a communication session, in that a communication session between the trading entity and the liquidity destination may be supported by one or more network paths over one or more different physical paths, each of which is used at different times during the communication session. Various protocols may be used to establish and manage the communication session between the two parties (e.g., Transmission Control Protocol/Internet Protocol, etc.).

It is important to note that, at least in one embodiment, trading entity 1220*a* may be communicatively coupled to one or more liquidity destinations, and that trading entity 1220*a* may establish one or more connections with a particular liquidity destination. In addition, in one embodiment, connection 1290*a* is associated with a communication session between the trading entity 1220*a* and the liquidity destination 1250*a*.

In one embodiment, a plurality of connections 1290 between the plurality of trading entities 1220 and the plurality of liquidity destinations 1250 includes a plurality of pre-trade gateways 1210. For instance, the connection 1290*a* between trading entity 1220*a* and the liquidity destination 1250*a* includes pre-trade gateway 1210*a*. More specifically, pre-trade gateway 1210*a* determines if orders associated with trading entity 1220*a* are in compliance with one or more risk analysis rules or parameters, and controls delivery and execution of the orders by the back-end liquidity destination 1250*a*.

The location of the pre-trade gateway 1210*a* in FIG. 12A is provided for illustration purposes only. It is contemplated that the pre-trade gateway 1210*a* may be situated in various locations of a corresponding connection or network path between the trading entity 1220*a* and liquidity destination 1250*a*. Put another way, the pre-trade gateway 1210*a* is located anywhere between an entity generating the order and the liquidity destination executing the order. For instance, the pre-trade gateway 1210*a* may be jointly located at trading entity 1220*a*, at a representative of trading entity 1220*a* (e.g., a prime broker to the trading entity), or at liquidity destination 1250*a*. In addition, pre-trade gateway 1210*a* may be remotely located from trading entity 1220*a*, from a representative of trading entity 1220*a*, or from liquidity destination 1250*a*. In each of these cases, the pre-trade gateway 1210*a* is situated on the connection 1290*a* between trading entity 1220*a* and liquidity destination 1250*a* so that all orders associated with trading entity 1220*a* placed with liquidity destination 1250*a* over connection 1290*a* is delivered through pre-trade gateway 1210*a*.

As such, in one embodiment, it is contemplated that all orders associated with trading entity 1220*a* placed with the plurality of liquidity destinations 1250 is delivered through one or more pre-trade gateways. Additionally, by expanding the scope of the data processing system 1200A, it is contemplated that all orders associated with a representative group of trading entities placed with the plurality of liquidity destinations 1250 is delivered through one or more pre-trade gateways. Further, it is contemplated that all orders associated with all trading entities participating in the market is delivered through one or more pre-trade gateways.

Figure 12B:
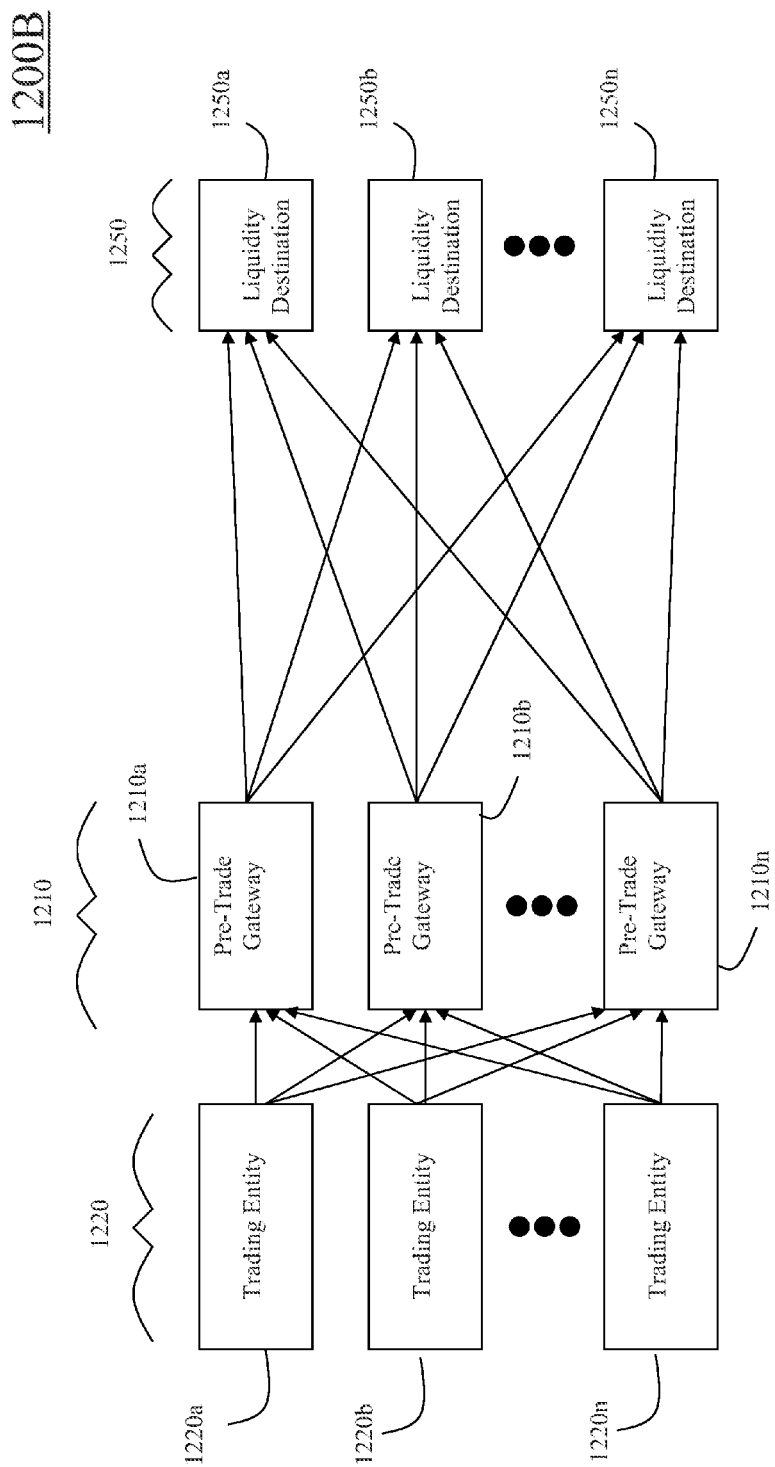
FIG. 12B is an illustration of a system that is capable of performing pre-trade risk analysis on an order by order basis, in accordance with at least one embodiment described herein.

For example, FIG. 12B is an illustration of a financial article of trade data processing system 1200B that is capable of performing risk analysis of an order of a financial article of trade associated with a trading entity, in accordance with one embodiment of the present invention. More specifically, FIG. 12B illustrates various configurations of system 1200B. For instance, it is important to note that a trading entity may be communicatively coupled to one or more pre-trade gateways. As an example, trading entity 1220*a* may be communicatively coupled to pre-trade gateways 1210a, 1210b, on up to 1210n, or a combination thereof. Also, a pre-trade gateway may be communicatively coupled to one or more trading entities, and also to one or more liquidity destinations. For instance, pre-trade gateway 1210a may be communicatively coupled to trading entities 1220a, 1220b, on up to 1220, or a combination thereof. Also, pre-trade gateway 1210a may be communicatively coupled to liquidity destinations 1250a, 1250b, on up to 1250n, or a combination thereof. Moreover, a liquidity destination may be communicatively coupled to one or more pre-trade gateways. For instance, liquidity destination 1250a may be communicatively coupled to pre-trade gateway 1210a, 1210b, on up to 1210n, or a combination thereof.

The functions provided by each of the pre-trade gateways may be implemented on a hardware platform, software platform, or a combination thereof. For instance, the pre-trade gateway 1210a is implemented in hardware form, such as in an application specific integrated circuit (ASIC) in the interest of delivering the fast processing times, in one embodiment. In another embodiment, the pre-trade gateway 1210a is implemented in software supported by a server, to support flexibility in modifying the rules and parameters to consider when performing risk management. In still another embodiment, the pre-trade gateway 1210a is implemented in a combination of hardware and software to benefit from both speed and flexibility.

Returning back to FIG. 12A, financial article of trade data processing system 1200A also includes a front-end analyzer 1240. As shown, the plurality of pre-trade gateways 1210 is communicatively coupled to the front-end analyzer 1240. In that manner, all orders delivered through the plurality of pre-trade gateways 1210 is previewed by the front-end analyzer 1240. For instance, pre-trade gateway 1210a is communicatively coupled to front-end analyzer 1240, such that all orders for financial articles of trade associated with trading entity 1220a intended for delivery over connection 1290a to liquidity destination 1250a are also delivered to front-end analyzer 1240. In one instance, a copy of the pending order is delivered to the front-end analyzer 1240 to minimize any interference of the delivery of the pending order from the trading entity to the liquidity destination.

Figure 12C:
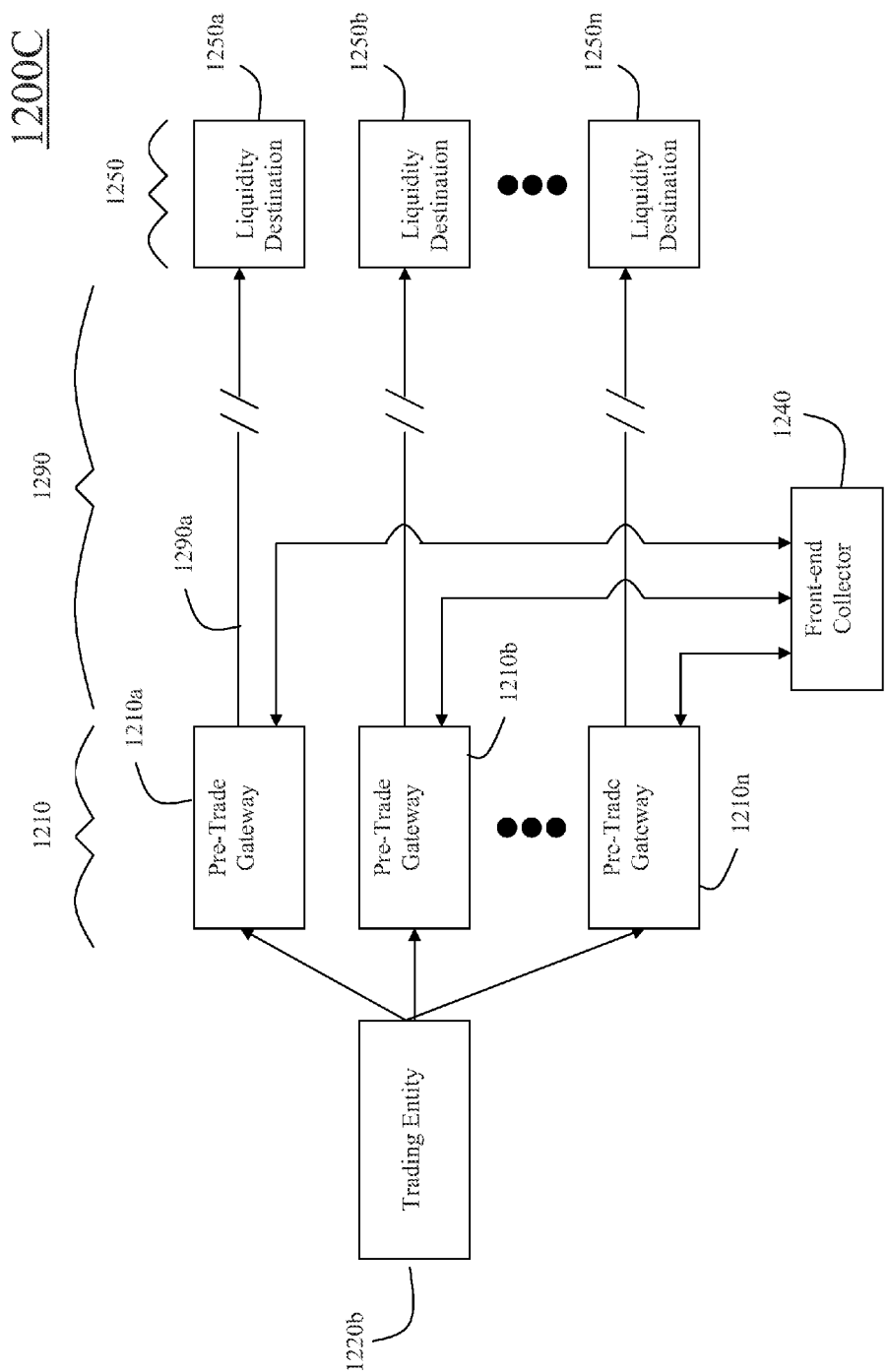
FIG. 12C is an illustration of a system where a front-end analyzer is configured to preview trading information related to a specific trading entity, in accordance with at least one embodiment described herein.

It is important to note that the configuration of the front-end analyzer 1240 within the financial article of trade data processing system 1200A is adaptable to preview varying segments of information. Specifically, front-end analyzer 1240 is able to preview information related to an order, trading entity, broker, brokerage firm, liquidity destination, overall market, or any other suitable segmentation. For instance, FIG. 12C is an illustration of a financial article of trade data processing system 1200C where a front-end analyzer 1240 is configured to preview trading information related to a specific trading entity 1220b. As shown, trading entity 1220b is communicatively coupled to one or more pre-trade gateways that are communicating with one or more liquidity destinations. In addition, the front-end analyzer 1240 is communicatively coupled to each of the pre-trade gateways that are receiving orders from trading entity 1220b (e.g., pre-trade gateway 1210a, 1210b, and on up to 1210n). In that manner, front-end analyzer 1240 is able to preview all the orders from trading entity 1220b before they are delivered to corresponding liquidity destinations. The order includes transaction information related to the order, such as the originating trading entity, the broker, amounts, the security in question, etc. In addition, front-end analyzer 1240 is able to store a copy of the orders for further processing, in one embodiment. A copy of the order is made before the order is delivered to a corresponding liquidity destination.

As a result, the front-end analyzer 1240 is able to provide additional feedback to interested parties. For instance, the front-end analyzer 1240 is able to provide transaction information related to accepted and rejected orders back to the originating trading entity and a corresponding pre-trade gateway in order to establish accountability between the parties. As an example, information of bad orders relating to a particular trading entity may be relayed back to that trading entity to allow them to correct their systems, as well as providing notification that some monitoring entity is aware of the bad orders. In addition, information of rejected orders related to a particular trading entity may be sent to one or more pre-trade gateways for additional consideration when determining whether a future order from that trading entity is accepted or rejected. Additionally, information of accepted orders related may also be sent back to the originating trading entity, as well as one or more pre-trade gateways.

Returning back to FIG. 12A, since the front-end analyzer 1240 reviews information related to orders before or contemporaneous with submission to the plurality of liquidity destinations 1250, various pre-trade and/or at-trade financial and/or intraday positions of various entities may be determined by the front-end analyzer. In addition, front-end analyzer 1240 may store a copy of the order for further processing. By expanding the data processing system 1200A to include a representative group of all trading entities and their related parties, the front-end analyzer 1240 is able to review pre-trade and/or at-trade information that is representative of all orders for financial articles of trade being placed in the market, in one embodiment. In another embodiment, data processing system 1200A is able to preview all pre-trade and/or at-trade information for all orders for financial articles of trade being placed in the market, such as with the plurality of liquidity destinations 1250. More specifically, front-end analyzer 1240 is able to determine the pre-trade and/or at-trade financial or intraday positions of various entities, to include but not limited to the entire market, a trading entity, a brokerage firm, a broker, or a market participant, and communicate these positions back to the plurality of pre-trade gateways 1210. As such, by previewing information directly from each trading entity or related parties, or a large representative group of trading entities or related parties, a picture of the market may be generated that can broadly cover the entire market, or can be narrowed to give a picture involving some or all of the transaction related to or originating from a trading entity. As a result, each of the pre-trade gateways is able to take into account the pre-trade and/or at-trade financial or intraday positions of various entities, to include but not limited to the entire market, a trading entity, a brokerage firm, a broker, or a market participant, when performing pre-trade and/or at-trade risk analysis of an order, and more specifically, on an order-by-order basis.

In one embodiment, an across the market risk management protocol is implemented for all trades and/or offers generated by trading entities for submission to the various liquidity destinations that make up the market. For instance, a federally or privately implemented regulatory layer is placed between the trading entities, or their related parties, and the plurality of liquidity destinations that make up the market. As a result, pre-trade and/or at-trade risk management is performed on an order-by-order basis that takes into account pre-trade and/or at-trade information related to all trades and/or orders being placed through the regulatory layer.

Figure 13:
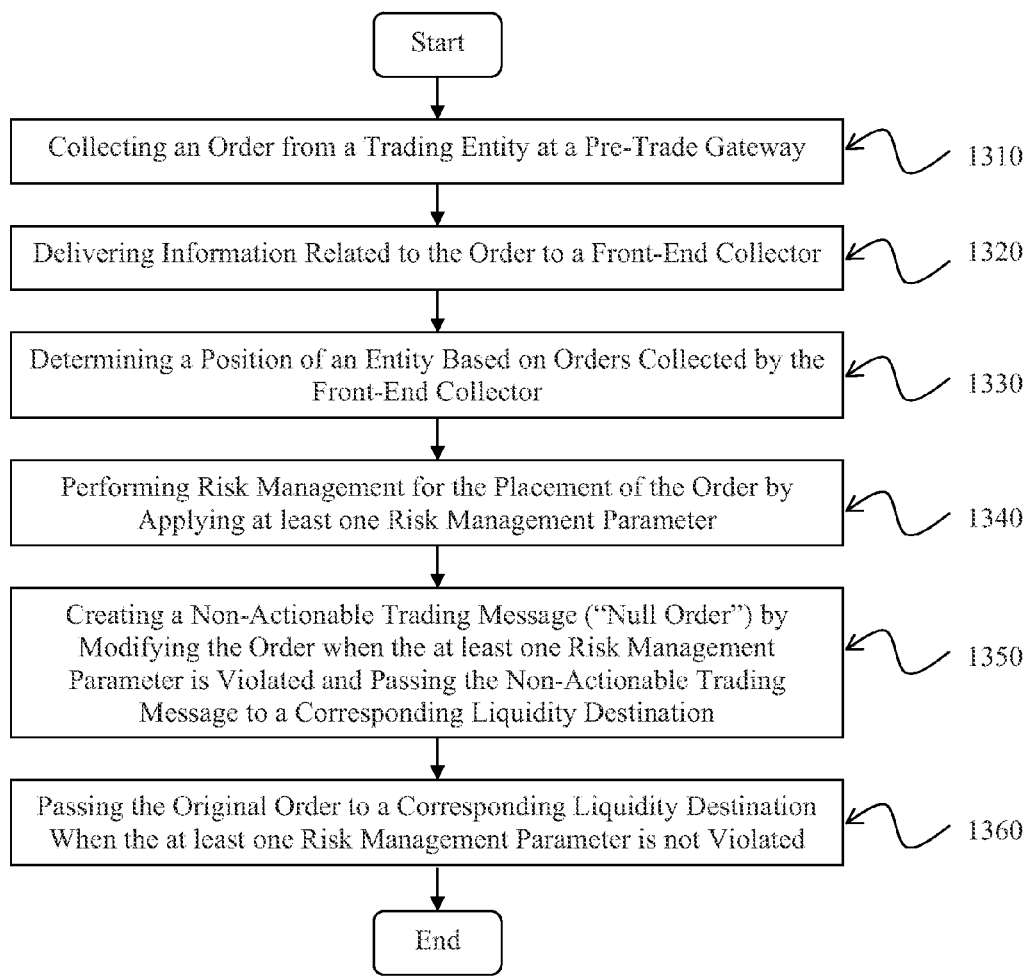
FIG. 13 is a flow diagram illustrating a method of performing pre-trade risk analysis on an order by order basis, in accordance with at least one embodiment described herein.

FIG. 13 is an illustration of a flow diagram 1300 implementing a method operable for performing pre-trade and/or at-trade risk analysis of a pending order before it reaches a corresponding liquidity destination, and for preventing that order from being processed by the liquidity destination when it is determined that the order puts the market, trading entity, or any associated entity at risk, in accordance with one embodiment of the present invention.

At 1310, an order is generated by a trading entity and delivered to and monitored at a pre-trade gateway. As described previously in relation to FIG. 12A, the order is delivered over a connection between the trading entity and a corresponding liquidity destination. Before reaching the liquidity destination, the order is delivered to and monitored by a pre-trade gateway. In another instance, the pre-trade gateway monitors the order in an at-trade situation. In addition, one or more orders from one or more trading entities are monitored by one or more pre-trade gateways, such that a representative group of orders to be delivered over the market as a whole may be monitored. As such, the information monitored may be used to provide a pre-trade and/or at-trade viewpoint of the market.

At 1320, information related to the order is delivered from the pre-trade gateway to a front-end analyzer, before the order is delivered to the corresponding liquidity destination. In addition, one or more orders from one or more trading entities are delivered to the front-end analyzer, such that a representative group of orders to be delivered over the market as a whole may be delivered to the front-end analyzer. In that way, the front-end analyzer is able to generate a picture of the market, broadly across the entire market, or more narrowly to reflect the position of a market participant, or anywhere in between, based on orders delivered to and previewed by the front-end analyzer to include the present order generated by the trading entity. These positions may be considered when performing risk management.

At 1330, risk management is performed by the pre-trade gateway for the placement of the order with the corresponding liquidity destination. For instance, the pre-trade gateway is able to implement a pre-trade and/or at-trade risk strategy that prevents risky trades, as defined by federal regulation, by the trading entity, or by related parties, from being executed by the liquidity destination. The pre-trade gateway analyzes a current trade or order and compares it to one or more rules and/or parameters defining a pre-trade and/or at-trade risk. More specifically, at least one risk management parameter is applied when performing risk management. These parameters may include those previously discussed in relation to FIG. 11, such as a restricted asset rule, fat finger rule, single order number rule, single order quantity rule, cap on single orders, easy-to-borrow rule, account limit rule, Regulation SHO rules, committed capital rule, trading limits, profits and losses of a trading entity, etc. In embodiments, the parameters may be applied narrowly against a trading entity and its related parties, or more broadly against the market as a whole, or anywhere in between, such as against a clearing house. As an example, the parameters may be applied against the financial or intraday positions of the trading entity and this related parties, brokers, broker houses, clearing houses, or to the entire market, as a whole, as determined by the front-end analyzer previously described. In other embodiments, the at least one risk management parameter is applied to the order itself, such as determining if the order exceeds a threshold cap, etc.

The pre-trade gateway is able to generate an output message related to the order, where the output message is delivered to the corresponding liquidity destination, in one embodiment. In one instance, the output message is of the same format as the original and pending order in order to comply with formatting requirements as determined by the communication protocol associated with the corresponding liquidity destination. For example, the output message is of the same length as the pending order. The output message may be a copy of the pending order, or may be a null order which is interpreted by the liquidity destination as not being an actionable trade, based on the results of the risk management, as will be further described below.

As described previously, in one embodiment, the at least one parameter defines a condition of the market. In embodiments, the condition is related to the order itself In other embodiments, the condition is related to orders originating from, involving, or generally being associated with a specific trading entity. In still other embodiments, the condition includes but is not limited to transactions originating from, involving, or generally being associated with the trading entity. In still other embodiments, the condition does not specifically include transactions originating from, involving, or generally being associated with the trading entity, such as those conditions defining an overall market, or a segment of the market.

For instance, the at least one parameter defines a ratio as a condition within which a trading entity is allowed to place orders. The ratio may define a factor of pledged collateral assets, such as X times the assets, where X is greater than zero. In one particular example, the ratio may be defined by a factor of 2, such that a trading entity may not have outstanding trades and/or orders exceeding twice the amount of pledged collateral assets. The financial articles of trade data processing system 1200A of FIG. 12A implementing the method outlined in FIG. 13 is ideally suited to recognizing when there is violation of one or more parameters. For instance, in the above example, the trading entity may place orders with more than one brokerage house using the same pledged collateral assets. While the orders attributed to the trading entity at one brokerage house will not exceed the ratio, all the orders attributed to the trading entity over all the brokerage houses will exceed the ratio. Because the data processing system 1200A is able to recognize a pre-trade and/or at-trade position of the trading entity across all liquidity destinations, all the orders may be considered when calculating the ratio, and as such, it can be determined whether the trading entity is in violation of the ratio. In still another example, the ratio may be applied across a representative group or of all trading entities.

In another instance, the at least one parameter defines a trading volume for a representative group of trading entities consisting of one or more trading entities, or for the entire market, in one embodiment. The trading volume may define a cap on the number of shares being traded at any one time on the market, either by the representative group of trading entities, or by all entities participating in the market. The shares are representative of submitted securities, commodities, options, futures transactions, and other financial articles of trade transactions. In addition, the at least one parameter defines a trading value for a representative group of trading entities consisting of one or more trading entities, or for the entire market, in one embodiment. The trading value may define a cap on the overall value of shares being traded at any one time on the market, either by the representative group of trading entities, or by all entities participating in the market.

At 1340, when it is determined that the pre-trade and/or at-trade risk is violated or too high to allow the pending order to be submitted to the corresponding liquidity destination, an order that is recognized as a non-actionable order is created as an output message and sent to the corresponding liquidity destination. For example, the non-actionable order is created by modifying the pending order at the pre-trade gateway in such a way that the liquidity destination will reject the underlying order contained within the output message. In one instance, the header of the pending order is modified to indicate that the order is a non-actionable order or message. In another instance, the header or the body of the pending order is modified such that the order is not recognized according to a specified format by the liquidity destination. For instance, information is appended to the body of the order or information is deleted from the body rendering the message as a trade that the liquidity destination interprets as not being an actionable trade. As a result, when the corresponding liquidity destination receives the modified order as an output message, it will not recognize the modified order as a valid order complying with a specified format, and will not permit execution of the underlying order or transaction. In still another instance, the output message contains a query message that is a non-order, such as a ping message that asks the liquidity destination if it is still receiving messages, or a salutation message telling the liquidity destination that the trading entity or the pre-trade gateway is still there. In this manner, less burden may placed on the liquidity destination since it can more easily process the query message, as opposed to a garbage message. As such, by the actions of the pre-trade gateway, the underlying order is prevented from being executed by the liquidity destination.

At 1350, when it is determined that the pending order does not violate one or more risk parameters defining a pre-trade and/or at-trade risk, or condition, the pending order contained within an output message and is submitted to the corresponding liquidity destination for execution. In one instance, the output message is identical to the pending order, in which case, effectively the pending order is passed to the corresponding liquidity destination for execution.

In one embodiment, the pre-trade gateway may be implemented with an AXE module described previously in FIGS. 6-11 to provide for added risk management. For instance, the configuration of the data processing system 1200A may be modified to include an AXE module that lies in series with a pre-trade gateway over a connection between a trading entity and a liquidity destination, in one embodiment.

Figure 14:
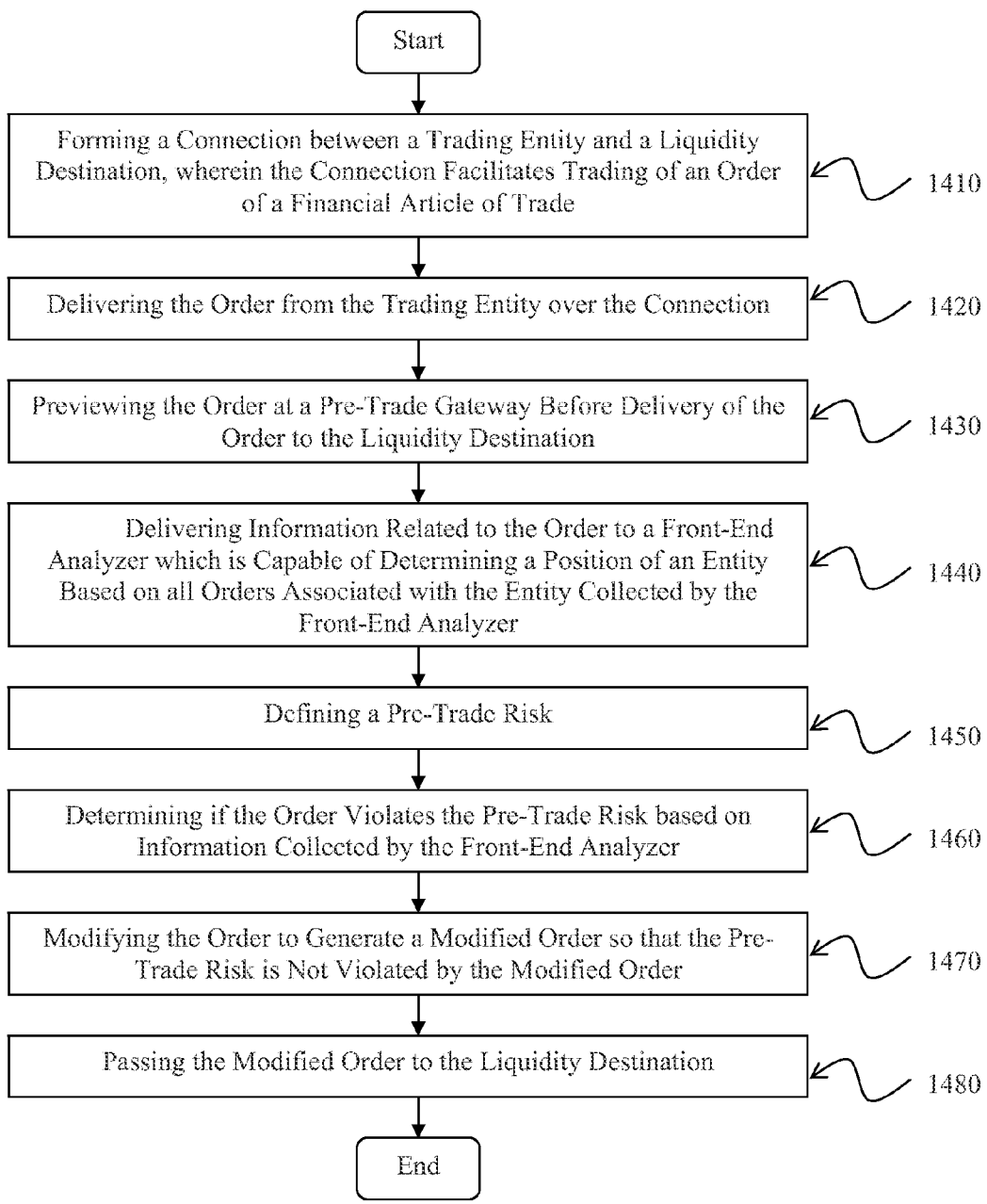
FIG. 14 is an illustration of a flow diagram implementing a method operable for performing pre-trade and/or at-trade risk analysis of a pending order, and for preventing that order from violating pre-trade or at-trade risk checks through modification, in accordance with at least one embodiment described herein.

FIG. 14 is an illustration of a flow diagram 1400 implementing a method operable for performing pre-trade and/or at-trade risk analysis of a pending order before it reaches a corresponding liquidity destination, and for preventing that order, through modification, from being processed by the liquidity destination when it is determined that the order puts the market, trading entity, or any associated entity at risk, in accordance with one embodiment of the present invention. In embodiments, at least one of the systems illustrated in FIGS. 12A-C is able to implement the method outlined in flow diagram 1400. In still other embodiments, the method outlined in flow diagram 1400 operable for performing pre-trade and/or at-trade risk analysis is implemented within a field programmable gate array (FPGA) integrated circuit, or graphics processing unit (GPU), or any similar device.

A connection is formed 1410 between a trading entity and a liquidity destination. The connection facilitates trading of the order of financial article of trade. As such, the order is generated by the trading entity and delivered by the trading entity over the connection 1420 to the liquidity destination.

As described previously in relation to FIG. 12A, the order is delivered over a connection between the trading entity and the corresponding liquidity destination. Before reaching the liquidity destination, the order is delivered to and monitored by a pre-trade gateway 1430. That is, the order is previewed at the pre-trade gateway before delivery to the liquidity destination.

Information related to the order is delivered 1440 from the pre-trade gateway to a front-end analyzer/collector, before or contemporaneous with the order is delivered to the corresponding liquidity destination. In addition, one or more orders from one or more trading entities are delivered to the front-end analyzer, such that a representative group of orders to be delivered over the market as a whole may be delivered to the front-end analyzer. In that way, the front-end analyzer is able to generate a picture of the market, broadly across the entire market, or more narrowly to reflect the position of a market participant, or anywhere in between, based on orders delivered to and previewed by the front-end analyzer to include the present order generated by the trading entity. These positions may be considered when performing risk management.

Risk management is performed by the pre-trade gateway for the placement of the order with the corresponding liquidity destination. For instance, the pre-trade gateway is able to implement a pre-trade and/or at-trade risk strategy that prevents risky trades, as defined by federal regulation, by the trading entity, or by related parties, from being executed by the liquidity destination. The pre-trade gateway analyzes 1460 a current trade or order and compares it to one or more rules and/or parameters defining a pre-trade and/or at-trade risk 1450. More specifically, at least one risk management parameter is applied when performing risk management. These parameters may include those previously discussed in relation to FIG. 11, such as a restricted asset rule, fat finger rule, single order number rule, single order quantity rule, cap on single orders, easy-to-borrow rule, account limit rule, Regulation SHO rules, committed capital rule, trading limits, profits and losses of a trading entity, etc. In embodiments, the parameters may be applied narrowly against a trading entity and its related parties, or more broadly against the market as a whole, or anywhere in between, such as against a clearing house. As an example, the parameters may be applied against the financial or intraday positions of the trading entity and its related parties, brokers, broker houses, clearing houses, or to the entire market, as a whole, as determined by the front-end analyzer previously described. In other embodiments, the at least one risk management parameter is applied to the order itself, such as determining if the order exceeds a threshold cap, etc.

When it is determined that the order violates the pre-trade and/or at-trade risk based on information collected by the front-end analyzer/collector, the pending order to be submitted to the corresponding liquidity destination is modified 1470 to generate a modified order in such a way that the modified order does not violate the pre-trade and/or at-trade risk. As such, elements of the order may be changed to reduce the risk of the order. For instance, the total order amount of shared may be reduced to decrease the overall risk of the order. The modified order is then passed to the corresponding liquidity destination for execution 1480.

In another embodiment, a system for monitoring market transaction activity data is capable of performing risk management. For instance, systems 1200A and 1200C of FIGS. 12A and 12C are well suited to implementing the method outlined in FIG. 14 for performing risk management.

In particular, a connection between a trading entity and a liquidity destination is established. The connection facilitates trading of an order of a financial article of trade. A pre trade gateway (e.g., 1210a) is located on the connection to intercept orders being sent from the trading entity to the liquidity destination. In addition, a front-end analyzer/collector 1240 is communicatively coupled to the pre-trade gateway. The front-end analyzer collects real-time pre-trade and/or at-trade information, to include pending transactions of financial articles of trade collected before delivery to said liquidity destination. In addition, the front-end analyzer is able to collect the instant order of financial article of trade delivered from the trading entity to the liquidity destination.

Additionally, the pre-trade gateway is capable of performing risk management to determine whether the order violates a pre-trade and/or at-trade risk. When the pre-trade and/or at-trade risk is violated, the pre-trade gateway is capable of modifying the order to generate a modified order. The modified order is configured such that the pre-trade and/or at-trade risk is not violated. The modified order is then passed along to the corresponding liquidity destination.

Figure 15:
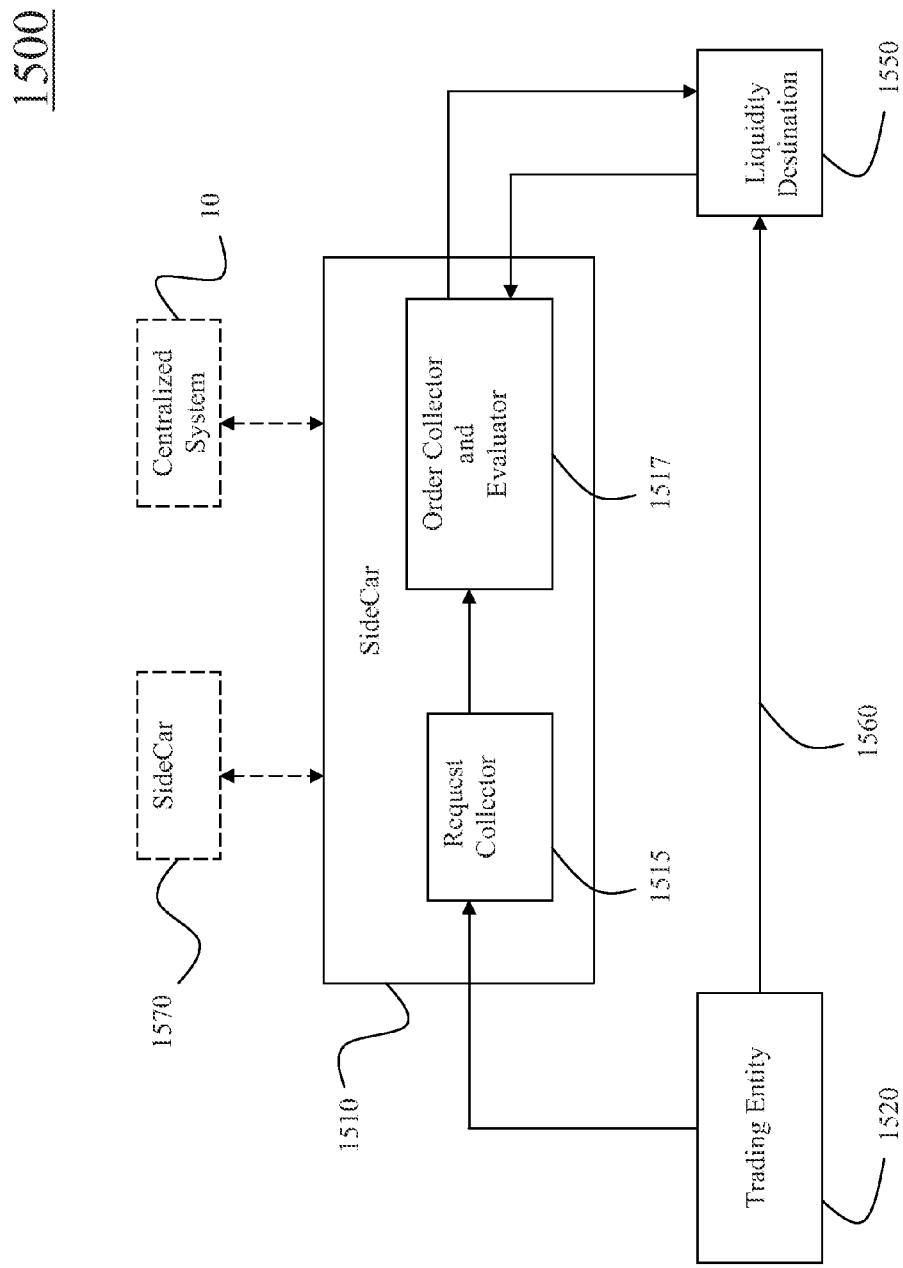
FIG. 15 is an illustration of a system configured to evaluate confirmation of transactions of financial articles of trade submitted directly to a liquidity destination by a trading entity in comparison to requests for transactions of financial articles of trade made by the trading entity, in accordance with one embodiment of the present invention.

FIG. 15 is an illustration of a system 1500 configured to evaluate confirmation of transactions of financial articles of trade submitted directly to a liquidity destination by a trading entity in comparison to requests for transactions of financial articles of trade made by the trading entity, in accordance with one embodiment of the present invention. The system 1500 helps to determine when to affect a behavioral change in a liquidity destination for purposes of risk management.

The components of FIG. 15 can be duplicated when supporting multiple liquidity destinations, in various configurations. As such, the system 1500 of FIG. 15 is expandable to determine when a discrepancy exists at a liquidity destination with regards to transactions of financial articles of trade associated with a trading entity.

As shown in FIG. 15, a communication session is established between a trading entity 1520 and a liquidity destination 1550. Specifically, a connection 1560 is made between the trading entity 1520 and the liquidity destination 1550. Typically, the connection 1560 defines a dedicated network path between the two parties. The connection 1560 may include one or more physical paths to accommodate for automatic failover.

Over the communication session supported by connection 1560, transactions of financial articles of trade are submitted to the liquidity destination 1550 by the trading entity 1520. As shown in FIG. 15, the path over connection 1560 is intended to be the most direct between the trading entity 1520 and the liquidity destination 1550 to introduce the least amount of latency when delivering the transactions.

As shown in FIG. 15, the system 1500 for monitoring market transaction activity data includes a SideCar module 1510, which is capable of performing a risk assessment for the trading entity 1520, on an order-by-order or aggregate-order basis. This risk assessment is performed by the SideCar module 1510 in parallel and simultaneous with submissions of transactions to the liquidity destination 1550. More particularly, SideCar module 1510 is capable of determining when transactions of financial articles of trade submitted to a particular liquidity destination 1550 align with the reportedly submitted transactions of financial articles of trade. In one implementation, SideCar module evaluates transactions of financial articles of trade associated with a trading entity and a particular liquidity destination.

The SideCar module 1510 includes an order collector and evaluator 1517 that is configured to receive from a particular liquidity destination 1550 confirmations of one or more transactions of financial articles of trade that are submitted to the liquidity destination 1550 from a trading entity 1520. The confirmations pertain to a particular period (e.g., time, day, duration, etc.). Specifically, the liquidity destination 1550 tracks all transactions of financial articles of trade that are submitted to and accepted by the liquidity destination 1550 for execution over a period of time. Information related to those submitted transactions are then delivered to the order collector and evaluator 1517. For instance, that information may include the same information contained within the original transaction or order for the transaction of financial article of trade. In addition, that information may include drop copy information for each transaction of financial article of trade submitted to the liquidity destination 1550.

In addition, the SideCar module 1510 includes a request collector 1515 for receiving from the trading entity 1520 one or more requests including information related to transactions of financial articles of trade that are submitted by the trading entity 1520 to the liquidity destination 1550. The one or more requests are collected over the same period described above. In essence, the trading entity 1520 provides a self reporting service to the request collector 1515, in that copies of the transactions of financial articles of trade submitted by the trading entity 1520, and as reported by the trading entity 1520, to the liquidity destination 1550 are provided to the request collector 1515. In one implementation, a reverse drop-copy is provided by the trading entity 1520 to the request collector 1515 of the SideCar module 1510 to provide information related to reported transactions of financial articles of trade submitted to the liquidity destination 1550.

Also, the SideCar module 1510 includes an evaluator, which in some implementations is packaged or integrated with the order collector as the collector/evaluator 1517, but in other implementations resides separately. As shown in FIG. 15, evaluator 1517 is coupled to the order collector no matter their configuration so that information may be freely exchanged between the two functionalities. In particular, the collector/evaluator 1517 is capable of comparing information related to submitted transactions of financial articles of trade provided in confirmation of such transactions by the liquidity destination to requests containing information related to transactions of financial articles of trade submitted to the liquidity destination, as self-reported by the trading entity 1520.

Whenever a discrepancy is noted between the confirmations and the requests, the behavior at the liquidity destination 1550 is altered with regards to the trading entity 1520. The discrepancy may be applied on an order or aggregate level. In particular, collector and evaluator 1517 is able to initiate an action, performed by the evaluator 1517, a third party, or the liquidity destination 1550, that alters the behavior at the liquidity destination 1550 to reduce the overall risk of the trading entity 1520.

System 1500 also optionally includes one or more SideCars 1570, each of which support communication sessions between the trading entity 1520 and other liquidity destinations. That is, SideCar 1510, which provides a distributed view of trading entity 1520 in relation to transactions submitted to liquidity destination 1550, is also communicatively coupled to receive information relating to other transactions of financial articles of trade that are submitted by the trading entity to other liquidity destinations. In that manner, a wider market view of trading entity 1520, that includes information related to one or more corresponding liquidity destinations, is achieved and may be considered for purposes of performing risk management by collector/evaluator 1517. If a risk is perceived in the wider, market view, then the behavior at the liquidity destination 1550 is altered to reduce the overall risk of the trading entity 1520.

Further, system 1500 also optionally includes centralized system 10, first introduced in FIG. 1. That is, SideCar 1510 is communicatively coupled to centralized system 10 such that an overall, market-wide view related to the trading entity 1520 may be considered. In particular, centralized system 10 is capable of monitoring intraday issues related to submitted securities transactions regardless of which securities trading system(s) were used by the trading entity 1520 or other parties in a chain of parties involved in the purchase and/or sale of securities, commodities and other financial articles of trade of which the trading entity 1520 has a financial stake, and regardless of which liquidity destination or destinations were used to affect those transactions (e.g., the NYSE, NASDAQ, or Alternative Trading Systems), and regardless of which third parties in the chain of parties ultimately became involved in affecting such transactions.

As such, information related to the entire market including one or more corresponding liquidity destinations may be considered for purposes of performing risk management by collector/evaluator 1517 in relation to trading entity 1520. If a risk is perceived in the overall, market view, then the behavior at the liquidity destination 1550 is altered to reduce the overall risk of the trading entity 1520.

Figure 16:
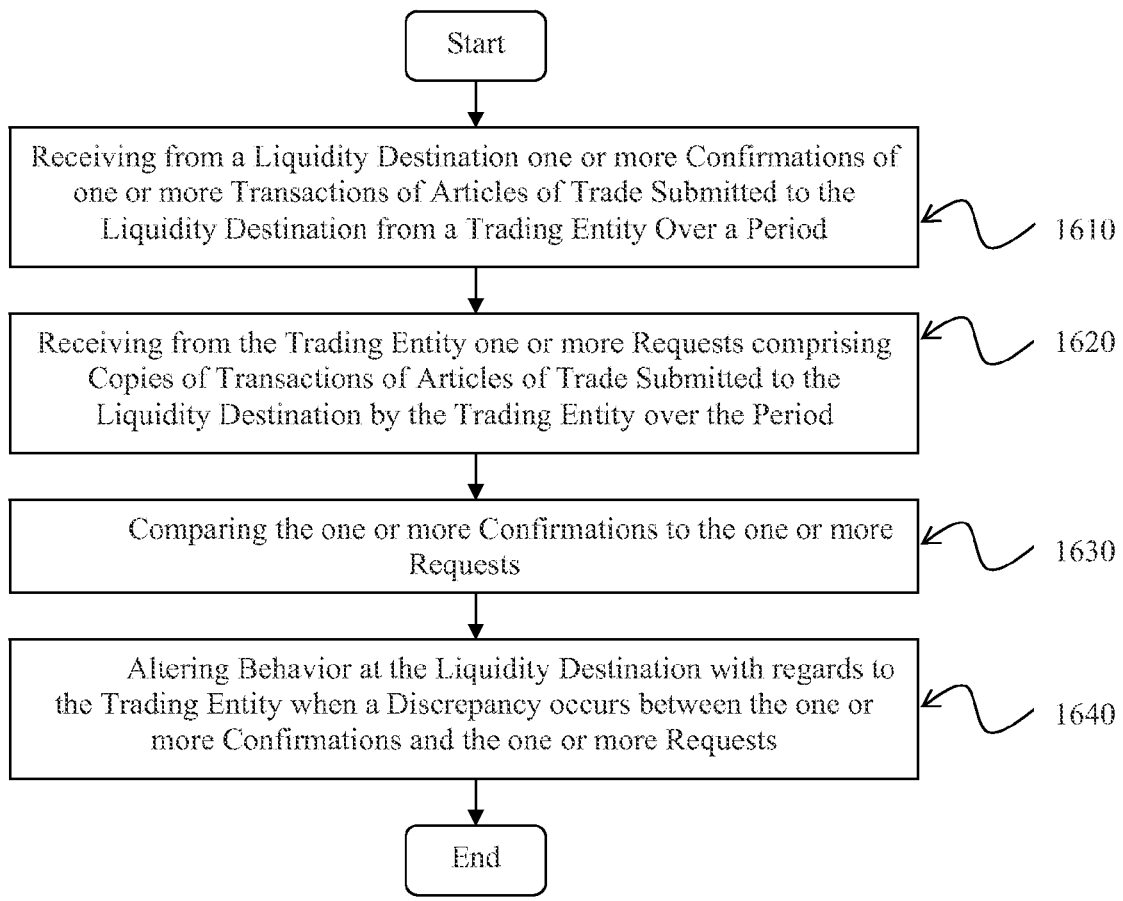
FIG. 16 is an illustration of a flow diagram implementing a method operable for evaluating confirmation of transactions of financial articles of trade submitted directly to a liquidity destination by a trading entity in comparison to requests for transactions of financial articles of trade made by the trading entity, in accordance with one embodiment of the present invention.

FIG. 16 is an illustration of a flow diagram 1600 implementing a method for monitoring market transaction activity data, and more specifically is operable for evaluating confirmation of transactions of financial articles of trade submitted directly to a liquidity destination by a trading entity in comparison to requests for transactions of financial articles of trade made by the trading entity, in accordance with one embodiment of the present invention. In one instance, the method of flow diagram 1600 is implemented by system 1500 of FIG. 15.

In a distributed instance of the method, one or more confirmations of one or more transactions of financial articles of trade are received 1610 from a liquidity destination. These confirmations are associated with a period. The transactions are submitted to the liquidity destination, and confirmation of those submission is provided and received. The transactions may also include executed orders of transactions, or executed transactions. As described previously, confirmations include information related to corresponding transactions of financial articles of trade submitted and officially recognized by the liquidity destination. That information includes details for each of the transactions, to include drop-copy information for each transaction, or information that is more detailed, or less detailed.

The transactions are submitted by the trading entity in a manner that introduces the least amount of latency. For instance, devices that perform pre-trade and/or at-trade risk analysis are not included over a communication path between the trading entity and the receiving liquidity destination. As such, the most direct path for submitting the transaction is used to reduce the amount of time between the trading entity and the liquidity destination experienced when submitting a transaction.

In addition, simultaneously, one or more requests of transactions of financial articles of trade are received 1620 from the trading entity. That is, the trading entity provides self-reporting information related to transactions of financial articles of trade that the trading entity has submitted to the liquidity destination over the same period introduced above. In one instance, the information reported in the request includes copies of the transactions of financial articles of trade that are submitted to the liquidity destination by the trading entity over the period.

A risk analysis is performed 1630, such that that one or more confirmations of submitted transactions submitted by the trading entity and as reported by the liquidity destination are compared to the one or more requests that include self-reported information relating to transactions submitted to the liquidity destination. The comparison is made to determine if there is a discrepancy between information contained within the confirmations and requests.

In one instance, if there is a discrepancy noted, behavior at the liquidity destination is altered with regards to the trading entity. For instance, the one or more communication sessions between the trading entity and the particular liquidity destination may be terminated in order to initiate a Cancel-on-Disconnect process at the liquidity destination. In addition, pending orders of transactions may be canceled or altered. Also, future orders from the trading entity may be refused. In still other instances, instruction may be provided to a third party to initiate one or more actions detailed above for the purposes of reducing the overall risk to the trading entity. That is, command and control capability is leveraged to initiate an action by a third party to alter behavior at the liquidity destination.

As an example, when comparing information in the confirmations to information in the requests, an aggregate total of confirmations of transactions over the period is compared to an aggregate total of requests. The comparison may consider more detailed information, to include the number of shares associated with a transaction, or the financial amount at stake within a transaction, etc. In still other instances, the information considered includes drop-copy information provided in the confirmations and reverse drop-copy information provided by the requests.

The method outlined in FIG. 16 may be implemented on an aggregate order basis with regards to the trading entity and the liquidity destination. For instance, a risk analysis may be performed over many transactions of financial articles of trade as submitted by the trading entity to the liquidity destination. In particular, a risk parameter is received from the liquidity destination, wherein the risk parameter relates to the trading entity, and more specifically relates to transactions submitted by the trading entity to the particular liquidity destination, and not necessarily other liquidity destinations, though the risk parameter may also be generally applied. It is determined if information relating to one or more confirmations are aligned with information relating to one or more requests, or more specifically, if the information considered is in compliance with the risk parameter. Behavior at the liquidity destination is altered with regards to the trading entity when the risk parameter is violated.

Also, the method outlined in FIG. 16 may be implemented on an order-by-order basis with regards to the trading entity and the liquidity destination. For instance, a risk analysis may be performed in a single transaction of financial articles of trade. In particular, a risk parameter is received from the liquidity destination, wherein the risk parameter relates to the trading entity, and more specifically relates to transactions submitted by the trading entity to the particular liquidity destination, and not necessarily other liquidity destinations, though the risk parameter may also be generally applied. It is determined if a submitted transaction, through its corresponding confirmation, is in compliance with the risk parameter. The parameter may also include a comparison to a corresponding request to see if the confirmation and the request match. Behavior at the liquidity destination is altered with regards to the trading entity when the risk parameter is violated.

In other embodiments, a distributed position of the trading entity is considered when performing risk analysis of the trading entity. That is, information relating to only transactions submitted to a particular liquidity destination from a trading entity is considered. As such, a distributed position, such as a financial position, of the trading entity is determined with regards to transactions submitted to the liquidity destination. A risk parameter is received from the liquidity destination that is related to the trading entity. It is determined if the distributed position of the trading entity is in compliance with the risk parameter. Behavior at the liquidity destination is altered with regards to the trading entity when the risk parameter is violated.

A wider market view of the trading entity may be considered when performing risk analysis of the trading entity. For instance, information relating to confirmations and requests as delivered to transactions of financial articles of trade submitted by the trading entity to liquidity destinations, other than the instant liquidity destination. For instance, a second distributed position may be received relating to transactions submitted to a second liquidity destination. This second distributed position may be received from another SideCar implementation that includes a second order collector, a second request collector, and a second evaluator. That information may be considered to obtain a wider view or fuller market position of the trading entity. The breadth of the view or position depends on how many liquidity destinations are participating. As such, a more distributed position, such as a financial or market position, of the trading entity is determined with regards to information relating to transactions submitted to two or more liquidity destinations and considered. A risk parameter is received from the liquidity destination that is related to the trading entity. It is determined if the wider, more distributed position of the trading entity is in compliance with the risk parameter. Behavior at the liquidity destination is altered with regards to the trading entity when the risk parameter is violated.

In still another embodiment, an overall market view of the trading entity may be considered when performing risk analysis of the trading entity. For instance, information is considered relating to all transactions associated with the trading entity of which the trading entity has a financial stake, no matter which party in a chain of parities liable for the transaction affects the transaction, and no matter which liquidity destination receives the transaction. For instance, information from a centralized system (e.g., system 10 of FIG. 1) may provide an overall market view, such as financial or market position, of the trading entity. That information is considered in conjunction with the information relating to confirmations and requests to obtain an overall market view or position of the trading entity when performing risk analysis for the trading entity. For instance, a risk parameter is received from the liquidity destination that is related to the trading entity, or from the centralized system. It is determined if the overall position, as determined above, of the trading entity is in compliance with the risk parameter. Behavior at the liquidity destination is altered with regards to the trading entity when the risk parameter is violated.

A system and method for monitoring market transaction activity data from a plurality of liquidity destinations and/or through a pre-trade gateway capable of controlling execution of orders, such as quickly executing cancellation or alteration instructions on pending orders for financial articles of trade with one or more liquidity destinations, is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The one or more present inventions, in various embodiments, include components, methods, processes, systems and/or apparatus substantially as depicted and described herein, including various embodiments, subcombinations, and subsets thereof. Those of skill in the art will understand how to make and use the present invention after understanding the present disclosure.

The present invention, in various embodiments, includes providing devices and processes in the absence of items not depicted and/or described herein or in various embodiments hereof, including in the absence of such items as may have been used in previous devices or processes (e.g., for improving performance, achieving ease and/or reducing cost of implementation).

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention (e.g., as may be within the skill and knowledge of those in the art, after understanding the present disclosure). It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A computer-implemented method of managing intraday risk conditions, comprising:
    collecting, by a processor, transaction specific data from a plurality of liquidity destinations trading at least one financial article of trade, wherein the collected transaction specific data comprises account parameters corresponding to associated liquidity destinations;
    defining, by the processor, an intraday risk condition of a trading market;
    associating, by the processor, said defined, intraday risk condition with a trading entity;
    identifying, by the processor, an event in said trading market from said account parameters of the transaction specific data in which the event matches said defined intraday risk condition;

terminating, by the processor, at least one dedicated communication session between said trading entity and a corresponding liquidity destination; and initiating, responsive to the identified event, by the processor, a process at said corresponding liquidity destination that cancels pending transaction messages submitted by said trading entity.

2. The method of claim 1, wherein said terminating the dedicated communication session comprises:

physically de-coupling a connection between said trading entity and said corresponding liquidity destination, wherein said connection enables said communication session.

3. The method of claim 1, wherein said terminating the dedicated communication session comprises:

logically de-coupling a connection between said trading entity and said corresponding liquidity destination, wherein said connection enables said communication session.

4. The method of claim 1, wherein said terminating the dedicated communication session comprises:

invoking a session termination over at least one communication session.

5. The method of claim 4, wherein said session termination comprises a TCP teardown.

6. The method of claim 1, wherein said terminating the dedicated communication session comprises:

terminating a plurality of communication sessions between said trading entity and said plurality of liquidity destinations.

7. The method of claim 6, wherein said terminating all communication session comprises:

at least one of physically or logically de-coupling a plurality of connections between said trading entity and said plurality of liquidity destinations, wherein said plurality of connections enables said plurality of communication sessions.

8. The method of claim 7, further comprising:

determining said plurality of connections between said trading entity and said plurality of liquidity destinations.

9. The method of claim 6, wherein said terminating a plurality of communication sessions comprises:

terminating all communication sessions between said trading entity and said plurality of liquidity destinations.

10. The method of claim 1, wherein said terminating at least one communication session further comprises:

causing a physical de-coupling of a connection between said trading entity and said corresponding liquidity destination.

11. The method of claim 1, wherein said terminating at least one communication session further comprises:

sending an instruction to a third party component to initiate an action altering said communication session.

12. The method of claim 1, wherein said initiating a process comprises:

forcing a cancel-on-disconnect process at said corresponding liquidity destination.

13. The method of claim 1, wherein said condition is based on transactions of financial articles of trade related to said trading entity.

14. The method of claim 1, wherein said condition includes transactions of financial articles of trade not related to said trading entity.

15. The method of claim 6, further comprising:

determining, by the processor, from the account parameters of said transaction specific data canceled orders related to said trading entity over said plurality of liquidity destinations;

determining, by the processor, an open order base of said trading entity based on said transaction specific data;

comparing, by the processor, said open order base to said canceled orders; and determining, by the processor, that orders for transactions of financial articles of trade are not submitted through said plurality of communication sessions when said canceled orders do not correspond to said open order base.

16. The method of claim 1, further comprising:

restoring, by the processor, said at least one communication session to said corresponding liquidity destination through a pre-trade gateway performing pre-trade risk analysis.

* * * * *